(12) United States Patent
Tonomura et al.

(10) Patent No.: US 8,265,427 B2
(45) Date of Patent: Sep. 11, 2012

(54) INTERPOLATOR AND DESIGNING METHOD THEREOF

(75) Inventors: Motonobu Tonomura, Tokyo (JP);
Kyouji Yoshino, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 12/917,766

(22) Filed: Nov. 2, 2010

(65) Prior Publication Data

US 2011/0044562 A1     Feb. 24, 2011

Related U.S. Application Data

(62) Division of application No. 11/523,351, filed on Sep. 19, 2006, now Pat. No. 7,840,623.

(30) Foreign Application Priority Data

| Sep. 26, 2005 | (JP) | .................. 2005-277463 |
| Feb. 15, 2006 | (JP) | .................. 2006-037944 |
| Feb. 22, 2006 | (JP) | .................. 2006-045471 |

(51) Int. Cl.
*G06K 9/36* (2006.01)

(52) U.S. Cl. ..................................................... 382/300

(58) Field of Classification Search .................. 382/300; 708/290, 313
See application file for complete search history.

(56) References Cited

U.S. PATENT DOCUMENTS

| 3,247,365 A | 4/1966 | Dell et al. ................... 235/164 |
| 3,412,240 A | 11/1968 | Hunt et al. .................. 235/164 |
| 4,841,462 A | 6/1989 | Vigarié et al. ................ 364/723 |
| 5,020,014 A | 5/1991 | Miller et al. .................. 364/723 |
| 5,113,362 A | 5/1992 | Harston et al. ................ 364/723 |
| 5,257,355 A * | 10/1993 | Akamatsu ..................... 395/142 |

(Continued)

FOREIGN PATENT DOCUMENTS

JP          7-200869 A      8/1995

(Continued)

OTHER PUBLICATIONS

Unser, Michael. "Splines: A Perfect Fit for Signal and Image Processing" *AQ IEEE Signal Processing Magazine* Nov. 1999, pp. 22-38.

(Continued)

*Primary Examiner* — Andrew W Johns
(74) *Attorney, Agent, or Firm* — Ladas & Parry LLP

(57) ABSTRACT

Interpolation of signed values A and B is efficiently performed by simple circuitry. To calculate an interpolated value C based on a 4-bit values A (bits $a_3a_2a_1a_0$) and B (bits $b_3b_2b_1b_0$) expressing a negative number by twos complement notation and a 4-bit interpolation rate D (bits $d_3d_2d_1d_0$) consisting of only a decimal part, a basic expression of $C=(1-D)*A+D*B$ is transformed into an expression composed of an unsigned part that includes a sum of products with a bit $d_i$ or a logically inverted value $e_i$ of the bit $d_i$ (i=0, 1, 2, and 3), and indicates an absolute value of the interpolated value C, and a signed part indicating a sign of the interpolated value C. Then, 7 bits of bits $c_6$ through $c_0$ are generated from an arithmetic operation of the unsigned part, and logic judgement of the signed part is performed by considering a carry from the digit of the bit $c_6$ of the arithmetic operation of the unsigned part to generate a bit $c_7$. Significant digits of the obtained 8-bit value (bits $c_7$ through $c_0$) are outputted as an interpolated value.

8 Claims, 43 Drawing Sheets

U.S. PATENT DOCUMENTS

| | | | | |
|---|---|---|---|---|
| 5,402,533 | A | | 3/1995 | Kelley et al. .................. 395/126 |
| 5,513,120 | A | * | 4/1996 | Berlad .......................... 364/723 |
| 5,517,437 | A | | 5/1996 | Yamashita et al. ............ 364/736 |
| 5,935,198 | A | | 8/1999 | Blomgren ..................... 708/290 |
| 6,373,494 | B1 | | 4/2002 | Horioka et al. ............... 345/581 |
| 2002/0152248 | A1 | | 10/2002 | Bentz ............................ 708/290 |

FOREIGN PATENT DOCUMENTS

| | | |
|---|---|---|
| JP | 11-212955 A | 8/1999 |

OTHER PUBLICATIONS

Keys, Robert G. "Cubic Convolution Interpolation for Digital Image Processing" *IEEE Transactions AR on Acoustics. Speech. and Signal Processing* (1981) vol. ASSP-29, No. 6, pp. 1153-1160.

Hou, Hsieh S. "Cubic Splines for Image Interpolation and Digital Filtering" *IEEE Transactions on AS Acoustics. Speech. and Signal Processing* (1978) vol. ASSP-26, No. 6, pp. 508-517.

* cited by examiner $C = (1-D) * A + D * B$ (WHERE $0 \leq D < 1$)

| DECIMAL EXPRESSION | BINARY EXPRESSION |
|---|---|
| +7 | 0111 |
| +6 | 0110 |
| +5 | 0101 |
| +4 | 0100 |
| +3 | 0011 |
| +2 | 0010 |
| +1 | 0001 |
| 0 | 0000 |
| −1 | 1111 |
| −2 | 1110 |
| −3 | 1101 |
| −4 | 1100 |
| −5 | 1011 |
| −6 | 1010 |
| −7 | 1001 |

(POSITIVE NUMBER)
$A = a_3\ a_2\ a_1\ a_0$ (NEGATIVE NUMBER)
$-A = \overline{a_3}\ \overline{a_2}\ \overline{a_1}\ \overline{a_0} + 1$

FIG. 3

(EXPRESSION 1-1)
$$A = -a_{n-1}2^{n-1} + a_{n-2}2^{n-2} + \cdots + a_1 2^1 + a_0 2^0$$

$$= -a_{n-1}2^{n-1} + \sum_{j=0}^{n-2} a_j 2^j$$

$\underbrace{\phantom{-a_{n-1}2^{n-1}}}_{\text{SIGNED PART}}$ $\underbrace{\phantom{\sum a_j 2^j}}_{\text{UNSIGNED PART}}$ 4 BITS:
| $a_3$ | $a_2$ | $a_1$ | $a_0$ |

↑ UNSIGNED PART

SIGNED PART (EXPRESSION 1-2)
$$B = -b_{n-1}2^{n-1} + b_{n-2}2^{n-2} + \cdots + b_1 2^1 + b_0 2^0$$

$$= -b_{n-1}2^{n-1} + \sum_{j=0}^{n-2} b_j 2^j$$

$\underbrace{\phantom{-b_{n-1}2^{n-1}}}_{\text{SIGNED PART}}$ $\underbrace{\phantom{\sum b_j 2^j}}_{\text{UNSIGNED PART}}$ 4 BITS:
| $b_3$ | $b_2$ | $b_1$ | $b_0$ |

↑ UNSIGNED PART

SIGNED PART (EXPRESSION 1-3)
$$D = d_{n-1}2^{-1} + d_{n-2}2^{-2} + \cdots + d_0 2^{-n}$$

$$= \sum_{i=0}^{n-1} d_i 2^{(i-n)}$$

4 BITS:
0.| $d_3$ | $d_2$ | $d_1$ | $d_0$ |

FIG. 4

(EXPRESSION 1-4)
$$C = (1-D)*A + D*B$$

$$= \underbrace{\left(1 - \sum_{i=0}^{n-1} d_i 2^{(i-n)}\right)}_{1-D} \cdot \underbrace{\left(-a_{n-1} 2^{n-1} + \sum_{j=0}^{n-2} a_j 2^j\right)}_{A}$$

$$+ \underbrace{\left(\sum_{i=0}^{n-1} d_i 2^{(i-n)}\right)}_{D} \cdot \underbrace{\left(-b_{n-1} 2^{n-1} + \sum_{j=0}^{n-2} b_j 2^j\right)}_{B}$$

DEVELOPED AND REARRANGED AS FOLLOWS:

(EXPRESSION 1-5)
$$C = -a_{n-1} 2^{n-1} + a_{n-1} 2^{n-1} \cdot \sum_{i=0}^{n-1} d_i 2^{(i-n)} + \sum_{j=0}^{n-2} a_j 2^j$$

$$\underbrace{-\sum_{i=0}^{n-1} d_i 2^{(i-n)} \cdot \sum_{j=0}^{n-2} a_j 2^j}_{-D}$$

$$+ b_{n-1} 2^{n-1} \cdot \left(-\sum_{i=0}^{n-1} d_i 2^{(i-n)}\right)$$

$$+ \sum_{i=0}^{n-1} d_i 2^{(i-n)} \cdot \sum_{j=0}^{n-2} b_j 2^j$$

FIG. 5

$$(\text{EXPRESSION 1-6}) \quad \sum_{i=0}^{n-1} 2^{(i-n)} + 2^{-n} = 1$$

THEREFORE, $$(\text{EXPRESSION 1-7}) \quad \sum_{i=0}^{n-1} 2^{(i-n)} + 2^{-n} - 1 = 0$$

$$(\text{EXPRESSION 1-8}) \quad -D = 0 - D$$

$$= \underbrace{\sum_{i=0}^{n-1} 2^{(i-n)} + 2^{-n} - 1}_{0} \quad \text{FROM (EXPRESSION 1-7)}$$

$$- \underbrace{\sum_{i=0}^{n-1} d_i 2^{(i-n)}}_{D} \quad \text{FROM (EXPRESSION 1-3)}$$

THIS IS TRANSFORMED AS FOLLOWS :

$$(\text{EXPRESSION 1-9}) \quad -D = \sum_{i=0}^{n-1} 2^{(i-n)} - \sum_{i=0}^{n-1} d_i 2^{(i-n)} + 2^{-n} - 1$$

$$= \sum_{i=0}^{n-1} (1 - d_i) 2^{(i-n)} + 2^{-n} - 1$$

$$(\text{EXPRESSION 1-10}) \quad -D = \sum_{i=0}^{n-1} e_i 2^{(i-n)} + 2^{-n} - 1$$

FIG. 6

(EXPRESSION 1-11)

$$C = -a_{n-1}2^{n-1} + \left[a_{n-1}2^{n-1} \cdot \sum_{i=0}^{n-1} d_i 2^{(i-n)}\right] + \sum_{j=0}^{n-2} a_j 2^j$$

$$+ \left(\sum_{i=0}^{n-1} e_i 2^{(i-n)} + 2^{-n} - 1\right) \cdot \sum_{j=0}^{n-2} a_j 2^j$$

$-D$ $$+ \left[b_{n-1}2^{n-1}\right] \cdot \left(\sum_{i=0}^{n-1} e_i 2^{(i-n)} + 2^{-n} - 1\right)$$

$$+ \sum_{i=0}^{n-1} d_i 2^{(i-n)} \cdot \sum_{j=0}^{n-2} b_j 2^j$$

$$\left[a_{n-1} \sum_{i=0}^{n-1} d_i 2^{(i-1)}\right] \quad \left[b_{n-1} \sum_{i=0}^{n-1} e_i 2^{(i-1)}\right]$$

(EXPRESSION 1-12)

$$C = \boxed{-(a_{n-1} + b_{n-1})\, 2^{n-1}} \quad \text{-- SIGNED PART}$$

$$+ \boxed{b_{n-1}\, 2^{-1} + \left(a_{n-1} \sum_{i=0}^{n-1} d_i 2^{(i-1)} + b_{n-1} \sum_{i=0}^{n-1} e_i 2^{(i-1)}\right)}$$

-- UNSIGNED PART 1

$$+ \boxed{\left(2^{-n} + \sum_{i=0}^{n-1} e_i\, 2^{(i-n)}\right) \cdot \sum_{j=0}^{n-2} a_j 2^j + \sum_{i=0}^{n-1} d_i 2^{(i-n)} \cdot \sum_{j=0}^{n-2} b_j 2^j}$$

-- UNSIGNED PART 2

HERE, $e_i$ IS A LOGICALLY INVERTED BIT OF $d_i$.

$$(e_i = \overline{d_i})$$

WHEN A, B, AND D ARE 4-BIT DATA (n=4)

(EXPRESSION 1-13)

$$C = \underbrace{-(a_3 + b_3)2^3}_{\text{SIGNED PART}}$$

$$\underbrace{+ b_3 2^{-1} + \left(a_3 \sum_{i=0}^{3} d_i 2^{i-1} + b_3 \sum_{i=0}^{3} e_i 2^{i-1}\right)}_{\text{UNSIGNED PART 1}}$$

$$\underbrace{+ 2^{-4} \sum_{j=0}^{2} a_j 2^j + \sum_{i=0}^{3} e_i 2^{i-4} \cdot \sum_{j=0}^{2} a_j 2^j + \sum_{i=0}^{3} d_i 2^{i-4} \cdot \sum_{j=0}^{2} b_j 2^j}_{\text{UNSIGNED PART 2}}$$

FIG. 10

(EXPRESSION 1-14)

$$C = \boxed{-(a_3+b_3)2^3} \text{ -- SIGNED PART}$$

$$\left(a_3 \sum_{i=0}^{3} d_i 2^{i-1}\right) \Rightarrow \begin{array}{l} +b_3\, 2^{-1} \\ +a_3\, d_0\, 2^{-1} + a_3\, d_1\, 2^0 + a_3\, d_2\, 2^1 + a_3\, d_3\, 2^2 \end{array}$$

$$\left(b_3 \sum_{i=0}^{3} e_i 2^{i-1}\right) \Rightarrow +b_3\, e_0\, 2^{-1} + b_3\, e_1\, 2^0 + b_3\, e_2\, 2^1 + b_3\, e_3\, 2^2$$

-- UNSIGNED PART 1

$$2^{-4} \sum_{j=0}^{2} a_j 2^j \Rightarrow +a_0\, 2^{-4} + a_1\, 2^{-3} + a_2\, 2^{-2} \quad \text{①}$$

$$\sum_{i=0}^{3} e_i 2^{i-4} \cdot \sum_{j=0}^{2} a_j 2^j \begin{cases} +a_0\, e_0\, 2^{-4} + a_1\, e_0\, 2^{-3} + a_2\, e_0\, 2^{-2} & \text{②} \\ +a_0\, e_1\, 2^{-3} + a_1\, e_1\, 2^{-2} + a_2\, e_1\, 2^{-1} & \text{③} \\ +a_0\, e_2\, 2^{-2} + a_1\, e_2\, 2^{-1} + a_2\, e_2\, 2^{0} & \text{④} \\ +a_0\, e_3\, 2^{-1} + a_1\, e_3\, 2^{0} + a_2\, e_3\, 2^{1} & \text{⑤} \end{cases}$$

$$\sum_{i=0}^{3} d_i 2^{i-4} \cdot \sum_{j=0}^{2} b_j 2^j \begin{cases} +b_0\, d_0\, 2^{-4} + b_1\, d_0\, 2^{-3} + b_2\, d_0\, 2^{-2} & \text{⑥} \\ +b_0\, d_1\, 2^{-3} + b_1\, d_1\, 2^{-2} + b_2\, d_1\, 2^{-1} & \text{⑦} \\ +b_0\, d_2\, 2^{-2} + b_1\, d_2\, 2^{-1} + b_2\, d_2\, 2^{0} & \text{⑧} \\ +b_0\, d_3\, 2^{-1} + b_1\, d_3\, 2^{0} + b_2\, d_3\, 2^{1} & \text{⑨} \end{cases}$$

-- UNSIGNED PART 2

BIT $C_4$ ARITHMETIC UNIT

BIT $C_3$ ARITHMETIC UNIT

FIG. 18

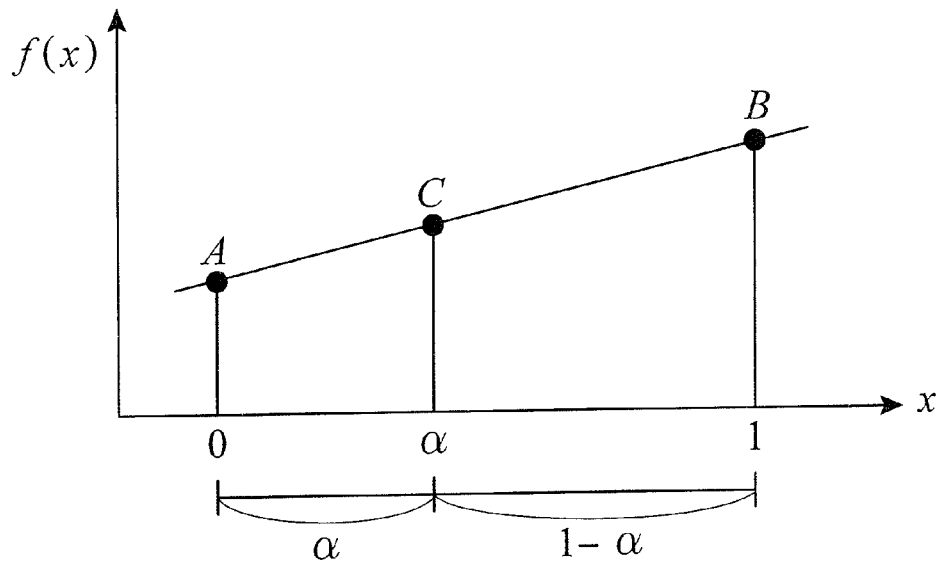

$$C = (1-\alpha)*A + \alpha*B \quad \text{(WHERE } 0 \leq \alpha \leq 1\text{)}$$

FIG. 19

$\begin{cases}\end{cases}$ (EXPRESSION 2-1)
$$A = \sum_{i=0}^{7} a_i 2^i = a_0 2^0 + a_1 2^1 + \cdots + a_7 2^7$$

(EXPRESSION 2-2)
$$B = \sum_{i=0}^{7} b_i 2^i = b_0 2^0 + b_1 2^1 + \cdots + b_7 2^7$$

(EXPRESSION 2-3)
$$D = \sum_{i=0}^{7} d_i 2^i = d_0 2^0 + d_1 2^1 + \cdots + d_7 2^7$$

(EXPRESSION 2-4)
$$C = \sum_{i=0}^{15} c_i 2^{(i-8)} = c_0 2^{-8} + c_1 2^{-7} + \cdots + c_7 2^{-1} \quad \text{(DECIMAL PART)}$$
$$+ c_8 2^0 + c_9 2^1 + \cdots + c_{15} 2^7 \quad \text{(INTEGER PART)}$$

(EXPRESSION 2-5)
$$\alpha = \frac{1}{2^8 - 1} * D = \frac{1}{255} * D$$

$C:$ | $c_{15}$ | $c_{14}$ | $c_{13}$ | $c_{12}$ | $c_{11}$ | $c_{10}$ | $c_9$ | $c_8$ | (INTEGER PART)
| $c_7$ | $c_6$ | $c_5$ | $c_4$ | $c_3$ | $c_2$ | $c_1$ | $c_0$ | (DECIMAL PART)

FIG. 21

(EXPRESSION 2-6)  (BINARY EXPRESSION)

$$\frac{1}{255} = 0.0000000\dot{1}$$

$$= 0.000000010000000100000000100\cdots$$

(EXPRESSION 2-7)

$$\alpha = \frac{1}{255} * D$$

$$= 0.\underbrace{d_7 d_6 d_5 d_4 d_3 d_2 d_1 d_0}_{\text{BIT SEQUENCE OF 8 BITS COMPOSING D}}\underbrace{d_7 d_6 d_5 d_4 d_3 d_2 d_1 d_0}_{\text{BIT SEQUENCE OF 8 BITS COMPOSING D}} d_7 \cdots$$

FIG. 22

$$2^{-1}\ 2^{-2}\ 2^{-3}\ 2^{-4}\ 2^{-5}\ 2^{-6}\ 2^{-7}\ 2^{-8}\ 2^{-9}\quad \text{(DIGIT POSITION)}$$

$$\alpha = 0.\ d_7\ d_6\ d_5\ d_4\ d_3\ d_2\ d_1\ d_0\ d_7\ \cdots\cdots\cdots\cdots\cdots$$

THE DIGIT OF $2^{-9}$ IS CUT WHEN IT IS 0 AND CARRIED WHEN IT IS 1.

⇩

(WHEN $d_7 = 0$)
$$\alpha' = 0.\ d_7\ d_6\ d_5\ d_4\ d_3\ d_2\ d_1\ d_0$$

(WHEN $d_7 = 1$)
$$\alpha' = 0.\ d_7\ d_6\ d_5\ d_4\ d_3\ d_2\ d_1\ d_0$$
$$+\ 0.\ 0\ 0\ 0\ 0\ 0\ 0\ 1$$

CARRY FROM THE DIGIT OF $2^{-9}$

FIG. 23

(EXPRESSION 2-8)
$$\alpha' = 0.\ d_7\ d_6\ d_5\ d_4\ d_3\ d_2\ d_1\ d_0$$
$$+\ 0.\ 0\ 0\ 0\ 0\ 0\ 0\ 0\ d_7$$

PROVIDED THAT $0.\ d_7\ d_6\ d_5\ d_4\ d_3\ d_2\ d_1\ d_0 = \sum_{j=0}^{7} d_j 2^{(j-8)}$ $0.\ 0\ 0\ 0\ 0\ 0\ 0\ 0\ d_7 = d_7 2^{-8}$ THEREFORE, (EXPRESSION 2-9)
$$\alpha' = \sum_{j=0}^{7} d_j 2^{(j-8)} + d_7 2^{-8}$$

FIG. 24

(EXPRESSION 2-10)
$$C = (1 - \alpha') * A + \alpha' * B$$
$$= \left[ 1 - \left( \sum_{j=0}^{7} d_j 2^{(j-8)} + d_7 2^{-8} \right) \right] * \sum_{i=0}^{7} a_i 2^i$$
$$+ \left( \sum_{j=0}^{7} d_j 2^{(j-8)} + d_7 2^{-8} \right) * \sum_{i=0}^{7} b_i 2^i$$

FIG. 25

$$\begin{cases} \text{(EXPRESSION 2-11)} \quad \sum_{j=0}^{n-1} 2^{(j-n)} + 2^{-n} = 1 \\ \\ \text{(EXPRESSION 2-12)} \quad \sum_{j=0}^{7} 2^{(j-8)} + 2^{-8} = 1 \end{cases}$$

FIG. 26

(EXPRESSION 2-13)

$$\left[ 1 - \left( \sum_{j=0}^{7} d_j 2^{(j-8)} + d_7 2^{-8} \right) \right]$$

$$= \sum_{j=0}^{7} 2^{(j-8)} + 2^{-8} - \sum_{j=0}^{7} d_j 2^{(j-8)} - d_7 2^{-8}$$

$$= \sum_{j=0}^{7} (1 - d_j) 2^{(j-8)} + (1 - d_7) 2^{-8}$$

$$= \sum_{j=0}^{7} e_j 2^{(j-8)} + e_7 2^{-8}$$

HERE, $e_j$ IS A LOGICALLY INVERTED BIT OF $d_j$.

$$\left( e_j = \overline{d_j} = 1 - d_j \right)$$

FIG. 27

(EXPRESSION 2-14)

$$C = \left( \sum_{j=0}^{7} e_j 2^{(j-8)} + e_7 2^{-8} \right) * \sum_{i=0}^{7} a_i 2^{i}$$

$$+ \left( \sum_{j=0}^{7} d_j 2^{(j-8)} + d_7 2^{-8} \right) * \sum_{i=0}^{7} b_i 2^{i}$$

$$= \sum_{j=0}^{7} e_j 2^{(j-8)} * \sum_{i=0}^{7} a_i 2^{i} \quad \cdots\cdots \text{①}$$

$$+ \; e_7 2^{-8} * \sum_{i=0}^{7} a_i 2^{i} \quad \cdots\cdots \text{②}$$

$$+ \sum_{j=0}^{7} d_j 2^{(j-8)} * \sum_{i=0}^{7} b_i 2^{i} \quad \cdots\cdots \text{③}$$

$$+ \; d_7 2^{-8} * \sum_{i=0}^{7} b_i 2^{i} \quad \cdots\cdots \text{④}$$

$$\begin{cases} \text{(EXPRESSION 2-1}n\text{)} \\ \qquad A = \sum_{i=0}^{n-1} a_i 2^i = a_0 2^0 + a_1 2^1 + \cdots + a_{n-1} 2^{(n-1)} \\ \\ \text{(EXPRESSION 2-2}n\text{)} \\ \qquad B = \sum_{i=0}^{n-1} b_i 2^i = b_0 2^0 + b_1 2^1 + \cdots + b_{n-1} 2^{(n-1)} \\ \\ \text{(EXPRESSION 2-3}n\text{)} \\ \qquad D = \sum_{i=0}^{n-1} d_i 2^i = d_0 2^0 + d_1 2^1 + \cdots + d_{n-1} 2^{(n-1)} \\ \\ \text{(EXPRESSION 2-4}n\text{)} \\ \qquad C = \sum_{i=0}^{2n-1} c_i 2^{(i-n)} \\ \qquad \quad = c_0 2^{-n} + c_1 2^{-(n-1)} + \cdots + c_{n-1} 2^{-1} \text{ (DECIMAL PART)} \\ \qquad \qquad + c_n 2^0 + c_{n+1} 2^1 + \cdots + c_{2n-1} 2^{(n-1)} \text{ (INTEGER PART)} \\ \\ \text{(EXPRESSION 2-5}n\text{)} \\ \qquad \alpha = \frac{1}{2^n - 1} * D \end{cases}$$

$C:$ | $c_{2n-1}$ | $c_{2n-2}$ | $c_{2n-3}$ | ----- | $c_{n+2}$ | $c_{n+1}$ | $c_n$ | (INTEGER PART)
| $c_{n-1}$ | $c_{n-2}$ | $c_{n-3}$ | ----- | $c_2$ | $c_1$ | $c_0$ | (DECIMAL PART)

FIG. 31

(EXPRESSION 2-6n)

(BINARY EXPRESSION)

$$\frac{1}{2^n-1} = 0.\underbrace{0000 \cdots\cdots 000\dot{1}}_{n \text{ DIGITS}}$$

(EXPRESSION 2-7n)

$$\alpha = \frac{1}{2^n-1} * D$$

$$= 0.\underbrace{d_{n-1}d_{n-2}\cdots\cdots\cdots d_0}_{n \text{ BITS COMPOSING D}}\underbrace{d_{n-1}d_{n-2}\cdots\cdots\cdots d_0}_{n \text{ BITS COMPOSING D}}d_{n-1}\cdots\cdots$$

FIG. 32

$$\alpha = 0.\underset{2^{-1}}{d_{n-1}}\ \underset{2^{-2}}{d_{n-2}}\ \underset{2^{-3}}{d_{n-3}}\cdots\cdots\cdots\ \underset{2^{-n}}{d_0}\ \underset{2^{-(n+1)}}{d_{n-1}}\cdots\cdots\cdots\cdots\ \text{(DIGIT POSITION)}$$

DIGIT OF $2^{-(n+1)}$ IS CUT WHEN IT IS 0 AND CARRIED WHEN IT IS 1.

⇩

(WHEN $d_{n-1} = 0$)
$$\alpha' = 0.\ d_{n-1}\ d_{n-2}\ d_{n-3}\cdots\cdots\cdots\ d_0$$

(WHEN $d_{n-1} = 1$)
$$\alpha' = 0.\ d_{n-1}\ d_{n-2}\ d_{n-3}\cdots\cdots\cdots\ d_0$$
$$+\ 0.\ 0\ \ \ 0\ \ \ 0\ \cdots\cdots\cdots\ 1$$

CARRY FROM THE DIGIT OF $2^{-(n+1)}$

FIG. 33

$\Biggl\{$
(EXPRESSION 2–8$n$)
$$\alpha' = 0.\ d_{n-1}\ d_{n-2}\ d_{n-3}\cdots\cdots\cdots\ d_0$$
$$+\ 0.\ 0\ \ \ 0\ \ \ 0\ \cdots\cdots\cdots\ d_{n-1}$$

PROVIDED THAT
$$0.\ d_{n-1}\ d_{n-2}\ d_{n-3}\cdots\cdots\cdots\ d_0 = \sum_{j=0}^{n-1} d_j 2^{(j-n)}$$

$$0.\ 0\ \ \ 0\ \ \ 0\ \cdots\cdots\cdots\ d_{n-1} = d_{n-1} 2^{-n}\ \text{THEREFORE,}$$

(EXPRESSION 2–9$n$)
$$\alpha' = \sum_{j=0}^{n-1} d_j 2^{(j-n)} + d_{n-1} 2^{-n}$$

FIG. 34

(EXPRESSION 2-10$n$)

$$C = (1 - \alpha') * A + \alpha' * B$$

$$= \left[ 1 - \left( \sum_{j=0}^{n-1} d_j 2^{(j-n)} + d_{n-1} 2^{-n} \right) \right] * \sum_{i=0}^{n-1} a_i 2^i$$

$$+ \left( \sum_{j=0}^{n-1} d_j 2^{(j-n)} + d_{n-1} 2^{-n} \right) * \sum_{i=0}^{n-1} b_i 2^i$$

FIG. 35

(EXPRESSION 2-13$n$)

$$\left[ 1 - \left( \sum_{j=0}^{n-1} d_j 2^{(j-n)} + d_{n-1} 2^{-n} \right) \right]$$

$$= \sum_{j=0}^{n-1} e_j 2^{(j-n)} + e_{n-1} 2^{-n}$$

HERE, $e_j$ IS A LOGICALLY INVERTED BIT OF $d_j$.

$$(e_j = \overline{d_j} = 1 - d_j)$$

FIG. 36

(EXPRESSION 2-14n)

$$C = \left(\sum_{j=0}^{n-1} e_j 2^{(j-n)} + e_{n-1} 2^{-n}\right) * \sum_{i=0}^{n-1} a_i 2^i$$

$$+ \left(\sum_{j=0}^{n-1} d_j 2^{(j-n)} + d_{n-1} 2^{-n}\right) * \sum_{i=0}^{n-1} b_i 2^i$$

$$= \sum_{j=0}^{n-1} e_j 2^{(j-n)} * \sum_{i=0}^{n-1} a_i 2^i \quad \cdots\cdots ①$$

$$+ \; e_{n-1} 2^{-n} * \sum_{i=0}^{n-1} a_i 2^i \quad \cdots\cdots ②$$

$$+ \sum_{j=0}^{n-1} d_j 2^{(j-n)} * \sum_{i=0}^{n-1} b_i 2^i \quad \cdots\cdots ③$$

$$+ \; d_{n-1} 2^{-n} * \sum_{i=0}^{n-1} b_i 2^i \quad \cdots\cdots ④$$

FIG. 37

(EXPRESSION 2-15)

$$C = \left( \sum_{j=0}^{3} e_j 2^{(j-4)} + e_3 2^{-4} \right) * \sum_{i=0}^{3} a_i 2^i$$

$$+ \left( \sum_{j=0}^{3} d_j 2^{(j-4)} + d_3 2^{-4} \right) * \sum_{i=0}^{3} b_i 2^i$$

$$= \sum_{j=0}^{3} e_j 2^{(j-4)} * \sum_{i=0}^{3} a_i 2^i \quad \cdots\cdots \text{①}$$

$$+ \; e_3 2^{-4} * \sum_{i=0}^{3} a_i 2^i \quad \cdots\cdots \text{②}$$

$$+ \sum_{j=0}^{3} d_j 2^{(j-4)} * \sum_{i=0}^{3} b_i 2^i \quad \cdots\cdots \text{③}$$

$$+ \; d_3 2^{-4} * \sum_{i=0}^{3} b_i 2^i \quad \cdots\cdots \text{④}$$

FIG. 38

| | | $a_3e_3$ | $a_2e_3$ | $a_1e_3$ | $a_0e_3$ | | ① ($j=3$) |
|---|---|---|---|---|---|---|---|
| | | $b_3d_3$ | $b_2d_3$ | $b_1d_3$ | $b_0d_3$ | | ③ ($j=3$) |
| | | | $a_3e_2$ | $a_2e_2$ | $a_1e_2$ | $a_0e_2$ | ① ($j=2$) |
| | | | $b_3d_2$ | $b_2d_2$ | $b_1d_2$ | $b_0d_2$ | ③ ($j=3$) |
| | | | | $a_3e_1$ | $a_2e_1$ | $a_1e_1$ | $a_0e_1$ | ① ($j=1$) |
| | | | | $b_3d_1$ | $b_2d_1$ | $b_1d_1$ | $b_0d_1$ | ③ ($j=3$) |
| | | | | | $a_3e_0$ | $a_2e_0$ | $a_1e_0$ | $a_0e_0$ | ① ($j=0$) |
| | | | | | $b_3d_0$ | $b_2d_0$ | $b_1d_0$ | $b_0d_0$ | ③ ($j=3$) |
| | | | | | $a_3e_3$ | $a_2e_3$ | $a_1e_3$ | $a_0e_3$ | ② |
| | | | | | $b_3d_3$ | $b_2d_3$ | $b_1d_3$ | $b_0d_3$ | ④ |
| $2^3$ | $2^2$ | $2^1$ | $2^0$ | $2^{-1}$ | $2^{-2}$ | $2^{-3}$ | $2^{-4}$ | SCALING POSITION |
| $c_7$ | $c_6$ | $c_5$ | $c_4$ | $c_3$ | $c_2$ | $c_1$ | $c_0$ | BIT |

INTEGER PART ― DECIMAL PART

DECIMAL POINT POSITION

INTERPOLATOR AND DESIGNING METHOD THEREOF

CROSS REFERENCE APPLICATIONS

This application is a divisional of U.S. patent application Ser. No. 11/523,351 filed Sep. 19, 2006, now U.S. Pat. No. 7,840,623 which claimed priority to Japanese Patent Application No. 2005-277463/05 filed Sep. 26, 2005; 2006-037944/06 filed Feb. 15, 2006 and 2006-045471/06 filed Feb. 22, 2006, the contents of which are incorporated herein by reference.

BACKGROUND OF THE INVENTION

The invention disclosed in the present application relates to a linear interpolator and a designing method thereof. More specifically, the present invention relates to a technique for calculating a linear interpolated value of two signed interpolation target values by a hardware circuit, and to a technique for realizing a simple hardware circuit which can calculate a high-accuracy linear interpolated value.

As a method for obtaining an intermediate value of two values by means of interpolation, linear interpolation is most representative. Recently, in particular, as a method for image processing, this linear interpolation is popularly utilized. For example, the method for image synthesis generally called "α-blend" is a method in which an image A and an image B are synthesized at a ratio of $\alpha:(1-\alpha)$ ($0 \leq \alpha \leq 1$), and processing for obtaining an intermediate value of a pixel value of the image A and a pixel value of the image B by means of linear interpolation is performed. Also when enlarging or reducing an image at an arbitrary magnification, linear interpolation is used.

The basic principle of linear interpolation is that calculation is performed for obtaining a linear interpolated value C expressed as $C=(1-D)*A+D*B$ (* sign representing multiplication) based on two interpolation target values A and B and an interpolation rate D (a value corresponding to said α, $0 \leq D \leq 1$). When performing arithmetic operations based on this expression by using a digital computing unit, A, B, C, and D are all handled as digital data, and normally, the interpolation rate D is expressed by a bit sequence having finite digits showing only a decimal part. In this case, the interpolation rate D is handled as a value satisfying "$0 \leq D<1$" which does not include 1. U.S. Pat. No. 5,113,362 discloses a configuration of a computing unit which performs such linear interpolation (α-blend operation) by pipeline processing, and U.S. Pat. No. 5,517,437 discloses a configuration of a computing unit which performs linear interpolation by processing based on parallel processing.

The computing units disclosed in the patent documents and other conventional general linear interpolators assume that the interpolation target values are positive values. Normally, since pixel values of individual pixels composing an image are expressed as positive values, as the "α-blend" processing for general images, linear interpolation based on two positive pixel values is sufficient, and calculation can be performed by the computing units disclosed in the patent documents. However, recently, various image processes are applied, and an opportunities to handle an image including negative pixel values are quite many in number. For example, when it is necessary to subtract a pixel value of an image B from a pixel value of an image A in some process, an image C obtained as a result of this subtraction may include pixels with negative pixel values. As a matter of course, the use of the linear interpolation is not limited to the image processing, so that there are many other events that linear interpolation considering both positive and negative values becomes necessary.

To meet this demand, there have been proposed some computing units which can execute linear interpolation for two signed interpolation target values. However, all the signed linear interpolators which are conventionally proposed employ complicated circuitries for realizing a function to handle signed digital data, and cannot perform efficient calculation.

The linear interpolators which are conventionally proposed hardly satisfy both of calculation accuracy and circuit simplicity, and either one must be sacrificed. For example, the above-mentioned linear interpolator disclosed in U.S. Pat. No. 5,517,437 is comparatively simple in circuitry, however, an approximate value is obtained as a result of calculation, and instead of the original interpolation rate α ($0 \leq \alpha \leq 1$), handling using a value D ($0 \leq D<1$) that does not include 1 is performed, so that a result of calculation when α=1 cannot be correctly obtained. Therefore, to make it possible to correctly obtain a result of calculation when α=1, it is necessary that a comparator for monitoring whether an input value of the interpolation rate α is 1 is given and an extra circuit for outputting an input value B as it is, and the circuitry inevitably becomes complicated.

On the other hand, a method in which a highly accurate result of calculation is obtained by performing division is also proposed, however, the circuitry is still complicated.

Recently, an opportunity to synthesize many images has increased. Therefore, a linear interpolator which always obtains a high-accuracy result of calculation has been demanded. On the other hand, downsizing and cost reduction of a circuit are also demanded, so that a linear interpolator whose circuitry is made as simple as possible has been demanded.

The present application also discloses a technique relating to a linear interpolation device which performs not only the above-described linear interpolation but also more complicated interpolation. Particularly, a technique relating to an interpolation device which performs interpolation of pixels by cubic spline interpolation when scaling display is performed by enlarging or reducing an image has been disclosed.

When displaying a digital image, scaling of enlargement and reduction often becomes necessary. An image given as digital data is a two-dimensional pixel array including a plurality of pixels having predetermined pixel values arrayed at predetermined pitches, so that in the case of enlargement and reduction, new pixels must be obtained by interpolation. As an interpolation method conventionally used for this image enlargement and reduction scaling, nearest neighbor and bilinear interpolation are known.

The nearest neighbor is a method for selecting a nearest sample pixel, so that in the case of reduction, by using a kind of pixel skipping, an image does not become blurred in scaling display. To the contrary, in the case of enlargement, several neighbor identical images are continuously spread, and this results in a flat mosaic image display.

On the other hand, according to bilinear interpolation, linear interpolation is performed by using pixel values of sample pixels on both ends of an interpolation interval, so that pixel values become different from original pixel values in the case of reduction and may result in collapsed image display. To the contrary, in the case of enlargement, pixel values subjected to linear interpolation are filled, so that a blurred image may be displayed. Thus, nearest neighbor and bilinear interpolation are poor in interpolation accuracy, so that it is considered that these defects arise.

Therefore, as interpolation with improved accuracy, for example, a basic concept of cubic convolution is shown in Robert G. Keys, "Cubic Convolution Interpolation for Digital Images Processing" IEEE Trans. on ASSP-29, No. 6, December 1981, pp. 1153-1160. In image scaling display of a digital television, as a bicubic image interpolation calculation with more improved accuracy, bicubic convolution is used. For example, in a medical-use image, scale display with much higher accuracy is required. Therefore, to employ higher-accurate interpolation, bicubic spline interpolation is proposed. A basic concept of cubic spline interpolation that is the base of the bicubic spline interpolation is shown in Hsieh S. Hou and Harry C. Andrews, "Cubic Splines for Image Interpolation and Digital Filtering" IEEE Trans. on ASSP-26, No. 6, December 1978, pp. 508-517, and Michael Unser, "Splines A perfect Fit for Signal and Image processing" IEEE Signal Processing Magazine, November 1999, pp. 22-38.

In the above-described cubic convolution, by using pixel values of (horizontal 4)*(vertical 4)=16 sample pixels, vertical 4-pixel interpolation is performed after horizontal 4-pixel interpolation, and cubic interpolation is performed two times in total per one pixel to be obtained. Thus, in convolution, four cubic curves are used and these are smoothly connected at boundaries among these. In actuality, this unknown coefficients equation has not been completely solved, and 1 coefficient is left undetermined. Therefore, −1 and −½ is experimentally used as the undetermined coefficient value, and meaning and accuracy of the interpolation are ambiguous.

On the other hand, in cubic spline interpolation, four cubic curves are used similarly to the convolution in the interpolation interval, and this interpolation is different in meaning and composition of the expressions from the convolution because the cubic spline interpolation attempts to realize faithful approximation by blending these curves. The number of sample pixels to be used for interpolation is not necessarily four, and may be more than four. Namely, the number of weighing factors when blending four cubic curves called B-splines in the interpolation interval is four. Therefore, the cubic spline interpolation has approximation accuracy higher than that of the convolution, however, cubic interpolation equations are calculated through complicated processes. Particularly, a process for calculating respective cubic spline functions from pixel values of S in total of sample pixels ($S \geq 4$) to be referred for interpolation and a process for obtaining pixel values of interpolation points by setting positions of the interpolation points and performing bicubic spline interpolation, are extremely complicated, and at the present, in the case of image enlargement and reduction scaling display being performed, a device which performs practicable cubic spline interpolation suitable for commercial use has not been realized.

SUMMARY OF THE INVENTION

In the present application, the following three inventions are disclosed in order.

<<<<<First Aspect of the Invention>>>>>

An object of a first aspect of the invention is to provide a linear interpolator which can efficiently execute linear interpolation of two signed interpolation target values by a simple constitution, and to provide a method for designing such an interpolator.

(1) The first feature of the first aspect of the invention resides in a linear interpolator which performs operations to calculate a linear interpolated value C expressed by an expression of $C=(1-D)*A+D*B$ based on two signed interpolation target values A and B and an interpolation rate D ($0 \leq D < 1$), comprising:

first interpolation target value input means for inputting an interpolation target value A including bits $a_{n-1}, a_{n-2}, \ldots, a_1$, and $a_0$ in order from the most significant bit side as digital data of n bits in total expressing a negative number by twos complement notation, composed of a signed part consisting of the most significant bit that indicates a sign and an unsigned part consisting of (n−1) bits that indicate an absolute value ($n \geq 2$);

second interpolation target value input means for inputting an interpolation target value B including bits $b_{n-1}, b_{n-2}, \ldots, b_1$, and $b_0$ in order from the most significant bit side as digital data of n bits in total expressing a negative number by twos complement notation, composed of a signed part consisting of the most significant bit that indicates a sign and an unsigned part consisting of (n−1) bits that indicate an absolute value ($n \geq 2$);

interpolation rate input means for inputting an interpolation rate D including bits $d_{n-1}, d_{n-2}, \ldots, d_1$, and $d_0$ in order from the most significant bit side as digital data of n bits indicating only a decimal part;

unsigned part arithmetic means for generating digital data of (2n−1) bits in total including bits $c_{2n-2}, c_{2n-3}, \ldots, c_1$, and $c_0$ in order from the most significant bit side by performing arithmetic operations based on an arithmetic expression of $b_{n-1}2^{-1}+(a_{n-1}\Sigma_{i=-n-1}d_i 2^{(i-1)}+b_{n-1}\Sigma_{i=0-n-1}e_i 2^{(i-1)})+(2^{-n}+\Sigma_{i=0-n-1}e_i 2^{(i-1)})\cdot\Sigma_{j=0-n-2}a_j 2^j+\Sigma_{i=0-n-1}d_i 2^{(i-n)}\cdot\Sigma_{j=0-n-2}b_j 2^j$ ($e_i$ is a logically inverted bit of $d_i$);

signed part arithmetic means which calculates a binary number obtained by summing up a result of operation of $a_{n-1}+b_{n-1}$ (any of 0, 1, and 10 in binary expression) and a carry (either 0 or 1 in binary expression) from a digit of the bit $c_{2n-2}$ obtained as a result of operation by the unsigned part arithmetic means, and when a calculated binary number is 1 bit, calculates this bit, and when a calculated binary number is 2 bits, calculates a lower-order bit as the value of the bit $c_{2n-1}$; and calculated value output means for outputting "digital data of 2n bits in total obtained by arranging the bits $c_{2n-1}, c_{2n-2}, c_{2n-3}, \ldots, c_1$, and $c_0$ in sequence in order from the most significant bit side" or "digital data corresponding to a necessary number of significant figures of the digital data of the 2n bits" as digital data indicating a linear interpolated value C.

(2) The second feature of the first aspect of the invention resides in the linear interpolator according to the first feature, wherein the unsigned part arithmetic means comprising:

a selector which selects and outputs either one of the bit $a_i$ and $b_i$ (i=0, 1, 2, ... (n−1)) based on a logical value of a predetermined bit of digital data indicating the interpolation rate D; and a counter which inputs the bit $a_i$ or $b_i$ (i=0, 1, 2, ... (n−1)), an output value of the selector or an output value of another counter, and outputs a result of addition of the inputted values.

(3) The third feature of the first aspect of the invention resides in the linear interpolator according to the first or second feature, wherein the signed part arithmetic means comprising:

a first XOR circuit which outputs an exclusive logical sum of the bit $a_{n-1}$ and the bit $b_{n-1}$; and a second XOR circuit which outputs an exclusive logical sum of a bit indicating a carry (either 0 or 1 in binary expression) from a digit of the bit $c_{2n-2}$ obtained as a result of operation by the unsigned part arithmetic means, and an output bit of the first XOR circuit.

(4) The fourth feature of the first aspect of the invention resides in a method for designing a linear interpolator which performs operations to calculate a linear interpolated value C expressed by an expression of $C=(1-D)*A+D*B$ based on two signed interpolation target values A and B and an interpolation rate D ($0 \leq D < 1$), comprising the steps of:

designing first interpolation target value input means for inputting an interpolation target value A including bits $a_{n-1}$, $a_{n-2}$, ..., $a_1$, and $a_0$ in order from the most significant bit side as digital data of n bits in total expressing a negative number by twos complement notation, composed of a signed part consisting of the most significant bit that indicates a sign and an unsigned part consisting of (n−1) bits that indicate an absolute value ($n \geq 2$);

designing second interpolation target value input means for inputting an interpolation target value B including bits $b_{n-1}$, $b_{n-2}$, ..., $b_1$, and $b_0$ in order from the most significant bit side as digital data of n bits in total expressing a negative number by twos complement notation, composed of a signed part consisting of the most significant bit that indicates a sign and an unsigned part consisting of (n−1) bits that indicate an absolute value ($n \geq 2$);

designing interpolation rate input means for inputting an interpolation rate D including bits $d_{n-1}$, $d_{n-2}$, ..., $d_1$, and $d_0$ in order from the most significant bit side as digital data of n bits indicating only a decimal part;

designing unsigned part arithmetic means for generating digital data of (2n−1) bits in total including bits $c_{2n-2}$, $c_{2n-3}$, ..., $c_1$, and $c_0$ in order from the most significant bit side by performing arithmetic operations based on an arithmetic expression of $b_{n-1}2^{-1}+(a_{n-1}\Sigma_{i=0 \sim n-1}d_i 2^{(i-1)}+b_{n-1}\Sigma_{i=0 \sim n-1}e_i 2^{(i-1)})+(2^{-n}+\Sigma_{i=0 \sim n-1}e_i 2^{(i-1)})\cdot \Sigma_{j=0 \sim n-2}a_j 2^j+\Sigma_{i=0 \sim n-1}d_i 2^{(i-n)}\cdot \Sigma_{j=0 \sim n-2}b_j 2^j$ ($e_i$ is a logically inverted bit of $d_i$);

designing signed part arithmetic means which calculates a binary number obtained by summing up a result of operation of $a_{n-1}+b_{n-1}$ (any of 0, 1, and 10 in binary expression) and a carry (either 0 or 1 in binary expression) from a digit of the bit $c_{2n-2}$ obtained as a result of operation by the unsigned part arithmetic means, and when a calculated binary number is 1 bit, calculates this bit, and when a calculated binary number is 2 bits, calculates a lower-order bit as the value of the bit $c_{2n-1}$; and designing calculated value output means for outputting "digital data of 2n bits in total obtained by arranging the bits $c_{2n-1}, c_{2n-2}, c_{2n-3}, \ldots, c_1$, and $c_0$ in sequence in order from the most significant bit side" or "digital data corresponding to a necessary number of significant figures of the digital data of the 2n bits" as digital data indicating a linear interpolated value C.

(5) The fifth feature of the first aspect of the invention resides in the method for designing a linear interpolator according to the fourth feature, wherein at the step of designing unsigned part arithmetic means, a design using:

a selector which selects and outputs either one of the bit $a_i$ or $b_i$ ($i=0, 1, 2, \ldots (n-1)$) based on a logical value of a predetermined bit of digital data indicating the interpolation rate D; and a counter which inputs the bit $a_i$ or $b_i$ ($i=0, 1, 2, \ldots (n-1)$), an output value of the selector or an output value of another counter, and outputs a result of addition of the inputted values, is made.

(6) The sixth feature of the first aspect of the invention resides in the method for designing a linear interpolator according to the fourth or fifth feature, wherein at the step of designing signed part arithmetic means, a design using:

a first XOR circuit which outputs an exclusive logical sum of the bit $a_{n-1}$ and the bit $b_{n-1}$; and a second XOR circuit which outputs an exclusive logical sum of a bit indicating a carry (either 0 or 1 in binary expression) from a digit of the bit $c_{2n-2}$ obtained as a result of operation by the unsigned part arithmetic means, and an output bit of the first XOR circuit, is made.

(7) The seventh feature of the first aspect of the invention resides in a method for designing a linear interpolator which performs operations to calculate a linear interpolated value expressed by an expression of $C=(1-D)*A+D*B$ based on two signed interpolation target values A and B and an interpolation rate D ($0 \leq D < 1$), wherein a linear interpolator is constituted so as to obtain a linear interpolated value C by performing multiplications and additions defined by an arithmetic expression of $C=-(a_{n-1}+b_{n-1})2^{n-1}+b_{n-1}2^{-1}+(a_{n-1}\Sigma_{i=0 \sim n-1}d_i 2^{(i-1)}+b_{n-1}\Sigma_{i=0 \sim n-1}e_i 2^{(i-1)})+(2^{-n}+\Sigma_{i=0 \sim n-1}e_i 2^{(i-1)}\cdot \Sigma_{j=0 \sim n-2}a_j 2^j+\Sigma_{i=0 \sim n-1}d_i 2^{(i-1)}\cdot \Sigma_{j=0 \sim n-2}b_j 2^j$ ($e_i$ is a logically inverted bit of $d_i$) by:

defining an interpolation target value A including bits $a_{n-1}$, $a_{n-2}$, ..., $a_1$, and $a_0$ in order from the most significant bit side as digital data of n bits in total expressing a negative number by twos complement notation, composed of a signed part consisting of the most significant bit that indicates a sign and an unsigned part consisting of (n−1) bits that indicate an absolute value ($n \geq 2$);

defining an interpolation target value B including bits $b_{n-1}$, $b_{n-2}$, ..., $b_1$, and $b_0$ in order from the most significant bit side as digital data of n bits in total expressing a negative number by twos complement notation, composed of a signed part consisting of the most significant bit that indicates a sign and an unsigned part consisting of (n−1) bits that indicate an absolute value ($n \geq 2$); and defining an interpolation rate D including bits $d_{n-1}$, $d_{n-2}$, ..., $d_1$, and $d_0$ in order from the most significant bit side as digital data of n bits indicating only a decimal part.

As described above, the linear interpolator according to the first aspect of the invention has circuitry according to arithmetic expressions in ideal forms, so that it becomes possible to efficiently execute linear interpolation of two signed interpolation target values by a simple constitution.

<<<<<Second Aspect of the Invention>>>>>

An object of a second aspect of the invention is to provide a linear interpolator which can calculate a linear interpolated value of two interpolation target values with high accuracy and has simple circuitry, and to provide a method for designing such an interpolator.

(1) The first feature of the second aspect of the invention resides in a linear interpolator which performs operations to calculate a linear interpolated value C expressed by an expression of $C=(1-\alpha)*A+\alpha*B$ based on two interpolation target values A and B and an interpolation rate α ($0 \leq \alpha \leq 1$), comprising:

first interpolation target value input means for inputting an interpolation target value A as digital data of n bits in total including bits $a_{n-1}, a_{n-2}, \ldots, a_1$, and $a_0$ in order from the most significant bit side;

second interpolation target value input means for inputting an interpolation target value B as digital data of n bits in total including bits $b_{n-1}, b_{n-2}, \ldots, b_1$, and $b_0$ in order from the most significant bit side;

interpolation rate determining value input means for inputting an interpolation rate determining value D having a relationship of "$\alpha=D/(2^{n-1})$" with the interpolation rate α, as digital data of n bits in total including bits $d_{n-1}, d_{n-2}, \ldots, d_1$, and $d_0$ in order from the most significant bit side;

arithmetic means for generating digital data of 2n bits in total composed of, in order from the most significant bit side, n bits in total of $c_{2n-1}, c_{2n-2}, \ldots, c_{n+1}$, and $c_n$ composing an integer part, and n bits in total of $c_{n-1}, c_{n-2}, \ldots, c_1$, and $c_0$ composing a decimal part by performing arithmetic operations based on an arithmetic expression of $C=(\Sigma_{j=0 \sim n-1} e_j 2^{(j-n)} + e_{n-1} 2^{-n})^* \Sigma_{i=0 \sim n-1} a_i 2^i + (\Sigma_{j=0 \sim n-1} d_j 2^{(j-n)} + d_{n-1} 2^{-n})^* \Sigma_{i=0 \sim n-1} b_i 2^i$ ($e_i$ is a logically inverted bit of $d_i$); and calculated value output means for outputting "digital data of 2n bits in total obtained by arranging the bits $c_{2n-1}, c_{2n-2}, c_{2n-3}, \ldots, c_1$, and $c_0$ in sequence in order from the most significant bit side" or "digital data corresponding to a necessary number of significant figures of the digital data of 2n bits" as digital data indicating a linear interpolated value C.

(2) The second feature of the second aspect of the invention resides in the linear interpolator according to the first feature, wherein the arithmetic means comprising:

a selector which selects and outputs either bit $a_i$ or $b_i$ (i=0, 1, 2, ... (n−1)) based on a logical value of a predetermined bit of digital data indicating an interpolation rate determining value D; and a counter which inputs the bit $a_i$ or $b_i$ (i=0, 1, 2, ... (n−1)), an output value of the selector or output value of another counter, and outputs a result of addition of the inputted values.

(3) The third feature of the second aspect of the invention resides in the linear interpolator according to the first or second feature, wherein to calculate a bit $c_{2n-1-2}$ (i=0, 1, 2, ... 2(n−1)) indicating a value of a digit of $2^{(n-i-2)}$ of the linear interpolated value C, the arithmetic means includes (2n−1) computing units which sum up coefficients of the digit and all carries from lower-order digits, output a sum as a value of the bit $c_{2n-i-2}$, and output carries to a higher-order digit, and outputs a carry from a computing unit which calculates the bit $c_{2n-2}$ as a value of the bit $c_{2n-1}$.

(4) The fourth feature of the second aspect of the invention resides in a method for designing a linear interpolator which performs arithmetic operations to calculate a linear interpolated value C expressed by an expression of $C=(1-\alpha)^*A + \alpha^*B$ based on two interpolation target values A and B and an interpolation rate $\alpha$ ($0 \leq \alpha \leq 1$), comprising the steps of:

designing first interpolation target value input means for inputting an interpolation target value A as digital data of n bits in total including bits $a_{n-1}, a_{n-2}, \ldots, a_1$, and $a_0$ in order from the most significant bit side;

designing second interpolation target value input means for inputting an interpolation target value B as digital data of n bits in total including bits $b_{n-1}, b_{n-2}, \ldots, b_1$, and $b_0$ in order from the most significant bit side;

designing interpolation rate determining value input means for inputting an interpolation rate determining value D having a relationship of "$\alpha=D/(2^n-1)$" with the interpolation rate $\alpha$, as digital data of n bits in total including bits $d_{n-1}, d_{n-2}, \ldots, d_1$, and $d_0$ in order from the most significant bit side;

designing arithmetic means for generating digital data of 2n bits in total composed of, in order from the most significant bit side, n bits in total of $c_{2n-1}, c_{2n-2}, \ldots, c_{n+1}$, and $c_n$ composing an integer part, and n bits in total of $c_{n-1}, c_{n-2}, \ldots, c_1$, and $c_0$ composing a decimal part by performing arithmetic operations based on an arithmetic expression of $C=(\Sigma_{j=0 \sim n-1} e_j 2^{(j-n)} + e_{n-1} 2^{-n})^* \Sigma_{i=0 \sim n-1} a_i 2^i + (\Sigma_{j=0 \sim n-1} d_j 2^{(j-n)} + d_{n-1} 2^{-n})^* \Sigma_{i=0 \sim n-1} b_i 2^i$ ($e_i$ is a logically inverted bit of $d_i$); and designing calculated value output means for outputting "digital data of 2n bits in total obtained by arranging the bits $c_{2n-1}, c_{2n-2}, c_{2n-3}, \ldots, c_1$, and $c_0$ in sequence in order from the most significant bit side" or "digital data corresponding to a necessary number of significant figures of the digital data of 2n bits" as digital data indicating a linear interpolated value C.

(5) The fifth feature of the second aspect of the invention resides in the method for designing a linear interpolator according to the fourth feature, wherein at the step of designing the arithmetic means, a design using:

a selector which selects and outputs either bit $a_i$ or $b_i$ (i=0, 1, 2, ... (n−1)) based on a logical value of a predetermined bit of digital data indicating an interpolation rate determining value D; and a counter which inputs the bit $a_i$ or $b_i$ (i=0, 1, 2, ... (n−1)), an output value of the selector or output value of another counter, and outputs a result of addition of the inputted values, is made.

(6) The sixth feature of the second aspect of the invention resides in the method for designing a linear interpolator according to the fourth or fifth feature, wherein at the step of designing the arithmetic means, to calculate a bit $c_{2n-1-2}$ (i=0, 1, 2, ... 2(n−1)) indicating a value of a digit of $2^{(n-i-2)}$ of the linear interpolated value C, (2n−1) computing units which sum up coefficients of the digit and all carries from lower-order digits, output a sum as a value of the bit $c_{2n-i-2}$, and output carries to a higher-order digit, are designed so that a carry from a computing unit which calculates the bit $c_{2n-2}$ is outputted as a value of the bit $c_{2n-1}$.

(7) The seventh feature of the second aspect of the invention resides in a method for designing a linear interpolator which performs arithmetic operations to calculate a linear interpolated value C expressed by an expression of $C=(1-\alpha)^*A + \alpha^*B$ based on two interpolation target values A and B and an interpolation rate $\alpha$ ($0 \leq \alpha \leq 1$), wherein an interpolator is constituted so as to obtain a linear interpolated value C by performing multiplications and additions defined as an arithmetic expression of $C=(\Sigma_{j=0 \sim n-1} e_j 2^{(j-n)} + e_{n-1} 2^{-n})^* \Sigma_{i=0 \sim n-1} a_i 2^i + (\Sigma_{j=0 \sim n-1} d_j 2^{(j-n)} d_{n-1} 2^{-n})^* \Sigma_{i=0 \sim n-1} b_i 2^i$ ($e_i$ is a logically inverted bit of $d_i$) by:

defining an interpolation target value A as digital data of n bits in total including bits $a_{n-1}, a_{n-2}, \ldots, a_1$, and $a_0$ in order from the most significant bit side;

defining an interpolation target value B as digital data of n bits in total including bits $b_{n-1}, b_{n-2}, \ldots, b_1$, and $b_0$ in order from the most significant bit side; and defining an interpolation rate determining value D having a relationship of "$\alpha=D/(2^n-1)$" with the interpolation rate $\alpha$, as digital data of n bits in total including bits $d_{n-1}, d_{n-2}, \ldots, d_1$, and $d_0$ in order from the most significant bit side.

As described above, the linear interpolator according to the second aspect of the invention has circuitry according to unique arithmetic expressions obtained by replacing division with addition, so that it becomes possible to obtain a linear interpolated value with high accuracy while simple circuitry is used.

<<<<<Third Aspect of the Invention>>>>>

An object of a third aspect of the invention is to provide an interpolation device which can efficiently perform cubic spline interpolation.

(1) The first feature of the third aspect of the invention resides in an interpolation device which calculates a pixel value f(x) of a new pixel Q defined at an arbitrary position in an interpolation interval both ends of which are at two adjacent pixels by performing interpolation using a cubic polynomial "$f(x)=Ax^3+Bx^2+Cx+D$" concerning a position x based on a one-dimensional pixel array obtained by arranging a plurality of pixels having predetermined pixel values at predetermined pitches, comprising:

a data input unit which inputs pixel values of sample pixels and the position x of the new pixel Q when the two adjacent pixels are defined as interval terminal pixels, "a predetermined number of pixel or pixels to be used for interpolation" continuously arranged adjacent to each other on the left of the interpolation interval are defined as left side interpolation pixels, "a predetermined number of pixel or pixels to be used for interpolation" continuously arranged adjacent to each other on the right of the interpolation interval are defined as right side interpolation pixels, and S (S≧4) in total of pixels consisting of the interval terminal pixels, the left side interpolation pixel or pixels, and the right side interpolation pixel or pixels are defined as sample pixels;

a weighting coefficient storage unit which stores weighting factors for the sample pixels, indicating weighting according to the distances from the interpolation interval;

a left side influence factor arithmetic unit which calculates a left side influence factor indicating influences of a pixel value or values of the left side interpolation pixel or pixels on coefficients of the cubic polynomial based on the pixel value or values of the left side interpolation pixel or pixels and the weighting factors;

a right side influence factor arithmetic unit which calculates a right side influence factor indicating influences of a pixel value or values of the right side interpolation pixel or pixels on coefficients of the cubic polynomial based on the pixel value or values of the right side interpolation pixel or pixels and the weighting factors; and an interpolated value arithmetic unit which calculates a pixel value f(x) by performing an arithmetic operation by determining the coefficients A, B, C, and D of the cubic polynomial by using the left side influence factor, the right side influence factor, and the weighting factors and substituting the position x for the cubic polynomial.

(2) The second feature of the third aspect of the invention resides in the interpolation device according to the first feature, wherein the interpolated value arithmetic unit comprising:

a square/cube computing unit which calculates a square $x^2$ and a cube $x^3$ of the position x;

a cubic coefficient computing unit which calculates a cubic coefficient A of the cubic polynomial based on the pixel values of the interval terminal pixels, the left side influence factor, the right side influence factor, and the weighting factor;

a quadratic coefficient computing unit which calculates a quadratic coefficient B of the cubic polynomial based on the pixel values of the interval terminal pixels, the left side influence factor, the right side influence factor, and the weighting factor;

a primary coefficient computing unit which calculates a primary coefficient C of the cubic polynomial based on the pixel values of the interval terminal pixels, the left side influence factor, the right side influence factor, and the weighting factor;

a cubic coefficient multiplier which calculates $Ax_3$ by multiplying the cubic coefficient A and the cube $x^3$;

a quadratic coefficient multiplier which calculates $Bx^2$ by multiplying the quadratic coefficient B and the square $x^2$;

a primary coefficient multiplier which calculates Cx by multiplying the primary coefficient C and the position x; and an adder which performs addition of $Ax^3+Bx^2+Cx+D$ by defining a pixel value of one interval terminal pixel as the coefficient D.

(3) The third feature of the third aspect of the invention resides in the interpolation device according to the first or second feature, wherein when the 0-th pixel $P_0$ and the first pixel $P_1$ adjacent to each other in a one-dimensional pixel array are defined as interval terminal pixels, and concerning a predetermined integer i (i≧1), i in total of pixels from the (−i)th pixel $P_{-i}$ to the (−1)st pixel $P_{-1}$ are defined as a left side interpolation pixel or pixels, i in total of pixels from the second pixel $P_2$ to the (i+1)th pixel $P_{i+1}$ are defined as a right side interpolation pixel or pixels, S=2(i+1) sample pixels are defined, a position of the interval terminal pixel $P_0$ is set to 0 and a position of the interval terminal pixel $P_1$ is set to 1, and a position x of a new pixel Q is defined in a range of 0≦x<1, the data input unit inputs pixel values $f_0$ and $f_1$ of the interval terminal pixels $P_0$ and $P_1$, pixel values $f_{-i}$, through $f_{-1}$ of the left side interpolation pixels $P_{-i}$, through $P_{-1}$, pixel values $f_2$ through $f_{i+1}$ of the right side interpolation pixels $P_2$ through $P_{i+1}$, and the position x of the new pixel Q, the weighting factor storage unit stores values of weighting factors $w_1, w_2, w_3, \ldots, w_i$ expressed by a recurrence formula of $w_i=4-(1/w_{i-1})$ (wherein $w_0=2$), the left side influence factor arithmetic unit calculates a left side influence factor $g_{-1}$ based on an arithmetic expression of:

$$g_{-1}=-1/w_{i-1}(\ldots(-1/w_2(-1/w_1(-\tfrac{1}{4}\cdot f_{-1}+f_{-i+1})+f_{-i+2})\ldots)+f_{-i+(i-2)}+f_{-i+(i-1)}$$

the right side influence factor arithmetic unit calculates a right side influence factor $g_2$ based on an arithmetic expression of:

$$g_2=-1/w_{i-1})\ldots(-1/w_2(-1/w_1(-\tfrac{1}{4}-f_{i+1}+f_i)+f_{i-1})\ldots)+f_{i+(3-i)}+f_{i+(2-i)}$$

and the interpolated value arithmetic unit calculates the pixel value f(x) based on an arithmetic expression ($w=w_{i-1}$):

$$f(x)=1/(3w-1)\{-6g_{-1}+(3w+1)(f_0-f_1)+6g_2\}x^3+3/((5w-1)(3w-1))\{6(4w-1)g_{-1}-(9w^2+2w-1)f_0+6w^2f_1-6wg_2\}x^2+3/((5w-1)(3w-1))\{-2(7w-2)g_{-1}-(w^2-4w+1)f_0+2w(2w-1)f_1-2(2w-1)g_2\}x+f_0$$

(4) The fourth feature of the third aspect of the invention resides in the interpolation device according to the first feature, wherein the interpolated value arithmetic unit determines auxiliary coefficients a, b, c, and d defined so as to satisfy A=(a−b), B=(b−c), C=(c−d), and D=d instead of the coefficients A, B, C, and D by using the pixel values of the interval terminal pixels, the left side influence factor, the right side influence factor, and the weighting factor, and calculates the pixel value f(x) by an arithmetic operation by a cubic polynomial of "f(x)=[{ax+b(1−x)}x+c(1−x)]x+d(1−x)" for which the position x is substituted instead of the cubic polynomial "f(x)=$Ax^3+Bx^2+Cx+D$."

(5) The fifth feature of the third aspect of the invention resides in the interpolation device according to the fourth feature, wherein the interpolated value arithmetic unit comprising:

a first auxiliary coefficient computing unit which calculates an auxiliary coefficient b based on the pixel values of the interval terminal pixels, the left side influence factor, the right side influence factor, and the weighting factor;

a second auxiliary coefficient computing unit which calculates an auxiliary coefficient c based on the pixel values of the interval terminal pixels, the left side influence factor, the right side influence factor, and the weighting factor;

a first linear interpolator which calculates a value of {ax+b(1−x)} by inputting a pixel value of one interval terminal pixel as an auxiliary coefficient a and performing linear interpolation based on the auxiliary coefficient a, the auxiliary coefficient b, and the position x;

a second linear interpolator which calculates a value of $[\{ax+b(1-x)\}x+c(1-x)]$ by performing linear interpolation based on the value of $\{ax+b(1-x)\}$, the auxiliary coefficient c, and the position x; and a third linear interpolator which calculates a value of $f(x)=[\{ax+b(1-x)\}x+c(1-x)]x+d(1-x)$ by inputting a pixel value of the other interval terminal pixel as the auxiliary coefficient d and performing linear interpolation based on the value of $[\{ax+b(1-x)\}x+c(1-x)]$, the auxiliary coefficient d, and the position x.

(6) The sixth feature of the third aspect of the invention resides in the interpolation device according to the fourth or fifth feature, wherein when the 0-th pixel $P_0$ and the first pixel $P_1$ adjacent to each other in a one-dimensional pixel array are defined as interval terminal pixels, and concerning a predetermined integer i ($i \geq 1$), i in total of pixels from the $(-i)$th pixel $P_{-i}$ to the $(-1)$st pixel $P_{-1}$ are defined as a left side interpolation pixel or pixels, i in total of pixels from the second pixel $P_2$ to the $(i+1)$th pixel $P_{i+1}$ are defined as a right side interpolation pixel or pixels, $S=2(i+1)$ sample pixels are defined, a position of the interval terminal pixel $P_0$ is set to 0 and a position of the interval terminal pixel $P_1$ is set to 1, and a position x of a new pixel Q is defined in a range of $0 \leq x < 1$, the data input unit inputs pixel values $f_0$ and $f_1$ of the interval terminal pixels $P_0$ and $P_1$, pixel values $f_{-i}$ through $f_{-1}$ of the left side interpolation pixels $P_{-i}$ through $P_{-1}$, pixel values $f_2$ through $f_{i+1}$ of the right side interpolation pixels $P_2$ through $P_{i+1}$, and the position x of the new pixel Q, the weighting factor storage unit stores values of weighting factors $w_1, w_2, w_3, \ldots, w_i$ expressed by a recurrence formula of $w_i = 4 - (1/w_{i-1})$ (where $w_0 = 2$), the left side influence factor arithmetic unit calculates a left side influence factor $g_{-1}$ based on an arithmetic expression of:

$$g_{-1} = -1/w_{i-1}(\ldots(-1/w_2(-1/w_1(-\tfrac{1}{4}\cdot f_{-1}+f_{i+1})+f_{-i+2})\ldots)f_{-i+(i-2)})+f_{-i+(i-1)}$$

the right side influence factor arithmetic unit calculates a right side influence factor $g_2$ based on an arithmetic expression of:

$$g_2 = -1/w_{i-1}(\ldots(-1/w_2(-1/w_1(-\tfrac{1}{4}\cdot f_{i+1}+f_i)+f_{i-1})\ldots)+f_{i+(3-i)})+f_{i+(2-i)}$$

and the interpolated value arithmetic unit determines auxiliary coefficients a, b, c, and d by an arithmetic expression ($w=w_{i-1}$):

$a=f_1$, $b=(6g_{-1}-(3w+1)f_0+6wf_1-6g_2)/(3w-1)$, $c=1/((3w-1)(5w-1))(-6(7w-2)g_{-1}+2(6w^2+2w-1)f_0+6w(2w-1)f_1-6(2w-1)g_2)$, $d=f_0$ (7) The seventh feature of the third aspect of the invention resides in the interpolation device according to the first to the sixth features, further comprising:

an image input unit which inputs a two-dimensional pixel array obtained by arranging a plurality of pixels having predetermined pixel values, respectively, at intersections between row lines arranged parallel to each other at predetermined pitches and column lines orthogonal to the row lines;

an image storage unit which stores the two-dimensional pixel array;

a new pixel position input unit which inputs a position of a new pixel T defined at a position different from the positions of the pixels on the two-dimensional pixel array;

an interpolation target intersection determining unit which defines a reference line R that passes through the position of the new pixel T and is parallel to the column lines, and determines a predetermined number of intersections near the new pixel T among intersections between the reference line R and the row lines as interpolation target intersections;

a row direction calculation control unit which makes the interpolation device calculate pixel values of the interpolation target intersections by giving one-dimensional pixel arrays on row lines, to which the interpolation target intersections belong, to the interpolation device; and a column direction calculation control unit which makes the interpolation device calculate the pixel value of the new pixel T by giving a one-dimensional pixel array consisting of the interpolation target intersections arranged on the reference line R to the interpolation device, to perform interpolation for a two-dimensional image.

(8) The seventh feature of the third aspect of the invention resides in the interpolation device according to the first to the seventh features, one or a plurality of the left side influence factor arithmetic unit, the right side influence factor arithmetic unit, and the interpolated value arithmetic unit are constituted by a plurality of computing units, and computing units on a middle stage calculate results of operations of bits obtained without carry propagation and carry information of the bits and gives these to a later computing unit, and in a last computing unit, carry propagation is performed by considering the carry information.

As described above, according to the third aspect of the invention, it becomes possible to efficiently perform cubic spline interpolation, and an interpolation device suitable for image enlargement/reduction scaling display can be provided.

BRIEF DESCRIPTION OF THE DRAWINGS

FIG. 3 is a diagram showing expressions that define interpolation target values A and B and an interpolation rate D by using bits of binary numbers;

FIG. 4 is a diagram showing a basic expression of interpolation to be executed by a linear interpolator according to a first aspect of the invention;

FIG. 5 is a diagram showing a transformation process of the basic expression shown in FIG. 4;

FIG. 6 is another diagram showing the transformation process of the basic expression shown in FIG. 4;

FIG. 7 is a diagram showing an arithmetic expression characterizing the first aspect of the invention obtained by transforming the basic expression shown in FIG. 4;

FIG. 10 is a diagram showing expressions in which the arithmetic operator Σ in the expression shown in FIG. 8 is developed;

FIG. 18 is a graph showing another basic concept of linear interpolation;

FIG. 19 is a diagram showing expressions defining interpolation target values A and B and interpolation rate determining value D as 8-bit digital data;

FIG. 20 is a diagram showing a state in that the interpolation target values A and B, the interpolation rate determining value D, and the linear interpolated value C shown in FIG. 19 are expressed as bit sequences of binary numbers;

FIG. 21 is a diagram showing a relational expression between the interpolation rate determining value D composed of 8-bit digital data and an interpolation rate $\alpha$;

FIG. 22 is a diagram showing a method for defining an approximate value $\alpha'$ of the interpolation rate $\alpha$ based on the relational expression of FIG. 21;

FIG. 23 is a diagram showing an expression for defining the approximate value $\alpha'$ of the interpolation rate $\alpha$ based on the relational expression of FIG. 21;

FIG. 24 is a diagram showing a basic expression of linear interpolation when 8-bit digital data are used for the interpolation target values A and B and the interpolation rate determining value D;

FIG. 25 is a diagram showing logical formulas to be used for transforming the basic expression shown in FIG. 24;

FIG. 26 is a diagram showing a transformation process of the part of $(1-\alpha')$ of the basic expression shown in FIG. 24;

FIG. 27 is a diagram showing a characteristic expression according to a second aspect of the invention obtained by substituting the expression of FIG. 26 for the part of $(1-\alpha')$ of the basic expression shown in FIG. 24;

FIG. 28 is a table showing coefficients of members composing the expression shown in FIG. 27, sorted by digits;

FIG. 29 is a diagram showing general formulas defining the interpolation target values A and B and the interpolation rate determining value D as n-bit digital data;

FIG. 30 is a diagram showing a state in that the interpolation target values A and B, the linear interpolated value C, and the interpolation rate determining value D shown in FIG. 29 as bit sequences of binary numbers;

FIG. 31 is a diagram showing a relational expression between the interpolation rate determining value D composed of n-bit digital data and an interpolation rate $\alpha$;

FIG. 32 is a method for defining an approximate value $\alpha'$ of the interpolation rate $\alpha$ based on the relational expression of FIG. 31;

FIG. 33 is a diagram showing an expression defining the approximate value $\alpha'$ of the interpolation rate $\alpha$ based on the relational expression of FIG. 31;

FIG. 34 is a diagram showing a basic expression of linear interpolation when n-bit digital data are used for the interpolation target values A and B and the interpolation rate determining value D;

FIG. 35 is a diagram showing a transformation process of the part of $(1-\alpha')$ of the basic expression shown in FIG. 34;

FIG. 36 is a diagram showing a characteristic expression according to a second aspect of the invention obtained by substituting the expression shown in FIG. 35 for the part of $(1-\alpha')$ of the basic expression shown in FIG. 34;

FIG. 37 is an expression obtained by substituting n=4 into the characteristic expression of FIG. 36;

FIG. 38 is a table showing coefficients composing the expression shown in FIG. 37, sorted by digits;

DISCLOSURE OF PREFERRED EMBODIMENTS

Section 1. Embodiment of First Aspect of the Invention

Here, an embodiment illustrating a first aspect of the invention will be described. The first aspect of the invention proposes a technique for efficiently executing linear interpolation of two signed interpolation target values by a simple constitution.

<<<Section 1-1. Linear Interpolation and Negative Number Expression>>>

Figures 1, 2:
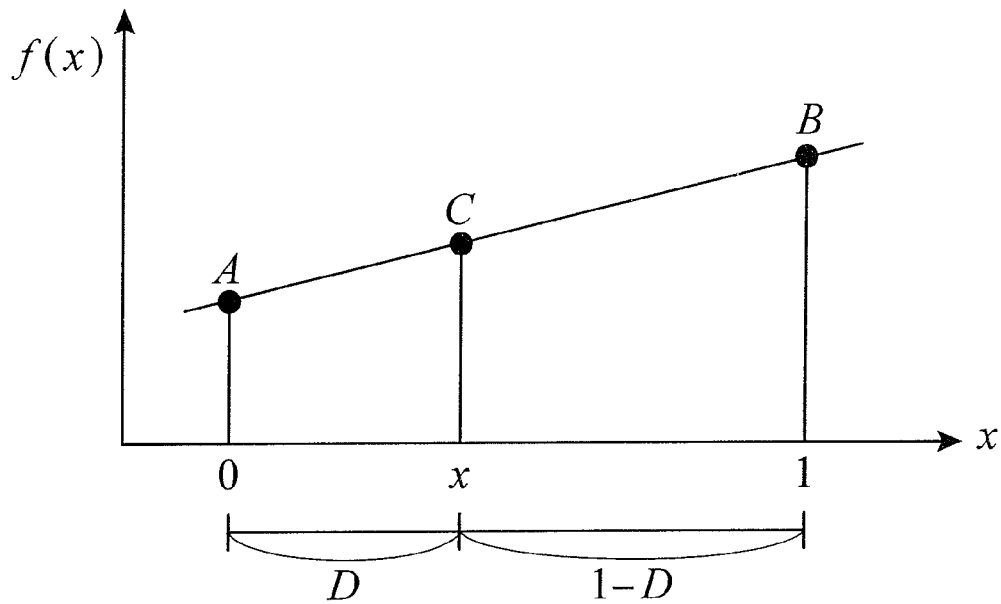
FIG. 1 is a graph showing a basic concept of linear interpolation.
FIG. 2 is a diagram illustrating a method for expressing a negative number by means of twos complement notation.

First, a basic concept of general linear interpolation and general negative number expression in digital data will be briefly described. FIG. 1 is a graph showing a basic concept of linear interpolation. In the illustrated example, an interval 0-1 is set on the X axis and a method for calculating a function value at an arbitrary position x in the interval 0-1 when a value of the function f(x) is defined only at both ends of the interval is shown. In detail, when f(0)=A and f(1)=B, a value of a function f(x)=C about arbitrary x in the range of is calculated by interpolation using values A and B.

In linear interpolation, as illustrated, a straight line is defined between the point A and the point B, and a value of C is calculated as a vertical coordinate value of the point C on this straight line. Herein, when the position of the arbitrary point x is defined as "a position dividing the interval 0-1 at a ratio of [D:(1−D)]," and D is referred to as interpolation rate, the linear interpolated value C can be calculated by an arithmetic operation expressed by the basic expression of C=(1−D)*A+D*B by using the two interpolation target values A and B and the interpolation rate D (* sign representing multiplication). In this application, an interpolation rate in the range of (0≦D<1) that does not include 1 with respect to a value α (0≦α≦1) showing the original interpolation rate will be indicated as a value D. In this embodiment, for the sake of performing an arithmetic operation using digital data, the value D excluding 1 will be used as the interpolation rate.

For example, when concrete values of A=10, B=20, and D=0.4 are given, by performing an arithmetic operation of C=(1−0.4)*10+(0.4*20) based on the basic expression, an interpolated value of C=14 is calculated. As a matter of course, said basic expression is effective even if either one or both of A and B are negative numbers. For example, when concrete values of A=−10, B=20, and D=0.4 are given, by performing an arithmetic operation of C=(1−0.4)*(−10)+(0.4*20) based on the basic expression, an interpolated value of C=+2 is calculated.

Next, general negative number expression in digital data will be described. FIG. 2 is a diagram describing a method for expressing a negative number by means of twos complement notation. The table on the left in FIG. 2 shows correspondence between numerical values in the decadal system and numerical values in the binary system. As illustrated, by using 4-bit binary numbers, 15 numerical values from +7 to −7 including 0 can be expressed. Expression in the binary system of positive numbers can be realized by adding ones to "0000" in sequence, and expression in the binary system of negative numbers can be realized by subtracting ones from "0000" one by one. This negative number expression method is called "twos complement notation," and this is a general negative number expression method in digital data.

On the right in FIG. 2, correspondence between bits of a positive number and bits of a negative number is shown. Namely, when a positive number "A" is expressed by a 4-bit sequence of "$a_3 a_2 a_1 a_0$," the negative number "−A" is expressed as a binary number to which 1 has been added after logically inverting this 4 bits "$a_3 a_2 a_1 a_0$." For example, binary expression of "+7" is "0111," so that the binary expression of "−7" becomes "1001" which is a result of addition of 1 to "1000" obtained by inverting all bits of "0111." A positive number and a negative number whose absolute values are the same always satisfy this relationship when they are binary-expressed.

As clearly understood from the table on the left in FIG. 2, when a negative number is binary-expressed, the most significant bit of the binary expression is always "1." In other words, in the case of a signed binary number, the most significant bit thereof can be recognized as "signed part" showing a sign, and other bits can be recognized as "unsigned part" showing an absolute value. As illustrated, in a case of a binary number having a sign consisting of four bits in total, the leftmost one bit is the "signed part" and the remaining 3 bits are the "unsigned part." When the "signed part" is "0," the binary number is 0 or a positive number, and when the "signed part" is "1," the binary number thereof is a negative number.

Thus, a signed binary number always includes "signed part" and "unsigned part," so that handling thereof is slightly troublesome. As described above, interpolators which can perform linear interpolation of two signed interpolation target values have been conventionally proposed. However, these conventional interpolators employ complicated circuitry for handling signed binary numbers, so that they cannot efficiently perform an arithmetic operation. The first aspect of the invention proposes a new method for efficiently performing linear interpolation of signed interpolation target values by a simple constitution.

<<<Section 1-2. Transformation of Basic Expression>>>

It is described above that the linear interpolation of two interpolation target value A and B is performed as an arithmetic operation based on the basic expression of C=(1−D)*A+D*B when the interpolation rate is defined as D (0≦D<1). Then, first, let us consider application of this basic expression to digital data expressed by binary numbers.

FIG. 3 is a diagram showing expressions in which signed interpolation target values A and B and an interpolation rate D in the range of 0≦D<1 are defined by using bits of binary numbers consisting of n bits. On the top of FIG. 3, first, $$A = -a_{n-1}2^{n-1} + a_{n-2}2^{n-2} + \ldots + a_1 2^1 + a_0 2^0 \quad \text{(Expression 1-1)}$$

$$= -a_{n-1}2^{n-1} + \sum_{j=0 \sim n-2} a_j 2^j$$

is shown (in the claims and specification of the present application, due to a constraint based on the functions of a word processor, the parameter α that should be entered under the arithmetic operator Σ indicating a sum and the parameter β that should be entered above Σ are entered as subscripts like $\Sigma_{\alpha \sim \beta}$). $a_{n-1}, a_{n-2}, \ldots, a_1$, and $a_0$ in this (Expression 1-1) correspond to the respective bits (0 or 1) when the numerical value A is expressed as a binary number composed of n bits, and $a_{n-1}$ is the most significant bit (the leftmost bit), and $a_0$ is the least significant bit (the rightmost bit). As described above, the most significant bit composes a signed part, so that "$-a_{n-1}2^{n-1}$" as the first member of the left-hand side of the (Expression 1-1) is a signed part, and the remaining member "$\Sigma_{j=0 \sim n-2} a_j 2^j$" is an unsigned part.

On the lower right of the (Expression 1-1), a bit configuration when n=4, that is, when the numerical value A is expressed as a binary number composed of 4 bits, is shown. In this case, the most significant bit "$a_3$" becomes a signed part, and the part of the remaining 3 bits "$a_2 a_1 a_0$" becomes an unsigned part. The meaning of this "Expression 1-1" will be easily understood by applying concrete numerical values. For example, when A=+7 is binary-expressed, it becomes "0111" from the table of FIG. 2. Namely, $a_3=0, a_2=1, a_1=1$, and $a_0=1$, and when these are applied to the (Expression 1-1) to which n=4 is applied, it becomes:

$$A = -0*2^3 + 1*2^2 + 1*2^1 + 1*2^0 = +7$$

On the other hand, in a case of a negative number, when A=−7 is binary-expressed, it becomes "1001" from the table of FIG. 2, so that $a_3=1$, $a_2=0$, $a_1=0$, and $a_0=1$, and when these are applied to the (Expression 1-1) to which n=4 is applied, it becomes:

$$A = -1*2^3 + 0*2^2 + 0*2^1 + 1*2^0 = -7$$

Marking the member of the signed part with a minus sign is to obtain a correct value in the case of such a negative number.

Similarly, on the middle of FIG. 3, (Expression 1-2):

$$B = -b_{n-1}2^{n-1} + b_{n-2}2^{n-2} + \ldots + b_1 2^1 + b_0 2^0$$
$$= -b_{n-1}2^{n-1} + \sum_{j=0 \sim n-2} b_j 2^j$$

is shown. $b_{n-1}$, $b_{n-2}$, ..., $b_1$, $b_0$ in this (Expression 1-2) correspond to the respective bits (0 or 1) when the numerical value B is expressed as a binary number composed of n bits, and $b_{n-1}$ is the most significant bit (the leftmost bit), and $b_0$ is the least significant bit (the rightmost bit). The most significant bit sill composes a signed part, so that "$-b_{n-1}2^{n-1}$" as the first member of the left-hand side of (Expression 1-2) becomes a signed part, and the remaining members "$\Sigma_{j=0 \sim n-2} b_j 2^j$" becomes an unsigned part.

On the lower right of the (Expression 1-2), bit configuration when n=4, that is, when the numerical value B is expressed as a binary number composed of 4 bits is shown. In this case, the most significant bit "$b_3$" becomes a signed part, and the part of the remaining 3 bits "$b_2 b_1 b_0$" becomes an unsigned part.

On the other hand, on the lowest stage of FIG. 3, (Expression 1-3):

$$D = d_{n-1}2^{-1} + d_{n-2}2^{-2} + \ldots + d_0 2^{-n}$$
$$= \sum_{i=0 \sim n-1} d_i 2^{(i-n)}$$

is shown. $d_{n-1}$, $d_{n-2}$, ..., $d_0$ in this "Expression 1-3" correspond to the respective bits (0 or 1) when the numerical value D is expressed as a binary number composed of n bits that indicates only the decimal part, and $d_{n-1}$ is the most significant bit (the leftmost bit) and $d_0$ is the least significant bit (the rightmost bit).

On the lower right of the (Expression 1-3), bit configuration when n=4, that is, when the numerical value D is expressed as a binary number composed of 4 bits that indicate only a decimal part is shown. As illustrated, this 4 bits become bits of digits after the decimal point, and for example, the bit $d_3$ is a value of the digit of the first place of the decimal place (the digit of $2^{-1}$), and bit $d_2$ is a value of the digit of the second place of the decimal place (the digit of $2^{-2}$). The numerical value D is an interpolation rate in the range of $0 \leq D < 1$, so that it is expressed as an unsigned binary number. For example, a binary number of 4 bits "1111" normally indicates a decimal number "15," however, when the numerical value D is expressed as a binary number of 4 bits "1111," this 4 bits indicates only a decimal part, and in actuality, it corresponds to a binary number of "0.1111" (corresponding to $1/2 + 1/4 + 1/8 + 1/16 = 0.9375$). Therefore, when n=4, D takes a value of 0 to 0.9375.

By (Expression 1-1), (Expression 1-2), and (Expression 1-3) of FIG. 3, the interpolation target values A and B and the interpolation rate D can be defined as digital data, so that when these values are substituted for the basic expression "$C=(1-D)*A+D*B$," (Expression 1-4) shown in the upper stage of FIG. 4 is obtained. The part enclosed by a dashed line in this (Expression 1-4) corresponds to the members of the basic expression, in which the (Expression 1-1) through (Expression 1-3) are applied. By developing and rearranging this (Expression 1-4), (Expression 1-5) is obtained. Therefore, by constituting an arithmetic circuit which successively performs arithmetic operations based on the (Expression 1-5), an interpolator for calculating an interpolated value C can be manufactured.

However, if an interpolator for calculating an interpolated value C based on (Expression 1-5) is designed, the constitution becomes complicated, and efficient arithmetic operations cannot be expected. A first reason for this is that some device becomes necessary for properly processing the signed part. As described above, the members $a_{n-1}$ and $b_{n-1}$ are signed parts of the interpolation target values A and B, and do not indicate absolute values of the interpolation target values. Therefore, proper handling as signed parts is necessary. A second reason is that complicated circuitry using many multipliers and adders becomes necessary since a product of arithmetic operators E indicating sums is included. As long as a serial operation based on this (Expression 1-5) is performed, the circuitry dramatically becomes complicated as bit numbers of the interpolation target values A and B, that is, the number of n increases.

The inventor of the present invention considered that transformation of this (Expression 1-5) into another form would make it possible to efficiently perform the arithmetic operation by simple circuitry. Therefore, taking concrete circuitry as an interpolator into consideration, the inventor examined how to transform the (Expression 1-5) to constitute an efficient interpolator, and through trial and error, conceived that the following transformation made it possible to constitute a very efficient interpolator.

First, the (Expression 1-6) of FIG. 5 is considered. This (Expression 1-6) in itself is a formula known mathematically from a long time ago For example, when n=4, the (Expression 1-6) becomes as follows:

$$2^{-4} + 2^{-3} + 2^{-2} + 2^{-1} + 2^{-4} = 1/16 + 1/8 + 1/4 + 1/2 + 1/16 = 1$$

As a matter of course, this (Expression 1-6) is a formula satisfied concerning an arbitrary n. By shifting 1 on the right-hand side of this (Expression 1-6) to the left-hand side, the (Expression 1-7) is obtained.

Next, let us consider the (Expression 1-8). The first line of this (Expression 1-8) is a perfectly natural expression of "$-D=0-D$," and when the left-hand side of the (Expression 1-7) is substituted for the part of "0" and the (Expression 1-3) is substituted for the part of "D," second and third lines of (Expression 1-8) are obtained. By transforming these, the form of the second line is further derived from the first line of the (Expression 1-9). $d_i$ is each bit for indicating only the decimal part of the interpolation rate D, so that as an actual value, either 0 or 1 is taken. Therefore, when $e_i=(1-d_i)$, $e_i$ is a logically inverted bit of $d_i$ (when $d_i=1$, $e_i=0$, and when $d_i=0$, $e_i=1$). Therefore, the (Expression 1-9) is transformed into the (Expression 1-10) by rewriting the logically inverted bit of $d_i$ as $e_i$.

Herein, focusing attention on the part being "$-D$," enclosed by the dashed line in the (Expression 1-5) of FIG. 4, when the right-hand side of the (Expression 1-10) is substituted for this part, the (Expression 1-11) of FIG. 6 is obtained. In this (Expression 1-11), the part enclosed by the dashed line corresponds to "$-D$," and corresponds to the right-hand side of the (Expression 1-10). On the other hand, the part enclosed by an alternate long and short dashed line shown on the first line of the (Expression 1-11) can be transformed into the form of the member T1 shown on the lowest left of the diagram (the member $2^{n-1}$ can be incorporated in the inside of the $\Sigma$ sign). The product of two parts enclosed by the alternate long and short double dashed line shown on the third line of the (Expression 1-11) can be transformed into the form of the member T2 shown on the lowest right part of the diagram (also, the member $2^{n-1}$ is incorporated in the inside of the $\Sigma$ sign).

By thus transforming the (Expression 1-11) of FIG. 6, the (Expression 1-12) of FIG. 7 is obtained. This (Expression 1-12) is equivalent to the basic expression of linear interpolation shown as (Expression 1-4) in FIG. 4, and the form of this (Expression 1-12) is very convenient for designing the interpolator. Hereinafter, this (Expression 1-12) is referred to as "arithmetic expression according to the first aspect of the invention." A concrete interpolator constituted so as to obtain a linear interpolated value C based on the arithmetic expression of this (Expression 1-12) will be illustrated in Section 1-4 later.

<<<Section 1-3. Features of Arithmetic Expression According to the First Aspect of the Invention>>>

The arithmetic expression (Expression 1-12) according to the first aspect of the invention is composed of three parts of a signed part, an unsigned part 1, and an unsigned part 2 as distinguished by circling these by dashed lines in the diagram, and as described later, these perform individually unique functions. First, observing the entire composition of this (Expression 1-12), it is an expression of the interpolated value C to be calculated as a sum of a plurality of members, and it is understood that each member is in a form of the power of two multiplied by some coefficient. Herein, the power of two indicates a specific digit of a binary number, and the coefficient to multiply the power of two indicates a numerical value of this digit. For example, $2^{n-1}$ indicates a digit of the most significant bit of the binary number indicating the interpolated value C, corresponding to the signed part of the interpolated value C.

In FIG. 7, the parts enclosed by the dashed lines shown as "signed part" are members in the form of "$-(a_{n-1}+b_{n-1})2^{n-1}$," and this indicates that the bit value of the digit shown as "n-1" (digit of the most significant bit of the interpolated value C) is "$-(a_{n-1}+b_{n-1})$." Herein, the minus sign attached to the head is for making this bit to function as a signed part indicating a sign as in the case of the (Expression 1-1) and (Expression 1-2) of FIG. 3. Namely, when a negative number is expressed by twos complement notation, this negative number is obtained by subtracting a numerical value indicated by the most significant bit from the numerical value indicated by the remaining bits. For example, when "-7" as a decimal number is binary-expressed, it becomes "1001," however, the numerical value indicated by the most significant bit "1" is $2^3=8$, and the numerical value indicated by the remaining 3 bits "001" is 1, so that $-8+1=-7$ is obtained.

Meanwhile, $a_{n-1}$ is a signed part (most significant bit) of the interpolation target value A, and $b_{n-1}$ is a signed part (most significant bit) of the interpolation target value B, so that the part enclosed by a dashed line marked "signed part" in FIG. 7 functions to set the sum of the signed parts of both interpolation target values A and B to a signed part (most significant bit) of the interpolated value C.

The part enclosed by the dashed line marked "unsigned part 1" in FIG. 7 is also a part composed by an arithmetic operation based on $a_{n-1}$ and $b_{n-1}$ (signed parts of the interpolation target values A and B), and the bits after $a_{n-2}$ and bits after $b_{n-2}$ have no relation thereto. The member of the power of two included in this unsigned part 1 is a member of $2^{n-2}$ at a maximum (member of $2^{(i-1)}$ in the case of $i=n-1$ in an arithmetic operation for calculating the sum total of $\Sigma$), so that the signed part (digit of $2^{n-1}$) of the interpolated value is not directly defined by the arithmetic operation of this unsigned part 1, however, when carrying from the digit of $2^{n-2}$ occurs, it influences the signed part (digit of $2^{n-1}$) of the interpolated value C. In this view, this unsigned part 1 functions to perform an arithmetic operation which may influence the signed part of the interpolated value C.

On the other hand, the part marked "unsigned part 2" in FIG. 7 is all composed of only an arithmetic operation concerning bits after $a_{n-2}$ and bits after $b_{n-2}$, and includes no arithmetic operation concerning $a_{n-1}$ and $b_{n-1}$ (signed parts of the interpolation target values A and B). In other words, this unsigned part 2 functions to perform an arithmetic operation concerning only the unsigned parts of the interpolation target values A and B.

In the (Expression 1-12) shown in FIG. 7, the functions of the three parts of the signed part, the unsigned part 1, and the unsigned part 2 are clearly distinguished, so that if an interpolator is constituted based on this expression, the signed part can be properly processed. This is the first feature of the (Expression 1-12).

A second feature of the (Expression 1-12) is that $d_i$ and $e_i$ are complementarily incorporated in the form of the expression. For example, the unsigned part 1 includes an expression in the form of "$a_{n-1}\Sigma_{i=0 \sim n-1}d_i 2^{(i-1)} + b_{n-1}\Sigma_{i=0 \sim n-1}e_i 2^{(i-1)}$," and the unsigned part 2 includes an expression in the form of "$\Sigma_{i=0 \sim n-1}e_i 2^{(i-n)} - \Sigma_{j=0 \sim n-2}a_j 2^j + \Sigma_{i=0 \sim n-1}d_i 2^{(i-n)} \cdot \Sigma_{j=0 \sim n-2}b_j 2^j$." As described above, $e_i$ is a logically inverted bit of $d_i$, so that when $d_i$ equals 1, $e_i$ is always 0, and when $d_i$ is 0, $e_i$ is always 1. Therefore, when calculating the respective members of the expression, in the case of $d_i=1$, the member including $e_i$ is always 0, so that only the member including $d_i$ is only calculated, and in the case of $d_i=0$, the member including $d_i$ is always 0, so that only the member including $e_i$ is only calculated. Thereby, an efficient arithmetic operation using a simplified arithmetic circuit becomes possible.

Figures 8, 9:
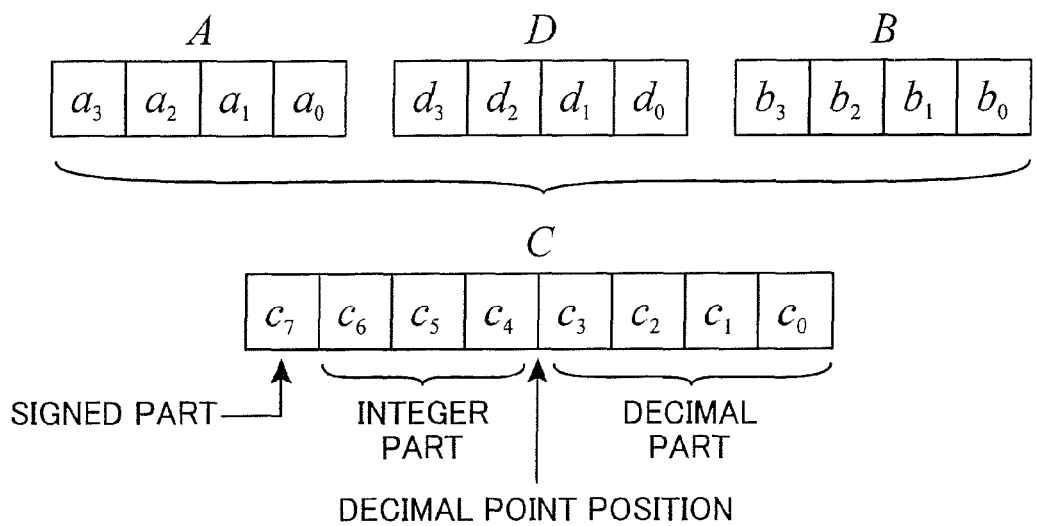
FIG. 8 is a diagram showing an expression obtained by substituting n=4 into the arithmetic expression shown in FIG. 7.
FIG. 9 is a diagram showing bit configuration of digital data relating to an arithmetic operation based on the expression shown in FIG. 8.

Next, to make clearer the advantage of the arithmetic expression according to the first aspect of the invention, a concrete example when n=4 in the (Expression 1-12) shown in FIG. 7 is considered. The (Expression 1-13) shown in FIG. 8 is obtained by substituting 4 for n in the (Expression 1-12) shown in FIG. 7. This expression corresponds to an arithmetic expression when the interpolation target values A and B and the interpolation rate D are all given as 4-bit digital data. Namely, the interpolation target value A is given as 4-bit data "$a_3 a_2 a_1 a_0$," the interpolation target value B is given as 4-bit data "$b_3 b_2 b_1 b_0$," and the interpolation rate D is given as 4-bit data "$d_3 d_2 d_1 d_0$" (see the diagrams on the lower rights of the expressions of FIG. 3). In this (Expression 1-13), focusing attention on the members of the power of two, the maximum member is the member of $2^3$, and the minimum is the member of $2^{-4}$, and the interpolated value C calculated as a result of arithmetic operation is given as data of 8 bits in total indicating the values of the digits of $2^3, 2^2, 2^1, 2^0, 2^{-1}, 2^{-2}, 2^{-3}$, and $2^{-4}$. Herein, the individual data of 8 bits are expressed as $c_7, c_6, c_5, c_4, c_3, c_2, c_1$, and $c_0$.

FIG. 9 is a diagram showing bit configuration of digital data concerning an arithmetic operation based on the expression shown in FIG. 8. Namely, the arithmetic operation shown in FIG. 8 is for calculating a linear interpolated value to be given as 8-bit data "$c_7 c_6 c_5 c_4 c_3 c_2 c_1 c_0$" based on the interpolation target value A given as 4-bit data "$a_3 a_2 a_1 a_0$," the interpolation target value B given as 4-bit data "$b_3 b_2 b_1 b_0$," and the interpolation rate D given as 4-bit data "$d_3 d_2 d_1 d_0$" (data showing only a decimal part including a decimal point positioned on the left of the bit $d_3$). As described above, the bit $c_4$ is a value of the digit of $2^0$, and the bit $c_3$ is the value of the digit of $2^{-1}$, so that a decimal point is positioned between the bit $c_4$ and the bit $c_3$. Therefore, as shown on the lower stage of FIG. 9, among the data of 8 bits of the interpolated value C, the bit "$c_7$" is a signed part, the bits "$c_6c_5c_4$" are an integer part, and the bits "$c_3c_2c_1c_0$" is a decimal part.

The linear interpolated value C thus obtained does not need to be outputted as a result of arithmetic operation left as 8-bit data, and only necessary significant digits are properly selected and outputted. In practical use, the interpolation target values A and B are given as 4-bit data, so that in many cases, the interpolated value C to be finally outputted being also 4-bit data is sufficient. In this case, the decimal part is rounded off (or rounded up) and 4-bit data composed of only the signed part and the integer part is outputted.

Next, it will be described in detail how efficient arithmetic operation the designing of an interpolator based on the arithmetic expression shown in FIG. 8 can be realized. The (Expression 1-14) shown in FIG. 10 is a result of development of the arithmetic operator Σ in the (Expression 1-13) of FIG. 8. The signed part of the (Expression 1-14) is the same as that of the (Expression 1-13), however, the unsigned part 1 is developed to three lines as illustrated. Herein, comparing the second line and the third line, these have a difference that the second line is an expression concerning $a_3$ and $d_i$ (i=0, 1, 2, 3), and on the other hand, the third line is an expression concerning $b_3$ and $e_i$ (i=0, 1, 2, 3), however, their forms of expressions are completely the same. The unsigned part 2 is developed to the circled numbers 1 through 9 as illustrated. From the comparison between the circled numbers 2 and 6, the circled numbers 3 and 7, the circled numbers 4 and 8, and the circled numbers 5 and 9, respectively, they have a difference that the former numbers are expressions concerning $a_j$ (j=0, 1, 2) and $e_i$ (i=0, 1, 2, 3), and the latter numbers are expressions concerning $b_j$ (j=0, 1, 2) and $d_i$ (i=0, 1, 2, 3), however, their forms of expressions are completely the same.

Figure 11:
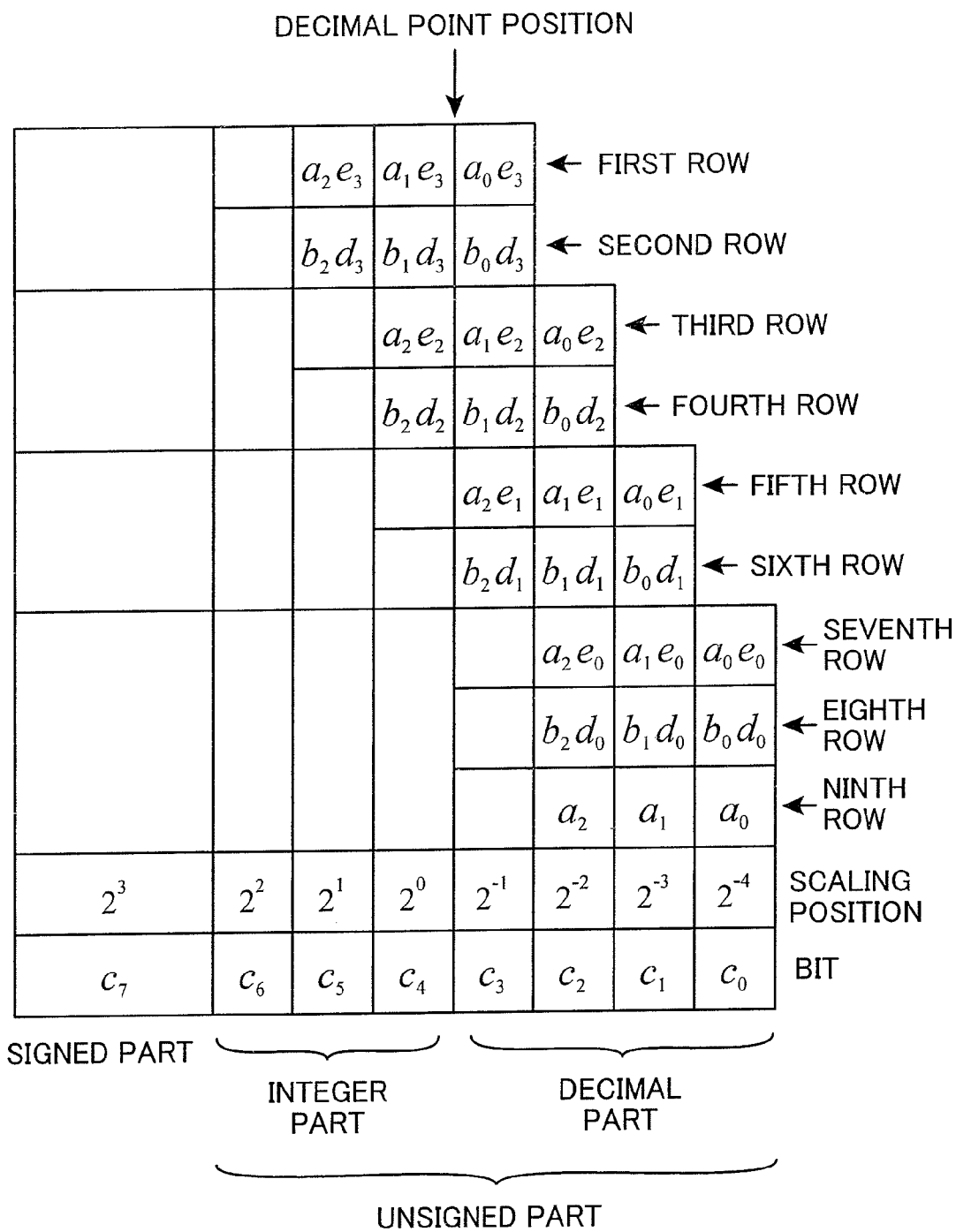
FIG. 11 is a table showing coefficients of members composing an unsigned part 2 of the expression shown in FIG. 10, sorted by digits.

FIG. 11 is a table sorting the coefficients of the members of the unsigned part 2 (expressions of the circled numbers 1 through 9) by digits. The columns arranged horizontally in this table correspond to scaling positions of $2^3$, $2^2$, $2^1$, $2^0$, $2^{-1}$, $2^{-2}$, $2^{-3}$, and $2^{-4}$, respectively, and the bits $c_7$, $c_6$, $c_5$, $c_4$, $c_3$, $c_2$, $c_1$, and $c_0$ indicate the respective bits of an interpolated value C calculated by the arithmetic operation. As described above, a decimal point is positioned between the bit $c_4$ and the bit $c_3$, and in 8-bit data of the interpolated value C, the bit "$c_7$" is a signed part, the bits "$c_6c_5c_4$" are an integer part of an unsigned part, and the bits "$c_3c_2c_1c_0$" are a decimal part of the unsigned part.

On the first row of the table of FIG. 11, coefficients of the expression of the circled number 5 of the (Expression 1-14) of FIG. 10 are described. Namely, the coefficient "$a_0e_3$" in the expression "$a_0e_32^{-1}+a_1e_32^0+a_2e_32^1$" of the circled number 5 is described on the digit of $2^{-1}$, and the coefficient "$a_1e_3$" is described on the digit of $2^0$, and the coefficient "$a_2e_3$" is described on the digit of $2^1$. Similarly, the coefficients of the expression of the circled number 9 are described on the second row of the table of FIG. 11, the coefficients of the expression of the circled number 4 are described on the third row, the coefficients of the expression of the circled number 8 are described on the fourth row, the coefficients of the expression of the circled number 3 are described on the fifth row, and the coefficients of the expression of the circled number 7 are described on the sixth row, the coefficients of the expression of the circled number 2 are described on the seventh row, the coefficients of the expression of the circled number 6 are described on the eighth row, and the coefficients of the expression of the circled number 1 are described on the ninth row.

The coefficients $a_0$, $a_1$, $a_2$, $b_0$, $b_1$, and $b_2$ described in the table of FIG. 11 are any bits of the unsigned parts of the interpolation target values A and B, and can be regarded as bits indicating absolute values (in other words, the signed parts $a_3$ and $b_3$ of the interpolation target values A and B are not included in the table of FIG. 11). Therefore, concerning these bits, the part of the absolute value of the interpolated value C can be calculated by performing only addition without considering signs.

Conveniently, in the coefficients of the same digit, many pair of complementary coefficients are included. For example, on the digit of $2^{-4}$, three coefficients of $a_0e_0$ on the seventh row, $b_0d_0$ on the eighth row, and $a_0$ on the ninth row are described, and the bit $c_0$ can be calculated by summing up these three coefficients. However, $e_i$ is logically inverted bit of $d_i$, $a_0e_0$ on the seventh row and $b_0d_0$ on the eighth row compose a pair of complementary coefficients, and either one is always 0. For example, when $e_0$=1, $d_0$=0, so that the bit $c_0$ is calculated only by performing an arithmetic operation to add $a_0$ on the seventh row to $a_0$ on the ninth row. To the contrary, when $e_0$=0, $d_0$=1, so that the bit $c_0$ is calculated only by performing an arithmetic operation to add $b_0$ on the eighth row to $a_0$ on the ninth row.

Resultantly, to calculate the bit $c_0$, either the coefficient $a_0$ on the seventh row or the coefficient $b_0$ on the eighth row is selected according to the value of $d_0$ (in detail, when $d_0$=0, $a_0$ is selected, and when $d_0$=1, $b_0$ is selected), and the result of selection is added to the coefficient $a_0$ on the ninth row. Such a pair of complementary coefficients can be found for all digits, for example, on the fifth row and the sixth row, and the seventh row and the eighth row of the digit of $2^{-3}$, the third row and the fourth row, the fifth row and the sixth row, and the seventh row and the eighth row of the digit of $2^{-2}$, and so on. Therefore, the constitution of the arithmetic circuit which performs addition for each digit is significantly simplified.

Figure 12:
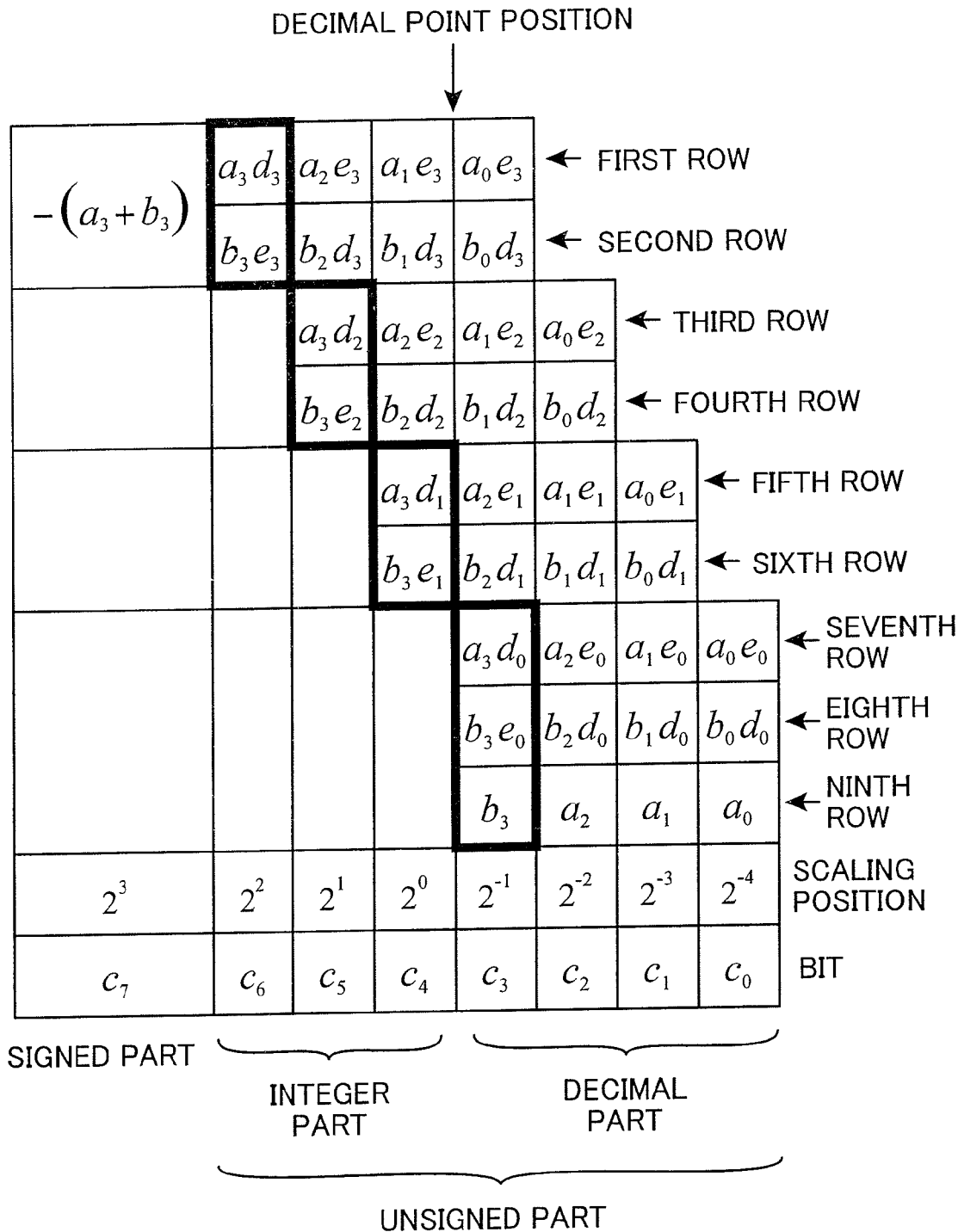
FIG. 12 is a table showing coefficients of members composing the expression shown in FIG. 10, sorted by digits.

The table shown in FIG. 12 sorts all coefficients of the respective members composing the (Expression 1-14) shown in FIG. 10 by digits. In this table, "$-(a_3+b_3)$" described on the digit of $2^3$ corresponds to the coefficient of the signed part of the (Expression 1-14), and the coefficients described in the parts enclosed by thick lines correspond to the respective coefficients of the unsigned part 1 of the (Expression 1-14). In other words, the table shown in FIG. 12 is a table obtained by further adding the coefficients of the signed part and the unsigned part 1 to the table of FIG. 11. The coefficients added in FIG. 12 do not relate to the absolute value of the interpolated value C, but relate to the sign of the interpolated value C. Hereinafter, the way of determination of the sign of the interpolated value C will be described.

On the digit of $2^3$ of FIG. 12, the signed coefficient "$-(a_3+b_3)$" is described, and this is a reprint of the coefficient of the signed part of the (Expression 1-14) without change for convenience, and it does not indicate an original bit to be used in an actual operation. In the original bit operation, there is no concept of the sign "minus." Therefore, in the table of FIG. 12, the bits $c_6$, $c_5$, $c_4$, $c_3$, $c_2$, $c_1$, and $c_0$ corresponding to the unsigned part of the interpolated value C can be determined by normal arithmetic operation of summing the coefficients described on the respective digits (columns), and carrying to the higher-order digit as appropriate, however, the value of the bit $c_7$ corresponding to the signed part is determined by the following method.

First, the result of operation of ($a_3+b_3$) is calculated. $a_3$ and $b_3$ are both 1-bit values (0 or 1), so that the result of operation of ($a_3+b_3$) becomes any one of 0, 1, and 10 in binary expression. Next, carrying from the digit of the bit $c_6$ (digit of $2^2$) (either 0 or 1 in binary expression: 1 when carrying occurs, and 0 when carrying does not occur) is calculated by performing an arithmetic operation relating to the unsigned part (addition to obtain the bits $c_6$ to $c_0$ shown in FIG. 12) and added to the result of operation of $(a_3+b_3)$. Then, a binary number obtained as a result of this addition is calculated, and when the calculated binary number is 1 bit, this bit is set as the value of the bit $c_7$, and when the calculated binary number is 2 bits, the lower-order bit is set as the value of the bit $c_7$.

The meaning of determination of the value of bit $c_7$ by this method will be described. Herein, for the sake of convenience of explanation, description is dividedly given based on the signs of the two interpolation target values A and B.

First, the case where both values A and B are positive is considered. In this case, $a_3=0$ and $b_3=0$, so that the sum of $(a_3+b_3)$ is also 0. In this case, carrying from the unsigned part also results in 0 (that is, carrying from the unsigned part does not occur). This is because the parts enclosed by the thick lines in FIG. 12 (unsigned parts 1) are all 0 since $a_3=0$ and $b_3=0$, and carrying caused by these results in 0. Concerning the parts on the right of the parts enclosed by the thick lines (unsigned parts 2: parts described in the table of FIG. 11), carrying caused by these parts to the digit of the bit $c_7$ always results in 0.

The reason for this is that this operation is interpolation of the two interpolation target values A and B. The unsigned part indicates an absolute value of the interpolated value C, and this absolute value always becomes an intermediate value of the absolute value of the value A and the absolute value of the value B, so that it never exceeds the absolute value of the value A and the absolute value of the value B. Therefore, as long as addition concerning the parts described in the table of FIG. 11 is performed, carrying to the digit of bit $c_7$ always results in 0. This can be easily understood by considering that, when two positive numbers less than 100 are set as interpolation target values A and B, an interpolated value C thereof is always a positive value less than 100. In this case, it is impossible that the interpolated value C becomes a three-digit number. As long as the interpolation target values A and B are both two-digit numbers, the interpolated value C thereof also becomes a two-digit number, and a carrying from the second digit to the third digit is always 0.

Resultantly, when both values A and B are positive, by adding the carry (=0) from the unsigned part to $(a_3+b_3)$=0, a bit $c_7$=0 is obtained. This indicates the obtained interpolated value C is a positive number, and means that correct sign handling was performed.

Next, the case where the values A and B are both negative is considered. In this case, $a_3=1$ and $b_3=1$, so that the sum of $(a_3+b_3)$ becomes 10. In this case, a carry from the unsigned part also always becomes 1 (that is, carrying from the digit of the bit $c_0$ to the digit of the bit $c_7$ always occurs). This is easily understood by considering the arithmetic operation of the parts (unsigned parts 1) enclosed by the thick lines in FIG. 12. First, the sum of the unsigned part (part enclosed by the thick line) described on the digit of the bit $c_3$ is "$a_3d_0+b_3e_0+b_3$," and $a_3=1$ and $b_3=1$, and either $d_0$ or $e_0$ is 1, so that the sum total of the digit of the bit $c_3$ becomes at least "10," and carrying from the digit of bit $c_3$ to the digit of bit $c_4$ always occurs.

Next, the sum of the unsigned part 1 (part enclosed by the thick line) described on the digit of bit $c_4$ is "$a_3d_1+b_3e_1$," and $a_3=1$ and $b_3=1$, and either one of $d_1$ and $e_1$ is 1 and the other is 0, so that "$a_3d_1+b_3e_1=1$." Herein, a carry from the digit of the bit $c_3$ is added thereto, so that the sum total of the digit of the bit $c_4$ becomes at least "10," and carrying from the digit of the bit $c_4$ to the bit $c_5$ always occurs.

Similarly, carrying from the digit of the bit $c_5$ to the digit of the bit $c_6$ also always occurs, and carrying from the digit of the bit $c_6$ to the digit of the bit $c_7$ also always occurs. Resultantly, when both values A and B are negative, by adding the carry (=1) from the unsigned part to $(a_3+b_3)$=10, the result "11" of addition is obtained. The bit $c_7$ is defined as a lower-order bit of this result of addition, so that bit $c_7$=1 is obtained. This indicates that the obtained interpolated value C is a negative, and means that correct sign handling was performed.

Last, the case where either one of the values A and B is positive and the other is negative is considered. In this case, the sum of $(a_3+b_3)$ becomes 1, so that the value of the bit $c_7$ becomes 0 or 1 depending on the carry from the unsigned part. Herein, detailed description is omitted, however, when the obtained interpolated value C becomes zero or a positive number, carrying from the unsigned part always occurs, and when the obtained interpolated value C becomes a negative number, carrying from the unsigned part does not occur. Therefore, when the interpolated value C is zero or a positive number, by adding the carry of 1 to 1 that is a result of operation of $(a_3+b_3)$, a result "10" of addition is obtained, and the bit $c_7$ defined as a lower-order bit of the result of addition becomes 0. This indicates that the obtained interpolated value C is zero or a positive number, and means that correct sign handling was performed. To the contrary, when the interpolated value C is negative, by adding the carry 0 to the result 1 of operation of $(a_3+b_3)$, a result "1" of addition is obtained, and the bit $c_7$ becomes 1. This indicates that the obtained interpolated value is a negative number, and means that correct sign handling was performed.

By thus determining the value of the bit $c_7$ by the above-described method in the arithmetic operation based on the table of FIG. 12, correct sign handling becomes possible.

For the sake of convenience of explanation, the concrete case where n=4 is described as an example, however, as a matter of course, n can be set to an arbitrary number as long as it is an integer not less than 2. In short, the first aspect of the invention is characterized in that a linear interpolator which performs operations for calculating a linear interpolated value C expressed as C=(1−D)*A+D*B based on two signed interpolation target values A and B and an interpolation rate D ($0 \leq D<1$) is constituted so as to obtain the linear interpolated value C by performing multiplications and additions defined by the arithmetic expression shown in the (Expression 1-12) of FIG. 7, that is, $C=-(a_{n-1}+b_{n-1}) \ 2^{n-1}+b_{n-1}2^{-1}+(a_{n-1}\Sigma_{i=0 \sim n-1}d_i2^{(i-1)}+b_{n-1}\Sigma_{j=0 \sim n-1}e_i2^{(i-1)})+(2^{-n}+\Sigma_{i=0 \sim n-1}e_i2^{(i-1)})\cdot\Sigma_{j=0 \sim n-2}a_j2^j+\Sigma_{i=0 \sim n-1}d_i2^{(i-n)}\cdot\Sigma_{j=0 \sim n-1}b_j2^j$ ($e_i$ is a logically inverted bit of $d_i$).

In this case, the interpolation target value A to be given to this interpolator is composed of a signed part consisting of a most significant bit indicating a sign and an unsigned part consisting of (n−1) bits indicating an absolute value ($n \geq 2$), and has bits of $a_{n-1}, a_{n-2}, \ldots, a_1$, and $a_0$ in order from the most significant bit side as digital data of n bits in total expressing a negative number by twos complement notation.

The interpolation target value B to be given to this interpolator is composed of a signed part consisting of a most significant bit indicating a sign and an unsigned part consisting of (n−1) bits indicating an absolute value ($n \geq 2$), and has bits of $b_{n-1}, b_{n-2}, \ldots, b_1$, and $b_0$ in order from the most significant bit side as digital data of n bits in total expressing a negative number by twos complement notation.

Furthermore, the interpolation rate D to be given to this interpolator has bits of $d_{n-1}, d_{n-2}, \ldots, d_1$, and $d_0$ in order from the most significant bit side as digital data of n bits in total indicating only a decimal part.

In the above-described arithmetic expressions, the part of "$b_{n-1}2^{-1}+(a_{n-1}\ \Sigma_{i=0\sim n-1}d_i2^{(i-1)}+\Sigma_{i=0\sim n-1}e_i2^{(i-1)})+(2^{-n}+\Sigma_{i=0\sim n-1}e_i2^{(i-1)})\cdot\Sigma_{j=0\sim n-2}a_j2^j+\Sigma_{i=0\sim n-1}d_i2^{(i-n)}\cdot\Sigma_{j=0\sim n-2}b_j2^j$" ($e_i$ is a logically inverted bit of $d_i$) indicates an arithmetic operations relating to the unsigned part, and by performing this arithmetic operation relating to the unsigned part 2, digital data of (2n–1) bits in total including $c_{2n-2}, c_{2n-3}, \ldots, c_1$, and $c_0$ in order from the most significant bit side can be generated.

On the other hand, in the above-described arithmetic operations, for the part of "$-(a_{n-1}+b_{n-1})2^{n-1}$," a binary number obtained by summing up the result of operation $a_{n-1}+b_{n-1}$ (any of 0, 1, and 10 in binary expression) and carry (either 0 or 1 in binary expression) from the digit of bit $c_{2n-2}$ obtained as a result of operation relating to the unsigned part is calculated, and when the calculated binary number is 1 bit, this bit is calculated as the value of the bit $c_{2n-1}$, and when the calculated binary number is 2 bits, the lower-order bit is calculated as the value of the bit $c_{2n-1}$.

When digital data of 2n bits in total obtained by arranging the bits $c_{2n-1}, c_{2n-2}, c_{2n-3}, \ldots, c_1$, and $c_0$ in sequence is obtained, this digital data of 2n bits or digital data corresponding to a necessary number of significant figures in the digital data of 2n bits is outputted as digital data indicating the linear interpolated value C.

By thus designing a linear interpolator based on the arithmetic expression shown as the (Expression 1-12) of FIG. 7, very rational sign handling becomes possible, and when performing addition of the same digit, an efficient operation using a pair of complementary coefficients becomes possible, so that a linear interpolator which can efficiently perform linear interpolation of two signed interpolation target value by a simple constitution can be realized.

<<<Section 1-4. Concrete Constitution Example of Linear Interpolator According to First Aspect of the Invention>>>

Next, a concrete constitution example of a linear interpolator having a function to perform interpolation based on the arithmetic expression (Expression 1-12) according to the first aspect of the invention shown in FIG. 7 will be described. The arithmetic expression of the (Expression 1-12) is mainly composed of a signed part and unsigned parts (unsigned parts 1 and 2), so that the part to perform an arithmetic operation relating to the signed part will be referred to as a signed part arithmetic means, and the part to perform an arithmetic operation relating to the unsigned part will be referred to as an unsigned part arithmetic means. The unsigned part arithmetic means can be constituted by a combination of a selector and a counter. As a selector, a device which has a function to select and output either the bit $a_i$ or $b_i$ (i=0, 1, 2, ... (n–1)) based on a logical value of a predetermined bit of digital data indicating an interpolation rate D is used, and as a counter, a device having a function to input the bit $a_i$ or $b_i$ (i=0, 1, 2, ... (n–1)), an output value of the selector, or an output value of another counter and output a result of addition of the inputted values is used.

Figure 13:
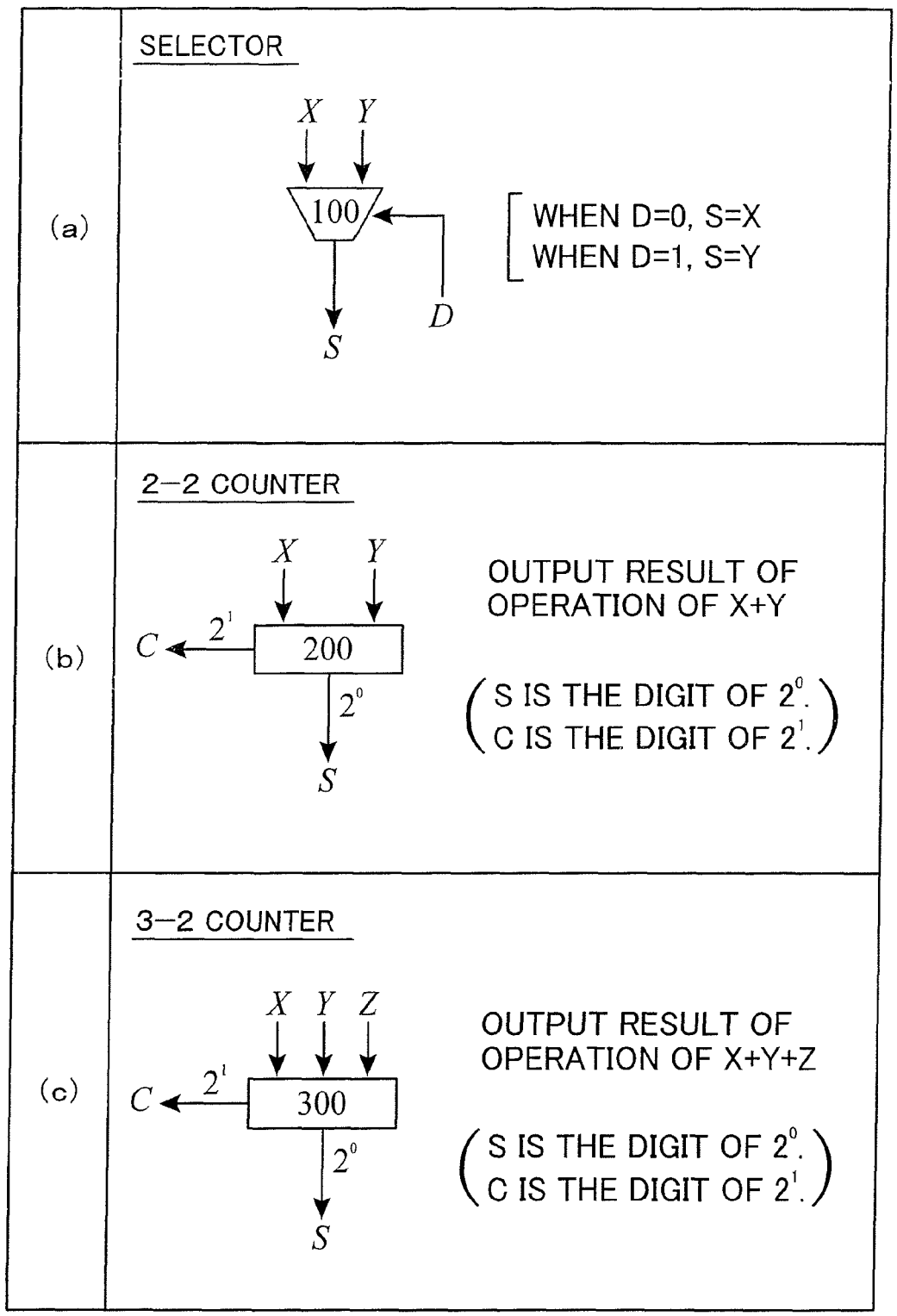
FIG. 13 are diagrams showing basic components of a linear interpolator according to an embodiment of the first aspect of the invention.

FIG. 13 are diagrams showing a concrete example of the selector and counter having the above-described functions, and these selector and counter are used as detailed basic components of the linear interpolator described later.

First, the selector 100 shown in FIG. 13(a) is a component having function to output either one of the two input values X and Y (both are 1-bit values) as a selected value S. It is determined which input value is selected depending on the logical state of a control value D of 1 bit. Namely, when the control value D=0, the input value X is selected (S=X), and when the control value D=1, the input value Y is selected (S=Y).

Next, the 2-2 counter 200 shown in FIG. 13(b) is a component having a function to perform addition of the two input values X and Y (both are 1-bit values), outputs the value of the digit of $2^0$ that is a result of operation as a sum S, and outputs the value of the digit of $2^1$ that is a result of operation as carry C (carried to the digit on the higher-order). Both sum S and carry C are 1-bit data.

The 3-2 counter 300 shown in FIG. 13(c) is a component having a function to perform addition of three input values X, Y, and Z (all are 1-bit values), outputs a value of the digit of $2^0$ that is a result of operation as a sum S, and outputs the value of the digit of $2^1$ of the result of operation as a carry C (carried to the higher-order digit). The sum S and the carry C is still 1-bit data.

Figure 14:
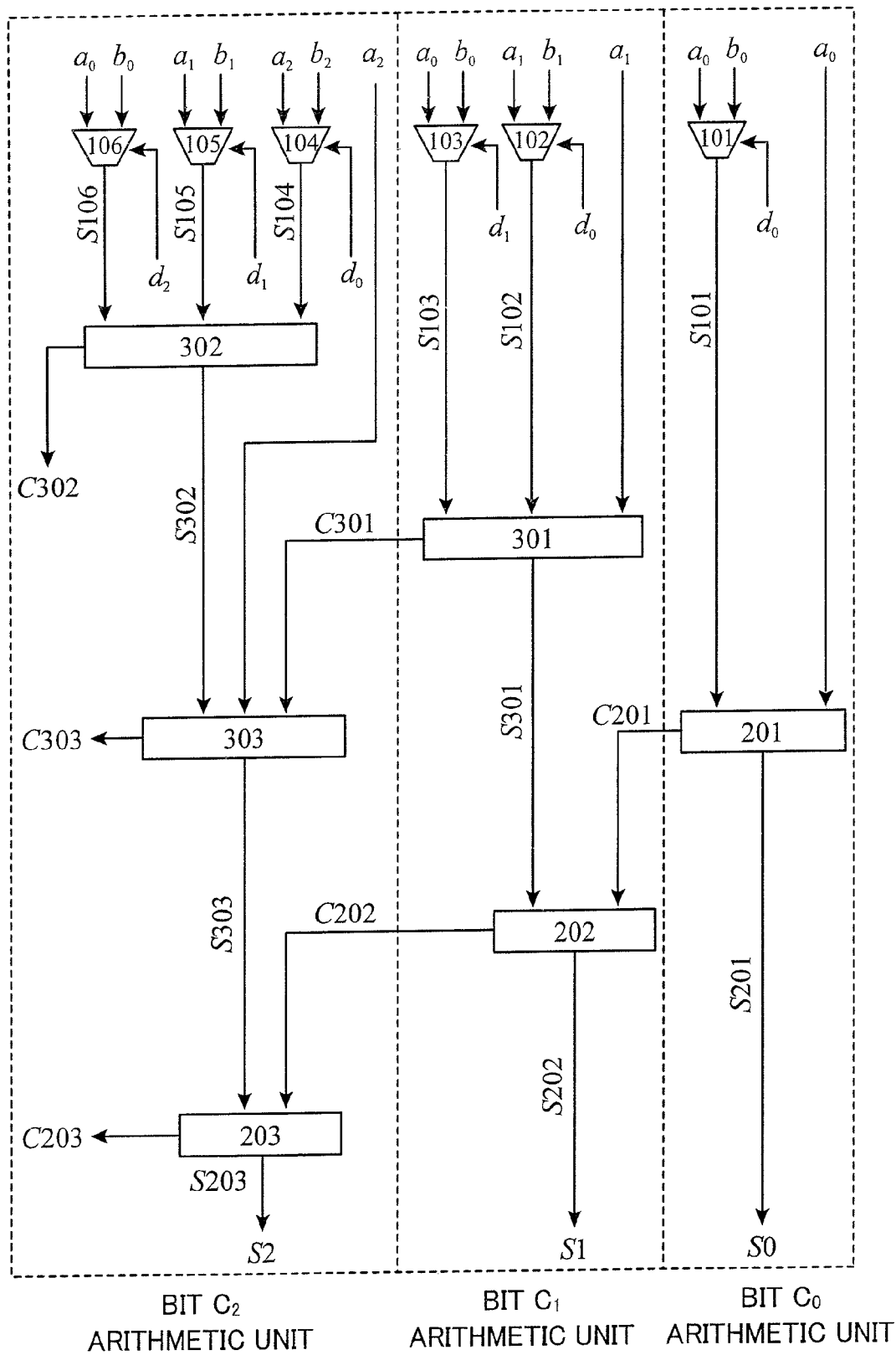
FIG. 14 is a circuit diagram showing a first portion of the linear interpolator according to an embodiment of the first aspect of the invention.
Figure 15:
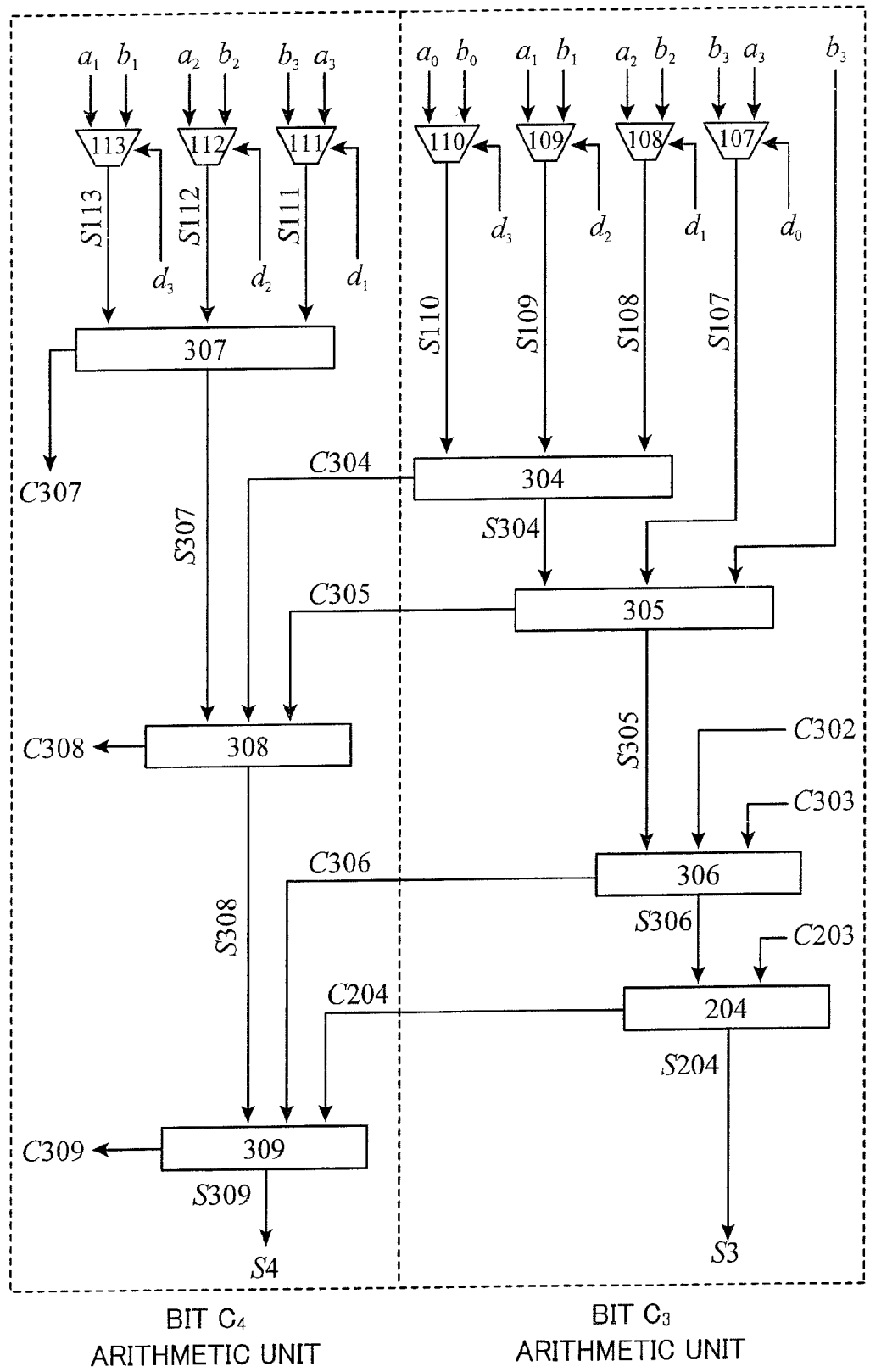
FIG. 15 is a circuit diagram showing a second portion of the linear interpolator according to an embodiment of the first aspect of the invention.
Figure 16:
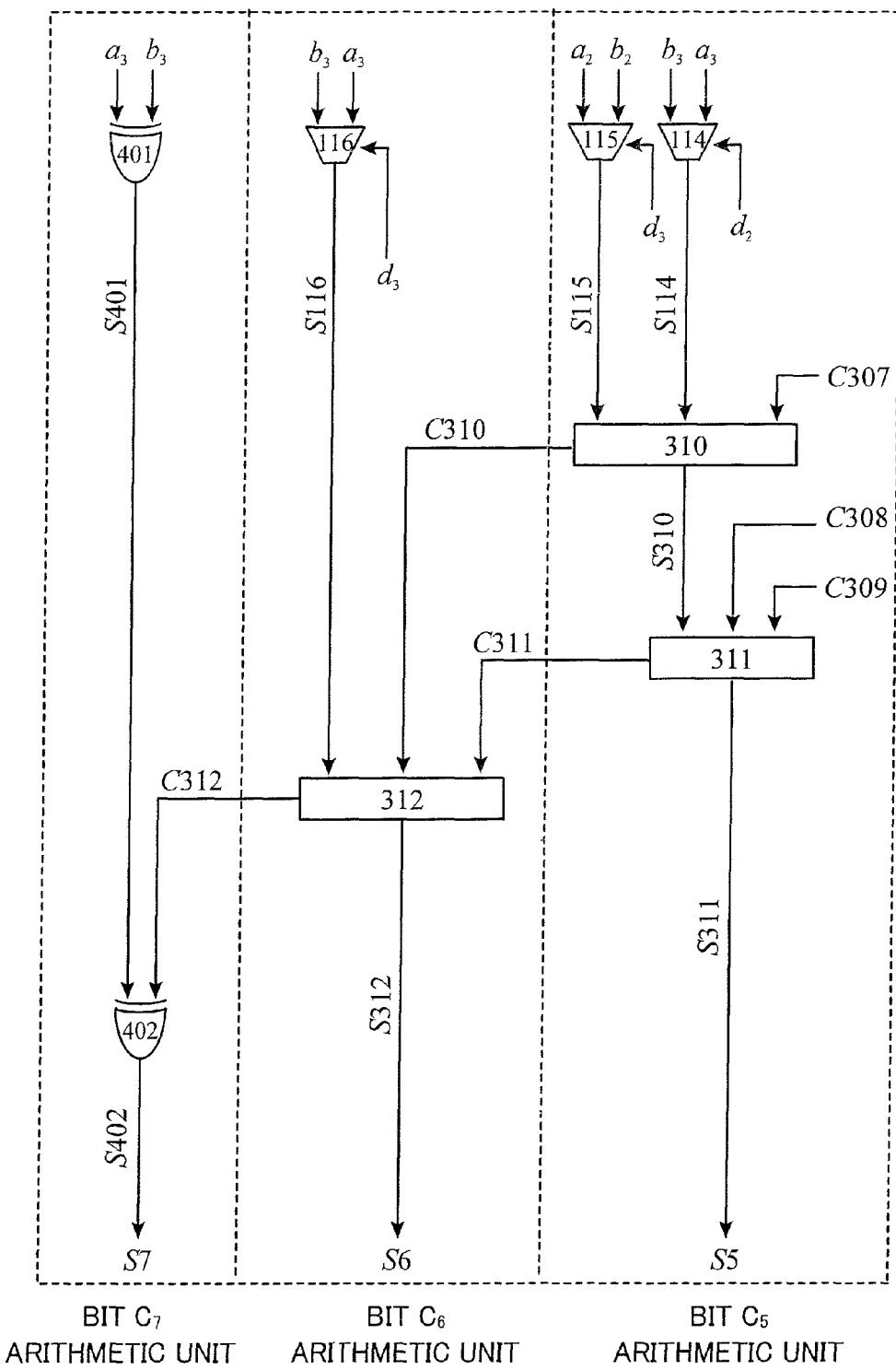
FIG. 16 is a circuit diagram showing a third portion of the linear interpolator according to an embodiment of the first aspect of the invention.

FIG. 14 through FIG. 16 are circuit diagrams showing a linear interpolator constituted by combining the selector 100, the 2-2 counter 200, and the 3-2 counter 300 shown in FIG. 13. For the sake of convenience of illustration, they are dividedly shown by three diagrams, however, one linear interpolator is constituted by the entire circuit drawn in these three diagrams. In the diagrams, the components 101 through 116 attached with numbers in the range from 100 to 199 are components equivalent to the selector 100 shown in FIG. 13(a), the components 201 through 204 attached with numbers in the range from 200 to 299 are components equivalent to the 2-2 counter 200 shown in FIG. 13(b), and the components 301 through 312 attached with numbers in the range from 300 to 399 are components equivalent to the 3-2 counter 300 shown in FIG. 13(c). The components 401 and 402 shown in FIG. 16 are XOR circuits (exclusive OR circuits).

For the sake of convenience of explanation, the selected values outputted from the selectors are indicated by reference numerals including S attached to the heads of the selector numbers, and the sums or carries to be outputted from the counters are indicated by reference numerals including S or C attached to the heads of the counter numbers. For example, S101 shown on the right side of FIG. 14 denotes a selected value outputted from the selector 101, S201 denotes a sum outputted from the counter 201, and C201 denotes a carry (to be added to the higher-order digit) outputted from the counter 201. S401 and S402 shown on the left side of FIG. 16 are exclusive logical sums of the respective XOR circuits 401 and 402.

The linear interpolator shown in FIG. 14 through FIG. 16 performs arithmetic operations to calculate an interpolated value C based on the arithmetic expression (expression when n=4) shown as (Expression 1-13) of FIG. 8. The constitution thereof corresponds to the table of FIG. 12. Namely, the bit $c_0$ arithmetic unit, the bit $c_1$ arithmetic unit, and the bit $c_2$ arithmetic unit shown in FIG. 14, the bit $c_3$ arithmetic unit and the bit $c_4$ arithmetic unit shown in FIG. 15, and the bit $c_5$ arithmetic unit and the bit $c_6$ arithmetic unit shown in FIG. 16 are components for performing arithmetic operations to calculate the bits $c_0$ through $c_6$ in the table of FIG. 12, respectively, and the bit $c_7$ arithmetic unit is a component for performing an arithmetic operation to calculate the bit $c_7$ in the table of FIG. 12. In other words, unsigned part arithmetic means is constituted by the bit $c_0$ arithmetic unit through the bit $c_6$ arithmetic unit, and a signed part arithmetic means is constituted by the bit $c_7$ arithmetic unit.

The values $a_0, a_1, a_2$, and $a_3$ shown in FIG. 14 through FIG. 16 are bits of the interpolation target value A, the values $b_0, b_1, b_2$, and $b_3$ are bits of the interpolation target value B, and the values $d_0, d_1, d_2$, and $d_3$ are bits of the interpolation rate D. The output values S0 through S7 drawn under the respective bit arithmetic units correspond to the bits $c_0$ through $c_7$ in the table of FIG. 12.

For example, focusing attention on the constitution of the bit $c_0$ arithmetic unit shown in FIG. 14, it is understood that the constitution is made for performing an arithmetic operation to calculate the bit $c_0$ in the table of FIG. 12. The selector 101 selects either one of the two input values $a_0$ and $b_0$ based on the control value $d_0$, and outputs the selected input value as the selected value S101, and this is processing corresponding to addition of the coefficients "$a_0e_0$" and "$b_0d_0$" shown on the digit of the bit $c_0$ in the table of FIG. 12. As described above, "$a_0e_0$" and "$b_0d_0$" are in a complementary relationship, and when $d_0=1$, $a_0e_0=0$ and $b_0d_0=b_0$, and when $d_0=0$, $a_0e_0=a_0$ and $b_0d_0=0$, so that it is possible that by the selector 101, S101=$b_0$ is outputted as the selected value when $d_0=1$, and S101=$a_0$ is outputted as the selected value when $d_0=0$ instead of the processing corresponding to addition of the coefficients "$a_0e_0$" and "$b_0d_0$." Last, if the selected value S101 and $a_0$ are summed up by the counter 201, and as a result, the operation to calculate the bit $c_0$ in the table of FIG. 12 is performed.

At this time, when there is carrying to the digit of the bit $c_1$, carry C201=1 is transmitted to the bit $c_1$ arithmetic unit. As a matter of course, when there is no carrying, carry C201=0 is transmitted to the bit $c_1$ arithmetic unit. Operations for other digits are the same as this.

Only the bit $c_7$ arithmetic unit on the left side of FIG. 16 must determine the bit $c_7$ to function as a signed part, so that the unit has a constitution different from that of other arithmetic units. As processing for determining the bit $c_7$, as described in Section 1-3 above, a binary number that is obtained by adding a carry from the bit $c_6$ arithmetic unit to the sum of ($a_3+b_3$) (any of 0, 1, and 10 in binary expression) is calculated, and when the calculated binary number is 1 bit, this bit is set as the value of the bit $c_7$, and when the calculated binary number is 2 bits, the lower-order bit is set as the value of the bit $c_7$. The illustrated circuit constituted by the XOR circuits 401 and 402 are circuits for performing this processing.

Namely, the output value S401 of the XOR circuit 401 becomes 0 when $a_3$ and $b_3$ are equal to each other, or becomes 1 when $a_3$ and $b_3$ are different, so that it becomes 0 when $a_3=0$ and $b_3=0$, becomes 1 when $a_3=1$ and $b_3=0$, becomes 1 when $a_3=0$ and $b_3=1$, and becomes 0 when $a_3=1$ and $b_3=1$. The output value S402 of the XOR circuit 402 becomes an exclusive logical sum of the output values S401 and C312 (carry from the bit $c_6$ arithmetic unit), so that it becomes 0 when S401=0 and C312=0, becomes 1 when S401=1 and S312=0, becomes 1 when S401=0 and C312=1, and becomes 0 when S401=1 and C312=1. Resultantly, the output value S402 of the XOR circuit 402 is the lower-order bit of a binary number obtained by adding a carry from the bit $c_6$ arithmetic unit to the sum of ($a_3+b_3$).

When n is set to an arbitrary value, the signed part arithmetic means is constituted by a first XOR circuit which outputs an exclusive logical sum of the bit $a_{n-1}$ and the bit $b_{n-1}$ and a second XOR circuit which outputs an exclusive logical sum of a bit indicating a carry (either 0 or 1 in binary expression) from the digit of the bit $c_{2n-2}$ obtained as a result of operation of the unsigned part arithmetic means and the output bit of the first XOR circuit.

The signed part arithmetic means is not always necessarily constituted by using the XOR circuits. For example, instead of the XOR circuits 401 and 402 shown in FIG. 16, it is also possible to use the 2-2 counter 200 shown in FIG. 13(*b*). In this case, the value of the sum S of the 2-2 counter is used as the output values S401 and S402 and the carry C is ignored. In this constitution, the carry C becomes wasteful, so that in practical use, it is preferable to use the XOR circuits as shown in FIG. 16.

Figure 17:
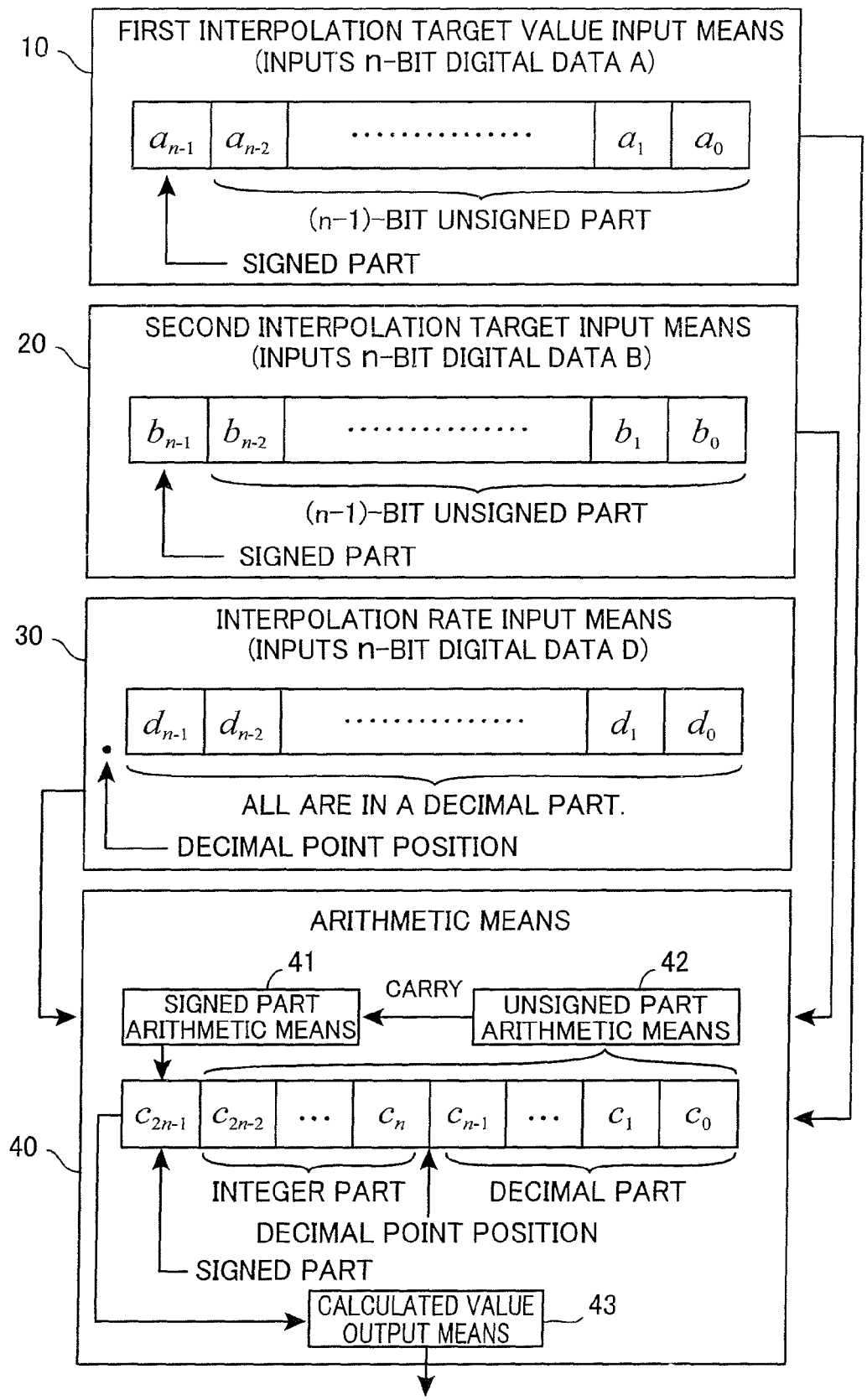
FIG. 17 is a block diagram showing an entire constitution of the linear interpolator according to the first aspect of the invention.

A constitution example of the major portion of the linear interpolator according to the first aspect of the invention is described above with reference to the circuit diagrams of FIG. 14 through FIG. 16, however, in actuality, to this major portion, a component for inputting the digital data A, B, and D and a component for outputting the digital data C from the major portion must be added. FIG. 17 is a block diagram showing an entire constitution of a linear interpolator according to the first aspect of the invention, obtained by adding the components for said inputting and outputting.

As illustrated, this linear interpolator comprises a first interpolation target value input means 10 for inputting n-bit digital data A, second interpolation target value input means 20 for inputting n-bit digital data B, an interpolation rate input means 30 for inputting n-bit digital data D, and arithmetic means 40.

The first interpolation target value input means 10 is means for inputting an interpolation target value A including bits $a_{n-1}, a_{n-2}, \ldots, a_1$, and $a_0$ in order from the most significant bit side as digital data of n bits in total expressing a negative number by twos complement notation composed of a signed part consisting of a most significant bit $a_{n-1}$ indicating a sign and an unsigned part consisting of (n−1) bits ($a_{n-2}, \ldots, a_1$, and $a_0$) indicating an absolute value (n≧2).

The second interpolation target value input means 20 is means for inputting an interpolation target value B including bits $b_{n-1}, b_{n-2}, \ldots, b_1$, and $b_0$ in order from the most significant bit side as digital data of n bits in total expressing a negative number by twos complement notation composed of a signed part consisting of a most significant bit $b_{n-1}$ indicating a sign and an unsigned part consisting of (n−1) bits ($b_{n-2}, \ldots, b_1$, and $b_0$) indicating an absolute value (n≧2).

On the other hand, the interpolation rate input means 30 is means for inputting an interpolation rate D including bits $d_{n-1}, d_{n-2}, \ldots, d_1$, and $d_0$ in order from the most significant bit side as digital data of n bits indicating only a decimal part.

The arithmetic means 40 comprises signed part arithmetic means 41, unsigned part arithmetic means 42, and calculated value output means 43 as illustrated. Herein, the unsigned part arithmetic means 42 functions to generate digital data of (2n−1) bits in total including bits $c_{2n-2}, c_{2n-3}, \ldots, c_1$, and $c_0$ in order from the most significant bit side by performing an arithmetic operation based on the arithmetic expression $b_{n-1}2^{-1}+(a_{n-1}\Sigma_{i=0 \sim n-1}d_i 2^{(i-1)}+b_{n-1}+\Sigma_{i=0 \sim n-1}e_i 2^{(i-1)})+(2^{-n}+\Sigma_{i=0 \sim n-1}e_i 2^{(i-1)})\cdot\Sigma_{j=0 \sim n-2}a_j 2^j+\Sigma_{i=0 \sim n-1}d_i 2^{(i-n)}\cdot\Sigma_{j=0 \sim n-2}b_j 2^j$ ($e_i$ is a logically inverted bit of $d_i$). The signed part arithmetic means 41 functions to calculate, as a value of the bit $c_{2n-1}$, a bit of the digit on the right side of a binary number obtained by adding a result (any of 0, 1, and 10 in binary expression) of operation of $a_{n-1}+b_{n-1}$ and a carry (either 0 or 1 in binary expression) from the digit of the bit $c_{2n-2}$ obtained as a result of operation by the unsigned part arithmetic means. The calculated value output means 43 functions to output "digital data of 2n bits in total composed by arranging the bits $c_{2n-1}, c_{2n-2}, c_{2n-3}, \ldots, c_1$, and $c_0$ in sequence in order from the most significant bit side" or "digital data corresponding to a necessary number of significant figures in the digital data of 2n bits" as digital data showing a linear interpolated value C.

The digital data of 2n bits in total obtained by arranging the bits $c_{2n-1}, c_{2n-2}, c_{2n-3}, \ldots, c_1$, and $c_0$ in sequence is data including a decimal point positioned between the bit $c_n$ and the bit $c_{n-1}$ and the bit $c_{2n-1}$ indicates a signed part, the bits $c_{2n-2}, c_{2n-3}, \ldots, c_n$ indicate an integer part, and the bits $c_{n-1}, \ldots, c_1$, and $c_0$ indicate a decimal part.

As described above, according to the first aspect of the invention, interpolation of signed values A and B can be efficiently performed by simple circuitry. The summary of the first aspect of the invention is described as follows with reference to FIG. 12. First, to calculate an interpolated value C based on 4-bit values A (bits $a_3a_2a_1a_0$) and B (bits $b_3b_2b_1b_0$) expressing a negative number by twos complement notation and a 4-bit interpolation rate D (bits $d_3d_2d_1d_0$) composed of only a decimal part, the basic expression of $C=(1-D)*A+D*B$ is transformed into an expression composed of an unsigned part which includes a sum of products with the bit $d_i$ or a logically inverted value $e_i$ of $d_i$ (i=0, 1, 2, 3), and indicates an absolute value of the interpolated value C and a signed part indicating a sign of the interpolated value C. Then, by an arithmetic operation of the unsigned part, 7 bits $c_6$ through $c_0$ are generated, and the signed part is logically judged by considering a carry from the digit of the bit $c_6$ caused by the arithmetic operation of the unsigned part to generate the bit $c_7$. Necessary significant digits of the obtained 8-bit value C (bits $c_7$ to $c_0$) are outputted as an interpolated value.

Section 2. Embodiment According to Second Aspect of the Invention

Next, the second aspect of the invention will be described based on the illustrated embodiment. The second aspect of the invention realizes a linear interpolator which can calculate a linear interpolated value of two interpolation target values with high accuracy and has simple circuitry.

<<<Section 2-1. Basic Concept of Linear Interpolation>>>

First, a basic concept of general linear interpolation will be briefly described. FIG. 18 is a graph showing the basic concept of linear interpolation. In the illustrated example, an interval 0-1 is set on the x axis, and when a value of the function f(x) is defined only on both ends of the interval, a method for calculating the function value at an arbitrary position $\alpha$ in the interval 0-1 by linear interpolation is shown. In detail, when f(0)=A and f(1)=B, a function value $f(\alpha)=C$ concerning an arbitrary $\alpha$ in the range of $0\leq\alpha\leq1$ is calculated by linear interpolation using the values A and B.

In linear interpolation, as illustrated, a straight line is defined between the point A and the point B, and as a vertical coordinate value of a point C on this straight line, the value of C is calculated. Herein, the position of the arbitrary point $\alpha$ is defined as "position dividing the interval 0-1 at a ratio of $[\alpha:(1-\alpha)]$," and $\alpha$ is referred to as an interpolation rate, the linear interpolated value C can be calculated by the arithmetic operation expressed as the basic expression $C=(1-\alpha)*A+\alpha*B$ by using the two interpolation target values A and B and the interpolation rate $\alpha$ (* sign representing multiplication).

For example, when concrete values A=10, B=20, and $\alpha$=0.4 are given, by performing the arithmetic operation of $C=(1-0.4)*10+(0.4*20)$, an interpolated value C=14 is obtained. Such interpolation is generally called "$\alpha$-blend."

The principle of such linear interpolation was described in Section 1-1 with reference to FIG. 1. However, in the example shown in FIG. 1, description using a value D as the interpolation rate is given, and on the other hand, in the example shown in FIG. 18, description using a value $\alpha$ as the interpolation rate is given. The difference between the value $\alpha$ and the value D is that the value $\alpha$ is a value indicating the original interpolation rate in the range "$0\leq\alpha\leq1$," and on the other hand, the value D is a value indicating an interpolation rate in the range of "$0\leq D<1$" that does not include 1.

In the first aspect of the invention described in Section 1, the use of the value D as the interpolation rate is due to the operation using digital data. Namely, when an interpolator which performs linear interpolation is constituted by an electronic circuit in actuality, it is necessary to handle values as digital data composed of bit sequences with finite lengths, respectively. Therefore, normally, an arithmetic operation using the value D instead of the value $\alpha$ for the sake of convenience is performed. This point will be described in greater detail.

The original interpolation rate $\alpha$ is a number in the range of $0\leq\alpha\leq1$, and herein, it is assumed that $\alpha=0.d_7d_6d_5d_4d_3d_2d_1d_0$ is defined by using the digital value D shown by an 8-bit sequence of $d_7d_6d_5d_4d_3d_2d_1d_0$ ($d_7$, $d_6$, ..., are 1-bit data taking 1 or 0). Similarly, when the interpolation target value A is expressed as an 8-bit sequence "$a_7a_6a_5a_4a_3a_2a_1a_0$" and the interpolation target value B is expressed as an 8-bit sequence "$b_7b_6b_5b_4b_3b_2b_1b_0$," the arithmetic operation based on the above-described basic expression $C=(1-\alpha)*A+\alpha*B$ can be performed by repeating addition of the bits in principle, and an interpolator can be constituted by a comparatively simple circuit.

However, the interpolation rate $\alpha$ defined as the form of $\alpha=0.d_7d_6d_5d_4d_3d_2d_1d_0$ is not a mathematically accurate value. Namely, when the digital value D takes a minimum value 0, all bits become 0, so that $\alpha=0.00000000$, and it is mathematically 0. However, when the digital value D takes a maximum value 255, all bits become 1, so that $\alpha=0.11111111$, and when it is decadally expressed, it becomes approximately 0.9961. Resultantly, the constitution of the interpolator becomes simple by defining the interpolation rate $\alpha$ as the form of $\alpha=0.d_7d_6d_5d_4d_3d_2d_1d_0$, however, $\alpha$ is defined only in the range of $0\leq\alpha\leq$approximately 0.9961, and an arithmetic operation concerning $\alpha=1$ cannot be performed.

To cope with this, an interpolator which is provided with a comparator for monitoring whether the input value of the interpolation rate $\alpha$ is 1, and output the input value B without change when $\alpha=1$ has also been used, however, it is necessary to provide an extra circuit such as the comparator, and the circuitry inevitably becomes complicated. In addition, interpolation is performed always in the range of $0\leq\alpha\leq$approximately 0.9961, so that an obtained interpolated value includes an error.

Therefore, for more accurate interpolation, a method for determining the interpolation rate $\alpha$ in the form of $\alpha=D/255$ has been proposed. According to this definition, when the digital value D takes a maximum value 0, $\alpha=0/255=0$, and when the digital value D takes a maximum value 255, $\alpha=255/255=1$. Therefore, $\alpha$ in the range of can be defined, and it is possible to cope with the case of $\alpha=1$, and an accurate interpolated value can be obtained.

However, since the interpolation rate $\alpha$ is defined as the form of $\alpha=D/255$, the arithmetic operation based on the basic expression $C=(1-\alpha)*A+\alpha*B$ becomes the complicated form of $C=(1-(D/255))*A+(D/255)*B$ including division. An interpolator for calculating such an expression including division inevitably becomes complicated in circuitry. An object of the second aspect of the invention is to provide a linear interpolator which can perform accurate arithmetic operations and can be realized by simple circuitry.

<<<Section 2-2. Unique Point of the Second Aspect of the Invention>>>

Herein, for the sake of convenience, two interpolation target values A and B are given as 8-bit digital data, and a digital value D for determining the interpolation rate $\alpha$ (in the description of the embodiment according to the second aspect of the invention, an example in which this digital data D is referred to as "interpolation rate determining value") is given as 8-bit digital data, and as a result of arithmetic operation based on the basic expression $C=(1-\alpha)*A+\alpha*B$ by using these digital data, a linear interpolated value C expressed as 16-bit digital data is obtained, is described. Herein, in the 16-bit data of the linear interpolated value C, the higher-order 8 bits are an integer part, and the lower-order 8 bits are a decimal part.

FIG. 19 shows expressions for thus defining the interpolation target values A and B, the interpolation rate determining value D, and the linear interpolated value C.

In FIG. 19, first, (Expression 2-1):

$$A = \sum_{i=0\sim7} a_i 2^i$$
$$= a_0 2^0 + a_1 2^1 + \ldots + a_7 2^7$$

is shown. $a_0, a_1, \ldots, a_7$ in this (Expression 2-1) are bits (0 or 1) when the numerical value A is expressed as a binary number consisting of 8 bits, and $a_0$ is the least significant bit (rightmost bit) and $a_7$ is the most significant bit (leftmost bit).

Similarly, in the (Expression 2-2), an expression:

$$B = \sum_{i=0\sim7} b_i 2^i$$
$$= b_0 2^0 + b_1 2^1 + \ldots + b_7 2^7$$

is shown, and $b_0, b_1, \ldots, b_7$ in this expression are bits of the value B expressed as a binary number consisting of 8 bits, and $b_0$ is the least significant bit and $b_7$ is the most significant bit.

In the (Expression 2-3), an expression:

$$D = \sum_{i=0\sim7} d_i 2^i$$
$$= d_0 2^0 + d_1 2^1 + \ldots + d_7 2^7$$

is shown, and $d_0, d_1, \ldots, d_7$ in this expression are bits of the value D expressed as a binary number consisting of 8 bits, and $d_0$ is the least significant bit and $d_7$ is the most significant bit.

On the other hand, in the (Expression 2-4), an expression:

$$C = \sum_{i=0\sim15} c_i 2^{(i-8)}$$
$$= c_0 2^{-8} + c_1 2^{-7} + \ldots + c_7 2^{-1} + c_8 2^0 + c_9 2^1 + \ldots + c_{15} 2^7$$

is shown, and $c_0, c_1, \ldots, c_{15}$ in this expression are bits when the value C is expressed as a binary number consisting of 16 bits, and $c_0$ is the least significant bit and $c_{15}$ is the most significant bit.

While the values A, B, and D are defined as 8-bit data, respectively, the reason for definition of the value C as 16-bit digital data two times the 8-bit data is that the value C is a linear interpolated value which is obtained by an operation based on the basic expression $C=(1-\alpha)*A+\alpha*B$. Namely, the basic expression includes members of multiplication of values expressed with accuracy of 8 bits, so that a product of these values is obtained as a 16-bit value. Therefore, the value C as a final result of operation is defined as a 16-bit value. Here, $c_0$ to $c_7$ corresponding to the lower-order 8 bits of the 16 bits of this value C are a decimal part, and $c_8$ to $c_{15}$ corresponding to the higher-order 8 bits are an integer part. In practical use, in this 16-bit value C, only predetermined significant digits (normally, 8 digits of the integer part) are outputted as a final linear interpolated value C.

The last (Expression 2-5) shows the relationship between the interpolation rate $\alpha$ and the interpolation rate determining value D. Namely, these satisfy the relationship of "$\alpha=1/(2^8-1)*D=(1/255)*D$." The value D is 8-bit digital data, so that it takes an integer in the range from 0 to 255, and by defining the value $\alpha$ by the (Expression 2-5) by using this value D, the value $\alpha$ in the range from 0 to 1 can be defined.

FIG. 20 is a diagram showing a state in that the interpolation target values A and B, the interpolation rate determining value D, and the linear interpolated value C of FIG. 19 are expressed as bit sequences of binary numbers. When the values A, B, D, and C are defined according to the expressions of FIG. 19, these values are expressed as bit sequences as shown in FIG. 20. As described above, the values A, B, and D are 8-bit data, respectively, and on the other hand, the value C is 16-bit data, and the higher-order 8 bits $c_{15}$ to $c_8$ are an integer part and the lower-order 8 bits $c_7$ to $c_0$ are a decimal part, and a decimal point is positioned between the bit $c_8$ and $c_7$.

Resultantly, the linear interpolator to be designed is an interpolator having a function to calculate a linear interpolated value C as 16-bit digital data by performing arithmetic operations based on the basic expression $C=(1-\alpha)*A+\alpha*B$ based on the interpolation target values A and B and the interpolation rate determining value D given as 8-bit digital data as shown in FIG. 20.

Herein, the arithmetic expression (Expression 2-5) becomes a problem. When the interpolation rate $\alpha$ is defined as the form of $\alpha=(1/255)*D$, $\alpha$ can be defined in the whole of the necessary range of so that it becomes possible to cope with the case of $\alpha=1$, and an accurate interpolated value can be obtained. However, division of (D/255) must be performed, and the circuitry inevitably becomes complicated. The second aspect of the invention is characterized in that this problem is solved based on the following unique point of view.

First, when the value 1/255 is expressed as a binary number, it is expressed in the form of a repeating decimal of "0.0000000100000001 00000001000 . . ." (repetition of "1" arranged after seven "0") as shown in the (Expression 2-6) of FIG. 21. On the other hand, the interpolation rate $\alpha$ is a result of multiplication of this repeating decimal by 8-bit digital data D (a binary number expressed as a bit sequence "$d_7 d_6 d_5 d_4 d_3 d_2 d_1 d_0$"). However, in the repeating decimal, "1" only appears every 8 digits, and a product of this "1" and the bit sequence "$d_7 d_6 d_5 d_4 d_3 d_2 d_1 d_0$" is the bit sequence "$d_7 d_6 d_5 d_4 d_3 d_2 d_1 d_0$" in itself, so that the product of (1/255)*D is expressed by the bit sequence shown in the (Expression 2-7) of FIG. 21. Namely, the interpolation rate $\alpha$ is expressed as a binary fractional value in which a bit sequence "$d_7 d_6 d_5 d_4 d_3 d_2 d_1 d_0$" is repeatedly arranged after the decimal point.

When D is the minimum value 0, the bit sequence "$d_7 d_6 d_5 d_4 d_3 d_2 d_1 d_0$" becomes "00000000," so that $\alpha$ is a binary number in which the bit "0" continues to infinite digits after the decimal point, and this is equal to 0. On the other hand, when D is the maximum value 255, the bit sequence "$d_7 d_6 d_5 d_4 d_3 d_2 d_1 d_0$" becomes "11111111," and $\alpha$ is a binary number in which the bit "1" continues to infinite digits after the decimal point, and this is extremely close to "1" mathematically.

However, in a real interpolator, it is impossible to perform operations to infinite digits after the decimal point to define the value of $\alpha$, so that the value must be rounded off to a predetermined digit. Therefore, as shown on the upper stage of FIG. 22, the ninth decimal place (the digit of $2^{-9}$) of the value of the interpolation rate $\alpha$ is rounded off by carrying it to the higher-order digit when the value of this digit is 1 and cutting it when the value is 0 so that an approximate value α' having significant digits to the eighth decimal place (digit of $2^{-8}$) is calculated finally. Herein, let us consider what bit sequence the approximate value α' is expressed as dividedly between the case where the digit of $2^{-9}$ is 0 and cut off and in the case where the digit of $2^{-9}$ is 1 and carried to the higher-order digit.

First, the case where the digit of $2^{-9}$ is 0 and cut off is considered. As shown on the upper stage of FIG. 22, the bit of the digit of $2^{-9}$ is "$d_7$," so that this digit is cut off when "$d_7=0$." In this case, the digit of $2^{-9}$ is cut off, so that as shown on the middle of FIG. 22, the approximate value α' is a binary number "$0.d_7d_6d_5d_4d_3d_2d_1d_0$" having significant digits to the eighth decimal place (the digit of $2^{-8}$).

Next, let us consider the case where the digit of $2^{-9}$ is 1 and carried to the higher-order digit. In this case, the digit of $d_7$ is carried to the higher-order digit, so that this is when "$d_7=1$." Therefore, as shown on the lower stage of FIG. 22, the approximate value α' is a binary number having significant digits to the eighth decimal place (the digit of $2^{-8}$) obtained by adding the binary number "0.00000001" to "$0.d_7d_6d_5d_4d_3d_2d_1d_0$." Herein, the value "0.00000001" to be added is a result of carrying of 1 from the digit of $2^{-9}$ to the digit of $2^{-8}$.

Considering these two cases, resultantly, the approximate value α' having significant digits to the eighth decimal place (the digit of $2^{-8}$) can be expressed as:

$$\alpha' = 0.d_7d_6d_5d_4d_3d_2d_1d_0 + 0.0000000d_7$$

as shown in the (Expression 2-8) of FIG. 23. When the bit $d_7$ is 0, the part "$0.0000000d_7$" in the expression shown above becomes 0, so that the expression shown above becomes $\alpha = 0.d_7d_6d_5d_4d_3d_2d_1d_0$, and this is as shown on the middle stage of FIG. 22. On the other hand, when the bit $d_7$ is 1, the part "0.000000047" in the expression shown above becomes "0.00000001," so that the expression shown above becomes $\alpha' = 0.d_7d_6d_5d_4d_3d_2d_1d_0 + 0.00000001$, and this is as shown on the lower stage of FIG. 22. Thus, the definitional expression of the approximate value α' according to the (Expression 2-8) is equivalent to the definition of the approximate value α' in the two cases shown in FIG. 22.

The fractional value in binary expression "$0.d_7d_6d_5d_4d_3d_2d_1d_0$" can be expressed by the expression $\Sigma_{j=0 \sim 7} d_j 2^{(j-8)}$, and the fractional value in binary expression "$0.0000000d_7$" can be expressed as $d_7 2^{-8}$, so that the approximate value α' shown by the (Expression 2-8) can be defined by the following expression:

$$\alpha' = \Sigma_{j=0 \sim 7} d_j 2^{(j-8)} d_7 2^{-8}$$

as shown in the (Expression 2-9).

Resultantly, when the interpolation rate α is defined as the form:

$$\alpha = (1/255)*D$$

by the (Expression 2-5) of FIG. 19 by using the 8-bit digital data D (bit sequence "$d_7d_6d_5d_4d_3d_2d_1d_0$"), if this is directly calculated, division must be performed, and a dividing circuit must be prepared as a interpolator, however, by defining the approximate value α' of the interpolation rate α as the following form:

$$\alpha' = \Sigma_{j=0 \sim 7} d_j 2^{(j-8)} d_7 2^{-8}$$

as shown in the (Expression 2-9) and using this, the approximate value α' can be obtained only by addition, so that only an adding circuit must be prepared as a interpolator. This is the most important point of the second aspect of the invention.

Therefore, linear interpolation in the second aspect of the invention is performed by an arithmetic operation based on the expression "$C=(1-\alpha')*A+\alpha'*B$" shown as (Expression 2-10) on the upper stage of FIG. 24 by using the approximate value α' determined based on the interpolation rate determining value D.

<<<Section 2-3. Transformation of Expression for Constituting More Efficient Interpolator>>>

In "(Expression 2-10) $C=(1-\alpha')*A+\alpha'*B$," by substituting the (Expression 2-9) of FIG. 23 for the part of α', substituting the (Expression 2-1) of FIG. 19 for the part of A, and substituting the (Expression 2-2) of FIG. 19 for the part of B, as shown on the middle stage and the lower stage of FIG. 24, the expression "$C=[1-(\Sigma_{j=0 \sim 7} d_j 2^{(j-8)}+d_7 2^{-8})]*\Sigma_{i=0 \sim 7} a_i 2^i + (\Sigma_{j=0 \sim 7} d_j 2^{(j-8)}+d_7 2^{-8})*\Sigma_{i=0 \sim 7} b_i 2^i$" is obtained. In this expression, no division is included, so that by constituting an interpolator based on this expression, at least a dividing circuit is not necessary.

However, the inventor of the present invention considered that further transformation of the (Expression 2-10) into a more proper form would make it possible to design a more efficient interpolator. Therefore, the inventor examined how to transform the (Expression 2-10) to constitute an efficient interpolator while considering concrete circuitry as an interpolator, and through trial and error, conceived the fact that the following transformation made it possible to constitute an extremely efficient interpolator.

First, (Expression 2-11) of FIG. 25 is considered. This (Expression 2-11) in itself is a formula known from a long time ago, mathematically. For example, when n=8, the (Expression 2-11) becomes (Expression 2-12). If this (Expression 2-12) is developed in actuality, it is expressed as follows: $2^{-8}+2^{-7}+2^{-6}+2^{-5}+2^{-4}+2^{-3}+2^{-2}+2^{-1}+2^{-8}=1/256+1/128+1/64+1/32+1/16+1/8+1/4+1/2+1/256=1$. As a matter of course, this (Expression 2-11) is a formula for the arbitrary n.

Next, concerning the part $[1-(\Sigma_{j=0 \sim 7} d_j 2^{(j-8)}+d_7 2^{-8})]$ shown on the middle stage of the (Expression 2-10) of FIG. 24, let us consider the transformation shown in (Expression 2-13) of FIG. 26. First, when the part "1" described on the first line of the (Expression 2-13) is substituted by the left-hand side of the (Expression 2-12) of FIG. 25, the second line of the (Expression 2-13) is obtained. By combining the first and third members of the expression on the second line and combining the second member and the fourth member, the expression on the third line is obtained.

$d_j$ is each bit of the interpolation rate determining value D, so that it takes 0 or 1 as an actual value. Therefore, when assuming $e_j=(1-d_j)$, $e_3$ is a logically inverted bit of $d_j$ ($e_j=0$ when $d_j=1$, and $e_j=1$ when $d_j=0$). Therefore, the expression on the third line of the (Expression 2-13) is transformed into the expression on the fourth line by changing $d_j$ to the logically inverted bit of $e_j$.

Herein, the part of $[1-(\Sigma_{j=0 \sim 7} d_j 2^{(j-8)}+d_7 2^{-8})]$ shown on the middle stage of the (Expression 2-10) of FIG. 24 is substituted by "$\Sigma_{j=0 \sim 7} e_j 2^{(j-8)}+e_7 2^{-8}$" shown on the fourth line of FIG. 26, the (Expression 2-14) shown in the upper half of FIG. 27 is obtained. By developing this expression, as shown in the lower half of FIG. 27, the form of the sum of the four members shown by the circled numbers 1 through 4 is obtained. In detail, the linear interpolated value C to be calculated is obtained by calculating the sum of the following four members:

| | |
|---|---|
| $\Sigma_{j=0 \sim 7} e_j 2^{(j-8)} * \Sigma_{i=0 \sim 7} a_i 2^i$ | First member |
| $e_7 2^{-8} * \Sigma_{i=0 \sim 7} a_i 2^i$ | Second member |
| $\Sigma_{j=0 \sim 7} d_j 2^{(j-8)} * \Sigma_{i=0 \sim 7} b_i 2^i$ | Third member |
| $d_7 2^{-8} * \Sigma_{i=0 \sim 7} b_i 2^i$ | Fourth member |

This (Expression 2-14) is equivalent to the basic expression of linear interpolation shown as (Expression 2-10) of FIG. 24, however, this form of (Expression 2-14) is very convenient for designing an interpolator.

<<<Section 2-4. Features of Arithmetic Expression According to the Second Aspect of the Invention>>>

A first feature of the (Expression 2-14) shown in FIG. 27 is that, as originally shown in the (Expression 2-5) of FIG. 19, the relationship between the linear rate determining value D and the linear rate α is defined by using the expression "α= (1-255)*D," so that α in the range of can be defined, it becomes possible to cope with the case of α=1 (strictly speaking, not α=1 but α extremely close to 1 can be defined as described in Section 2-2), and an accurate interpolated value can be obtained. In addition, the expression using the approximate value α' is defined based on the unique point described in Section 2-2, so that the arithmetic expression does not include division.

A second feature of the (Expression 2-14) shown in FIG. 27 is that, in the form of the expression, $d_j$ and $e_j$ are incorporated complementarily. For example, the first member includes the expression form "$\Sigma_{j=0 \sim 7} e_j 2^{(j-8)}$," and the third member includes the expression form "$\Sigma_{j=0 \sim 7} d_j 2^{(j-8)}$." The second member includes the expression form "$e_7 2^{-8}$," and the fourth member includes the expression form "$d_7 2^{-8}$."

As described above, $e_i$ is a logically inverted bit of $d_j$, so that when $d_j$ is 1, $e_j$ is always 0, and when $d_j$ is 0, $e_j$ is always 1. Therefore, when calculating the respective members of the expressions, when $d_j=1$, the member including $e_j$ always becomes 0, so that only the members including $d_j$ are calculated, and when $d_j=0$, the member including $d_j$ always becomes 0, so that only the members including $e_j$ are calculated. Thereby, a more simple arithmetic circuit and more efficient operations are realized.

Figure 28:
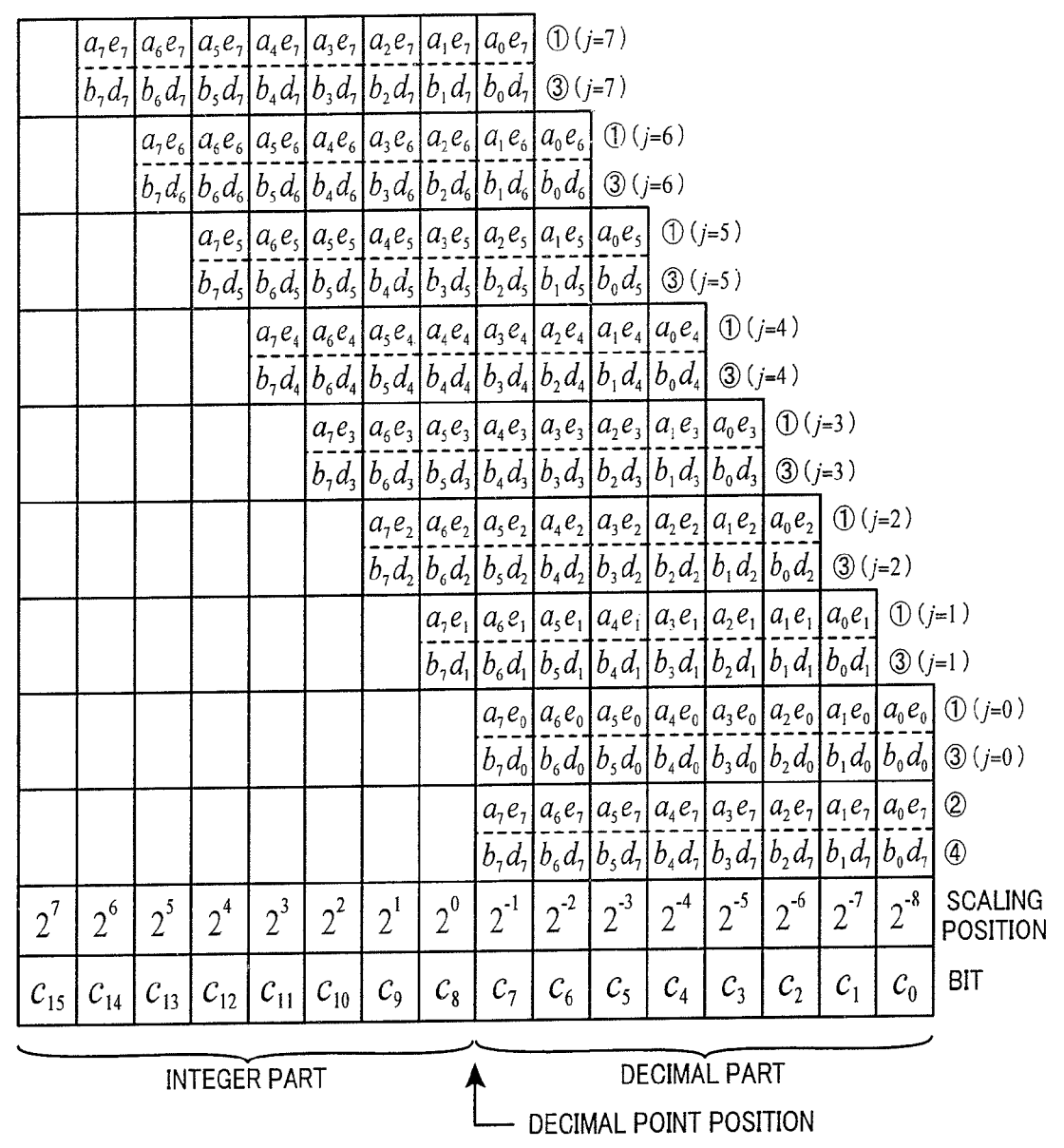

FIG. 28 is a table sorting coefficients of members composing the (Expression 2-14) of FIG. 27 by digits. The columns arranged horizontally in this table correspond to scaling positions of $2^7, 2^6, 2^5, \ldots, 2^{-6}, 2^{-7}$, and $2^{-8}$, respectively, and the bits $c_{15}, c_{14}, c_{13}, \ldots, c_2, c_1$, and $c_0$ show the bits of the interpolated value C to be calculated by performing operations. As described above, a decimal point is positioned between the bit $c_8$ and the bit $c_7$, and in the 16-bit data of the interpolated value C, the higher-order 8 bits "$c_{15}c_{14} \ldots c_9c_8$" are an integer part, and the lower-order 8 bits "$c_7c_6 \ldots c_1c_0$" are a decimal part.

The values of "circled numbers" and "j" described on the right side of the rows of the table of FIG. 28 correspond to the values of the members indicated by the circled numbers and j in these members of the expression of FIG. 27. For example, on the right side of the first row of the table of FIG. 28, "circled number 1" and "j=7" are described, and these indicate that the coefficients arranged on the first row of this table correspond to the coefficients when "j=7" in the expression "$\Sigma_{j=0 \sim 7} e_j 2^{(j-8)} * \Sigma_{i=0 \sim 7} a_i 2^i$" marked with "circled number 1" in FIG. 27. In actuality, when "j=7" is applied, the part "$\Sigma_{j=0 \sim 7} e_j 2^{(j-8)}$" becomes "$e_7 2^{-1}$," and coefficients of the digits obtained by a product of "$e_7 2^{-1}$" and "$\Sigma_{i=0 \sim 7} a_i 2^i$" are arranged on the first row of the table of FIG. 28. For example, when i=0, a product of "$e_7 2^{-1}$"*"$a_0 2^0$"="$a_0 e_7 2^{-1}$" is obtained. The coefficient "$a_0 e_7$" entered at the right end (the digit of $2^{-1}$) of the first row of the table of FIG. 28 indicates the coefficient of this product.

Resultantly, the (Expression 2-14) of FIG. 27 can be performed as many product-sum operations, and the coefficients of the respective digits are described in any part of the table of FIG. 28. The coefficients $a_0, a_1, a_2, \ldots, b_0, b_1$, and $b_2$ described in the table of FIG. 28 are the bits of the interpolation target values A and B, and the coefficients $d_0, d_1, d_2, \ldots$, are bits of the interpolation rate determining value D. The coefficients $e_0, e_1, e_2, \ldots$, are logically inverted bits of the respective coefficients $d_0, d_1, d_2, \ldots$.

Conveniently, the coefficients of the same digit include many pairs of complementary coefficients. For example, on the digit of $2^{-8}$, the coefficients of $a_0 e_0$, $b_0 d_0$, $a_0 e_7$, and $b_0 d_7$ are described, and the bit $c_0$ can be calculated by summing up these four coefficients. However, $e_j$ is the logically inverted bit of $d_j$, so that $a_0 e_0$ and $b_0 d_0$ are a pair of complementary coefficients, and either one is always 0. For example, when $e_0=1$, $d_0=0$, so that $a_0 e_0 = a_0$ and $b_0 d_0 = 0$, and $a_0 e_0 + b_0 d_0 = a_0$. To the contrary, when $e_0=0$, $d_0=1$, so that $a_0 e_0 = 0$ and $b_0 d_0 = b_0$, and $a_0 e_0 + b_0 d_0 = b_0$. Resultantly, the result of the operation "$a_0 e_0 + b_0 d_0$" becomes $a_0$ when $d_0=0$ and becomes $b_0$ when $d_0=1$. Therefore, in place of a computing unit which performs the operation "$a_0 e_0 + b_0 d_0$," a selector which selects either the input value $a_0$ or $b_0$ can be made to perform the operation "$a_0 e_0 + b_0 d_0$."

The same applies to the operation "$a_0 e_7 + b_0 d_7$" on the digit of $2^{-8}$, and based on the value of $d_7$, the selector which selects either the input value $a_0$ or $b_0$ can be made to perform the operation "$a_0 e_7 + b_0 d_7$." The digit of $2^{-8}$ is illustrated as described above, and such complementary coefficients can be found for all digits. Therefore, the constitution of the arithmetic circuit which performs addition for each digit is remarkably simplified.

Thus, by constituting an interpolator so as to obtain a linear interpolated value by performing multiplications and additions defined by the (Expression 2-14) shown in FIG. 27, operations by which accurate interpolated values are obtained become possible, and the constitution of the arithmetic circuit is remarkably simplified.

<<<Section 2-5. Expansion to General Formula>>>

In the Sections 2-2 through 2-4 described above, for easy understanding, two interpolation target values A and B are given as 8-bit digital data, an interpolation rate determining value D for determining an interpolation rate α is given as 8-bit digital data, and the concrete case where a linear interpolated value C expressed as 16-bit digital data is obtained as a result of execution of operations based on the basic expression of $C=(1-\alpha)*A+\alpha*B$ by using these digital data, is described. However, the second aspect of the invention is not limited to this example.

Herein, the second aspect of the invention is expanded to general formulas, and an expression to obtain an interpolated value C as 2n-bit digital data when the values A, B, and D are given as n-bit digital data is shown. For clear comparison with the above-described expressions, the expressions given in the following description are indicated by adding n to the corresponding expression numbers that have already been given above.

For example, the (Expression 2-1n) shown in FIG. 29 corresponds to expansion of the (Expression 2-1) shown in FIG. 19 to a general formula. Namely, the interpolation target value A given as n-bit digital data is defined by the following expression shown in (Expression 2-1n):

$$A = \sum_{i=0 \sim n-1} a_i 2^i$$
$$= a_0 2^0 + a_1 2^1 + \ldots + a_{n-1} 2^{(n-1)}$$

Similarly, the interpolation target value B given as n-bit digital data is defined by the following expression shown as (Expression 2-2n):

$$B = \sum_{i=0 \sim n-1} b_i 2^i$$
$$= b_0 2^0 + b_1 2^1 + \ldots + b_{n-1} 2^{(n-1)}$$

and the interpolation rate determining value D given as n-bit digital data is defined by the following expression shown in (Expression 2-3n):

$$D = \sum_{i=0 \sim n-1} d_i 2^i$$
$$= d_0 2^0 + d_1 2^1 + \ldots + d_{n-1} 2^{(n-1)}$$

On the other hand, the linear interpolated value C to be calculated as 2n-bit digital data is defined by the following expression shown as (Expression 2-4n):

$$C = \sum_{i=0 \sim 2n-1} c_i 2^{(i-n)}$$
$$= c_0 2^{-n} + c_1 2^{-(n-1)} + \ldots + c_{n-1} 2^{-1} +$$
$$c_n 2^0 + c_{n+1} 2^1 + \ldots + c_{2n-1} 2^{(n-1)}$$

In this interpolated value C of 2n bits, the lower-order n bits $c_0$ through $c_{n-1}$ indicate a decimal part, and the higher-order n bits $c_n$ through $c_{2n-1}$ indicate an integer part. As a matter of course, in practical use, in the value C of 2n bits, output of only predetermined significant digits (normally, n digits of the integer part) as a final linear interpolated value C is sufficient.

The relationship between the interpolation rate α and the interpolation rate determining value D can be defined by the following expression shown as (Expression 2-5n):

$$\alpha = (1/(2^n - 1)) * D$$

When D is given as n-bit digital data, the minimum value of D is 0 and the maximum value is "$2^n - 1$," so that by using the (Expression 2-5n), α can be defined as a value in the range of $0 \leq \alpha \leq 1$.

Resultantly, the (Expression 2-1) through (Expression 2-5) shown in FIG. 19 are expressions in which the setting of n=8 is substituted for the (Expression 2-1n) through (Expression 2-5n). FIG. 30 is a diagram showing a state in that the interpolation target values A and B, the interpolation rate determining value D, and the linear interpolated value C shown in FIG. 29 are expressed as bit sequences of binary numbers. When defining the values A, B, D, and C according to the expressions of FIG. 29, these values are expressed as bit sequences shown in FIG. 30. As described above, although the values A, B, and D are n-bit data, the value C is 2n-bit data, and the higher-order n bits $c_{2n-1}$ through $c_n$ are an integer part, the lower-order n bits $c_{n-1}$ through $c_0$ are a decimal part, and a decimal point is positioned between the bit $c_n$ and the bit $c_{n-1}$.

Resultantly, the linear interpolator according to the second aspect of the invention is an interpolator having a function to calculate a linear interpolated value as 2n-bit digital data by performing arithmetic operations based on the basic expression of $C = (1-\alpha)*A + \alpha*B$ based on the interpolation target values A and B and the interpolation rate determining value D given as n-bit digital data shown in FIG. 30.

The division in the arithmetic expression (Expression 2-5n) becomes a problem. As described above, when the interpolation rate α is defined as the form of $\alpha = (1/(2^n-1))*D$, α can be defined in the necessary whole range of so that it becomes possible to cope with the case of α=1, and an accurate interpolated value can be obtained. However, division of $(1/(2^n-1))$ must be performed, so that the circuitry inevitably becomes complicated. To solve this problem, the unique point described in the Section 2-2 is utilized.

First, when the value $(1/(2^{n-1}))$ is expressed by a binary number, it is expressed as a repeating decimal (repetition of "1" arranged after n–1 "0") as shown in the (Expression 2-6n) of FIG. 31. On the other hand, the interpolation rate α is a result of multiplication of this repeating decimal by n-bit digital data D (binary number shown as a bit sequence "$d_{n-1} d_{n-2} \ldots d_0$." However, in the repeating decimal, "1" only appears every n digits, and a product of this "1" and the bit sequence "$d_{n-1} d_{n-2} \ldots d_0$" is the bit sequence "$d_{n-1} d_{n-2} \ldots d_0$" in itself, so that resultantly, the product of $(1/(2^n-1))*D$ is expressed as the bit sequence shown in the (Expression 2-7n) of FIG. 31. Namely, the interpolation rate α is expressed as a binary fractional value in which the bit sequence "$d_{n-1} d_{n-2} \ldots d_0$" is repeatedly arranged after the decimal point.

When D takes the minimum value 0, the bit sequence "$d_{n-1} d_{n-2} \ldots d_0$" becomes "00 . . . 0," so that α is a binary number in which the bit "0" continues to infinite digits after the decimal point, and this is equal to 0. On the other hand, when D is the maximum value $(2^n-1)$, the bit sequence "$d_{n-1} d_{n-2} \ldots d_0$" becomes "11 . . . 1," so that α is a binary number in which the bit "1" continues to infinite digits after the decimal point, and this is a value extremely close to 1, mathematically.

Herein, as shown on the upper stage of FIG. 32, the (n+1)-th decimal place (the digit of $2^{-(n+1)}$) of the value of the interpolation rate α is rounded off by carrying it to the higher-order digit when it is 1 or cutting it off when it is 0, and finally, an approximate value α' having significant digits to the n-th decimal place (the digit of $2^{-n}$) is calculated. First, as shown on the middle stage of FIG. 32, when "$d_{n-1}=0$," the digit of $2^{-(n+1)}$ is 0 and cut off, so that the approximate value α' is a binary number "$0.d_{n-1} d_{n-2} \ldots d_0$" having significant digits to the n-th decimal place (the digit of $2^{-n}$). On the other hand, when "$d_{n-1}=1$," as shown on the lower stage of FIG. 32, the digit of $2^{-(n+1)}$ is 1 and carried to the higher-order digit, so that the approximate value α' is a binary number having significant digits to the n-th decimal place (the digit of $2^{-n}$) obtained by adding the binary number "0.00 . . . 001" to "$0.d_{n-1} d_{n-2} \ldots d_0$." Herein, the value "0.000 . . . 001" to be added is a binary fractional value in which only the n-th decimal place is "1," and is a carry to the digit of $2^{-n}$ from the digit of $2^{-(n+1)}$ that is 1 and carried.

Considering these two cases, resultantly, the approximate value α' having significant digits to the n-th decimal place (the digit of $2^{-n}$) can be expressed by the following expression shown in (Expression 2-8n) of FIG. 33:

$$\alpha' = 0.d_{n-1} d_{n-2} d_{n-3} \ldots d_0 + 0.000 \ldots d_{n-1}$$

Herein, "$d_{n-1}$" of the members of the second line is the bit on the n-th decimal place. When the bit "$d_{n-1}$" is 0, the part "$0.000 \ldots d_{n-1}$" of the expression shown above becomes 0, so that resultantly, the expression shown above becomes $\alpha' = 0.d_{n-1} d_{n-2} d_{n-3} \ldots d_0$, and this is as shown on the middle stage of FIG. 32. On the other hand, when the bit "$d_{n-1}$" is 1, the part "0.000 . . . $d_{n-1}$" of the expression shown above becomes "0.000 . . . 1 (the terminal 1 is on the n-th decimal place)," so that resultantly, the expression shown above becomes α'=0.$d_{n-1}d_{n-2}d_{n-3}$ . . . $d_0$+0.000 . . . 1, and this is as shown in the expression on the lower stage of FIG. 32. Thus, the definitional expression of the approximate value α' based on the (Expression 2-8n) is equivalent to the definition of the approximate value α' in the two cases shown in FIG. 32.

The binary fractional value "0.$d_{n-1}d_{n-2}d_{n-3}$ . . . $d_0$" can be expressed by the expression $\Sigma_{j=0 \sim n-1} d_j 2^{(j-n)}$, and the binary fractional value "0.000 . . . $d_{n-1}$" can be expressed as $d_{n-1} 2^{-n}$, so that resultantly, the approximate value α' shown by the (Expression 2-8n) of FIG. 33 can be defined by the following expression as shown in the (Expression 2-9n):

$$\alpha' = \Sigma_{j=0 \sim n-1} d_j 2^{(j-n)} + d_{n-1} 2^{-n}$$

Thus, also when the interpolation rate α is defined in the following form:

$$\alpha = (1/(2^n - 1)) * D$$

by the (Expression 2-5n) of FIG. 29 by using the n-bit digital data D (bit sequence "$d_{n-1}d_{n-2}d_{n-3}$ . . . $d_0$"), if the approximate value α' of the interpolation rate α is defined in the following form:

$$\alpha' = \Sigma_{j=0 \sim n-1} d_j 2^{(j-n)} + d_{n-1} 2^{-n}$$

and used as shown in the (Expression 2-9n), the division becomes unnecessary and the approximate value α' can be obtained only by addition.

Resultantly, the interpolated value C should be calculated by the arithmetic operation of "C=(1−α')*A+α'*B" based on the (Expression 2-10n) of FIG. 34, however, in this expression, by substituting the (Expression 2-9n) of FIG. 33 for the part of α', substituting the (Expression 2-1n) of FIG. 29 for the part of A, and substituting the (Expression 2-2n) of FIG. 29 for the part of B, as shown on the middle stage and the lower stage of FIG. 34, the expression "C=[1−($\Sigma_{j=0 \sim n-1} d_j 2^{(j-n)}$++$d_{n-1} 2^{-n}$)]*$\Sigma_{i=0 \sim n-1} a_i 2^i$+($\Sigma_{j=0 \sim n-1} d_j 2^{(j-n)}$+$d_{n-1} 2^{-n}$)*$\Sigma_{i=0 \sim n-1} b_i 2^i$" is obtained. This expression includes no division, so that by constituting an interpolator based on this expression, at least a dividing circuit is not necessary. However, in the second aspect of the invention, to design a more efficient interpolator, this (Expression 2-10n) is further transformed as follows.

First, as shown in (Expression 2-13n) of FIG. 35, the part of [1−($\Sigma_{i=0 \sim n-1} d_j 2^{(j-n)} d_{n-1} 2^{-n}$)] in the (Expression 2-10n) is transformed into the following form:

$$\Sigma_{i=0 \sim n-1} e_j 2^{(j-n)} + e_{n-1} 2^{-n}$$

Herein, $e_j(1-d_j)$, and $e_j$ is a logically inverted bit of $d_j$ (when $d_j=1$, $e_j=0$, and when $d_j=0$, $e_j=1$). The form on the second line of the (Expression 2-13n) is derived by substituting the left-hand side of the (Expression 2-11) of FIG. 25 for the part "1" described on the first line of the (Expression 2-13n), and the process of this is exactly the same as the transformation process of the (Expression 2-13) shown in FIG. 26.

Therefore, when the part of [1−($\Sigma_{j=0 \sim n-1} d_j 2^{(j-n)}$+$d_{n-1} 2^{-n}$] shown on the middle of the (Expression 2-10n) is substituted by "$\Sigma_{j=0 \sim n-1} e_j 2^{(j-n)} + e_{n-1} 2^{-n}$" shown on the second line of FIG. 35, the (Expression 2-14n) shown in the upper half of FIG. 36 is obtained. When this expression is developed, as shown in the lower half of FIG. 36, it becomes the form of a sum of the four members indicated by the circled numbers 1 through 4. In detail, the linear interpolated value C to be calculated is obtained by calculating the sum of the following four members:

$$\Sigma_{j=0 \sim n-1} e_j 2^{(j-n)} * \Sigma_{i=0 \sim n-1} a_i 2^i \quad \text{First member}$$

$$e_{n-1} 2^{-n} * \Sigma_{i=0 \sim n-1} 2^{-n} * \Sigma_{i=0 \sim n-1} a_i 2^i \quad \text{Second member}$$

$$\Sigma_{j=0 \sim n-1} d_j 2^{(j-n)} * \Sigma_{i=0 \sim n-1} b_i 2^i \quad \text{Third member}$$

$$d_{n-1} 2^{-n} * \Sigma_{i=0 \sim n-1} b_i 2^i \quad \text{Fourth member}$$

This (Expression 2-14n) is equivalent to the basic expression of linear interpolation shown as (Expression 2-10n) in FIG. 34. A result of setting n=8 in this (Expression 2-14n) is the (Expression 2-14) shown in FIG. 27, and as described in the Section 2-4 above, this form is very convenient for designing an interpolator.

Namely, this (Expression 2-14n) defines the relationship between the linear rate determining value D and the linear rate α by using the expression "α=(1/($2^n$−1)*D" as shown in the original (Expression 2-5n) of FIG. 29, so that α in the range of 0≦α≦1 can be defined, and it becomes possible to cope with the case of α=1 (strictly speaking, not α=1 but α extremely close to 1 can be defined as described in the Section 2-2), and an accurate interpolated value can be obtained. In addition, based on the unique point described in the Section 2-2, the expression using the approximate value α' is defined, so that the arithmetic expression includes no division, and $d_j$ and $e_j$ are complementarily incorporated in the form of the expression, so that a part of the operation can be realized by only a selector or the like, and the arithmetic circuit is simplified and efficient operations become possible.

Resultantly, the second aspect of the invention is characterized in that a linear interpolator which performs operations to calculate a linear interpolated value C expressed as C=(1−α)*A+α*B based on two interpolation target values A and B and an interpolation rate α (0≦α≦1) is constituted so as to obtain the linear interpolated value C by performing multiplications and additions defined by the arithmetic expression shown in the (Expression 2-14n) of FIG. 36, that is, the arithmetic expression of C=($\Sigma_{j=0 \sim n-1} e_j 2^{(j-n)}$+ $e_{n-1} 2^{-n} * \Sigma_{i=0 \sim n-1} a_i 2^i$+($\Sigma_{j=0 \sim n-1} d_j 2^{(j-n)}$+$d_{n-1} 2^{-n}$)* $\Sigma_{i=0 \sim n-1} b_i 2^i$ ($e_i$ is a logically inverted bit of $d_i$).

In this case, the interpolation target value A that should be given to this interpolator is defined as digital data of n bits in total including bits of $a_{n-1}$, $a_{n-2}$, . . . , $a_1$, and $a_0$ in order from the most significant bit side, the interpolation target value B is defined as digital data of n bits in total having the bits of $b_{n-1}$, $b_{n-2}$, . . . , $b_1$, and $b_0$ in order from the most significant bit side, the interpolation rate determining value D is defined as digital data of n bits in total having the bits of $d_{n-1}$, $d_{n-2}$, . . . , $d_1$, and $d_0$ in order from the most significant bit side, and the relationship "α=D/($2^n$−1)" is defined between the interpolation rate determining value D and the interpolation rate α. As a result of this operation, digital data of 2n bits in total having the bits of $c_{2n-1}$, $c_{2n-2}$, . . . , $c_1$ and $c_0$ in order from the most significant bit side is generated, so that this digital data of 2n bits or digital data corresponding to the number of significant figures in the digital data of 2n bits is outputted as digital data indicating the linear interpolated value C.

By thus designing a linear interpolator based on the arithmetic expression shown in the (Expression 2-14n) of FIG. 36, a linear interpolated value of two interpolation target values can be obtained with high accuracy, and a linear interpolator having simple circuitry can be realized.

<<<Section 2-6. Concrete Constitution Example of Linear Interpolator According to the Second Aspect of the Invention>>>

Next, a concrete constitution example of a linear interpolator having a function to perform interpolation based on the arithmetic expression (Expression 2-14n) according to the second aspect of the invention shown in FIG. 36 will be described. However, the concrete constitution example of the interpolator when the number of n is large becomes complicated in circuitry and illustration becomes difficult due to paper-based constraints, so that a constitution example of a comparatively small interpolator when n=4 is set is shown. This interpolator has a function to output an interpolated value C as digital data of 8 bits based on input values A, B, and D given as 4-bit digital data.

The (Expression 2-15) shown in FIG. 37 is an arithmetic expression when n=4 is set in the (Expression 2-14n) of FIG. 36. As described above, this arithmetic expression is in the form of a sum of four members indicated by the circled numbers 1 through 4 as shown in the lower half of FIG. 37. Namely, the linear interpolated value C to be calculated is obtained by calculating the sum of the following four members:

$\Sigma_{j=0\sim 3} e_j 2^{(j-4)} * \Sigma_{i=0\sim 3} a_i 2^i$      First member $e_3 2^{-4} * \Sigma_{i=0\sim 3} a_i 2^i$      Second member $\Sigma_{j=0\sim 3} d_j 2^{(j-4)} * \Sigma_{i=0\sim 3} b_i 2^i$      Third member $d_3 2^{-4} * \Sigma_{i=0\sim 3} b_i 2^i$      Fourth member FIG. 38 is a table sorting the coefficients of the members of the (Expression 2-15) of FIG. 37 by digits, and its basic composition is the same as that of the table shown in FIG. 28 (table in the case of n=8). Namely, the columns arranged horizontally in the table of FIG. 38 correspond to scaling positions of $2^3$, $2^2$, $2^1$, $2^0$, $2^{-1}$, $2^{-2}$, $2^{-3}$, and $2^{-4}$, and the bits $c_7$, $c_6$, $c_5$, $c_4$, $c_3$, $c_2$, $c_1$, and $c_0$ indicate the bits of the interpolated value C obtained by arithmetic operations. In this case, a decimal point is positioned between the bit $c_4$ and the bit $c_3$, and in the 8-bit data composing the interpolated value C, the higher-order 4 bits "$c_7$, $c_6$, $c_5$, $c_4$" are an integer part and the lower-order 4 bits "$c_3$, $c_2$, $c_1$, $c_0$" are a decimal part.

The values of "circled numbers" and "j" described on the right side of the respective rows of the table of FIG. 38 correspond to the members of the circled numbers in the expression of FIG. 37 and the value of j in these members. For example, on the right side of the first row of the table of FIG. 38, "circled number 1" and "j=3" are described, and these indicate that the coefficients arranged on the first row of this table correspond to coefficients when "j=3" is set in the expression "$\Sigma_{j=0\sim 3} e_j 2^{(j-4)} * \Sigma_{i=0\sim 3} a_i 2^i$" of the first member marked with the "circled number 1." In actuality, when "j=3" is set, the part "$\Sigma_{j=0\sim 3} e_j 2^{(j-4)}$" becomes "$e_3 2^{-1}$," and the coefficients of the respective digits obtained by a product of "$e_3 2^{-1}$" and "$\Sigma_{i=0\sim 3} a_i 2^i$" are arranged on the first row of the table of FIG. 38. For example, when i=0, a product of "$e_3 2^{-1}$" * "$a_0 2^0$"="$a_0 e_3 2^{-1}$" is obtained. The coefficient "$a_0 e_3$" described on the right end (the digit of $2^{-1}$) of the first row of the table of FIG. 38 indicates the coefficient of this product.

Thus, the (Expression 2-15) of FIG. 37 can be performed as many product-sum operations, and the coefficients of each digit are described on any portion of the table of FIG. 38. In addition, the coefficients of the same digit include many pairs of complementary coefficients (two coefficients either one of which always becomes 0). For example, in the coefficients "$a_0 e_0$" and "$b_0 d_0$," either $e_0$ or $d_0$ is always 0, so that these are complementary coefficients, and the result of the operation of "$a_0 e_0 + b_0 d_0$" becomes either "$a_0$" or "$b_0$." The point that a selector which selects either one of the input values "$a_0$" and "$b_0$" based on the value of $d_0$ can be made to perform the operation of "$a_0 e_0 + b_0 d_0$" has already been described above.

Resultantly, the interpolator which performs operations based on the (Expression 2-15) of FIG. 37 can be constituted by a combination of a selector and a counter. As the selector, a device is used which has a function to select and output either the bit $a_i$ or $b_i$ (i=0, 1, 2, ... (n−1): n=4 in this example) based on a logical value of a predetermined bit of digital data showing the interpolation rate determining value D, and as a counter, a device is used which has a function to input the bit $a_i$ or $b_i$ (i=0, 1, 2, ... (n−1): n=4 in this example), an output value of the selector, or an output value of another counter and outputs the results of addition of inputted values.

Figure 39:
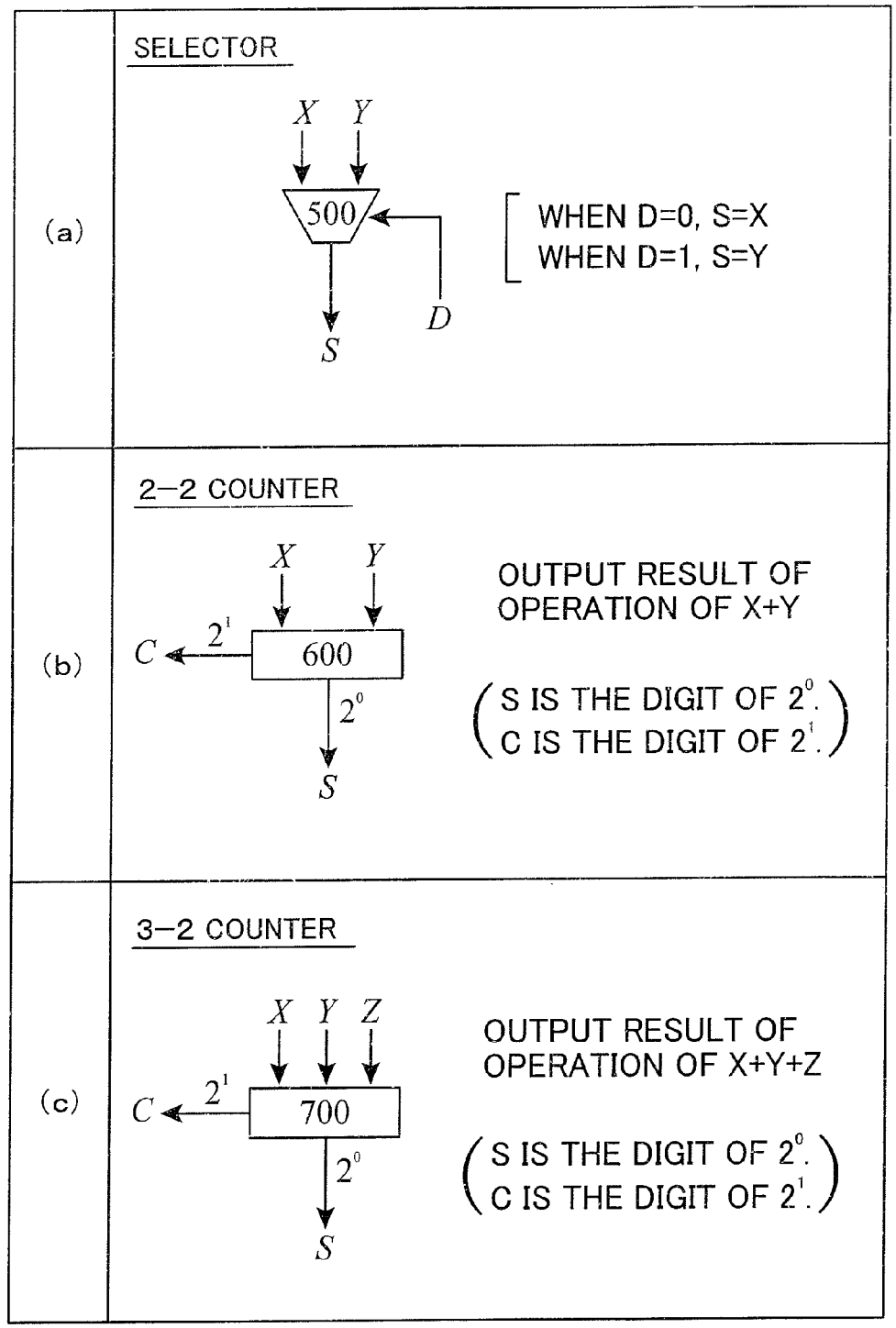
FIG. 39 are diagrams showing basic components of a linear interpolator according to an embodiment of the second aspect of the invention.

FIG. 39 are diagrams showing a concrete example of the selector and the counter having the above-described functions, and these selector and counter are used as basic components of the concrete linear interpolator described later.

First, the selector 500 shown in FIG. 39(a) is a component having a function to output either one of the two input values X and Y (both are 1-bit values) as a selected value S. It is determined which input value is selected according to the logical state of the control value D of 1 bit. Namely, when the control value D=0, the input value X is selected (S=X), and when the control value D=1, the input value Y is selected (S=Y).

Next, the 2-2 counter 600 shown in FIG. 39(b) is a component which functions to perform addition of two input values X and Y (both are 1-bit values), outputs the value of the digit of $2^0$ of the result of addition, and outputs the value of the digit of $2^1$ of the result of addition as a carry C (carry to the higher-order digit). The sum S and the carry C are both 1-bit data.

The 3-2 counter 700 shown in FIG. 39(c) is a component which functions to perform addition of three input values X, Y, and Z (all are 1-bit values), outputs the value of the digit of $2^0$ of the result of addition as a sum S, and outputs the value of the digit of $2^1$ of the result of addition as the carry C (carry to the higher-order digit). The sum S and the carry C are still 1-bit data.

Figure 40:
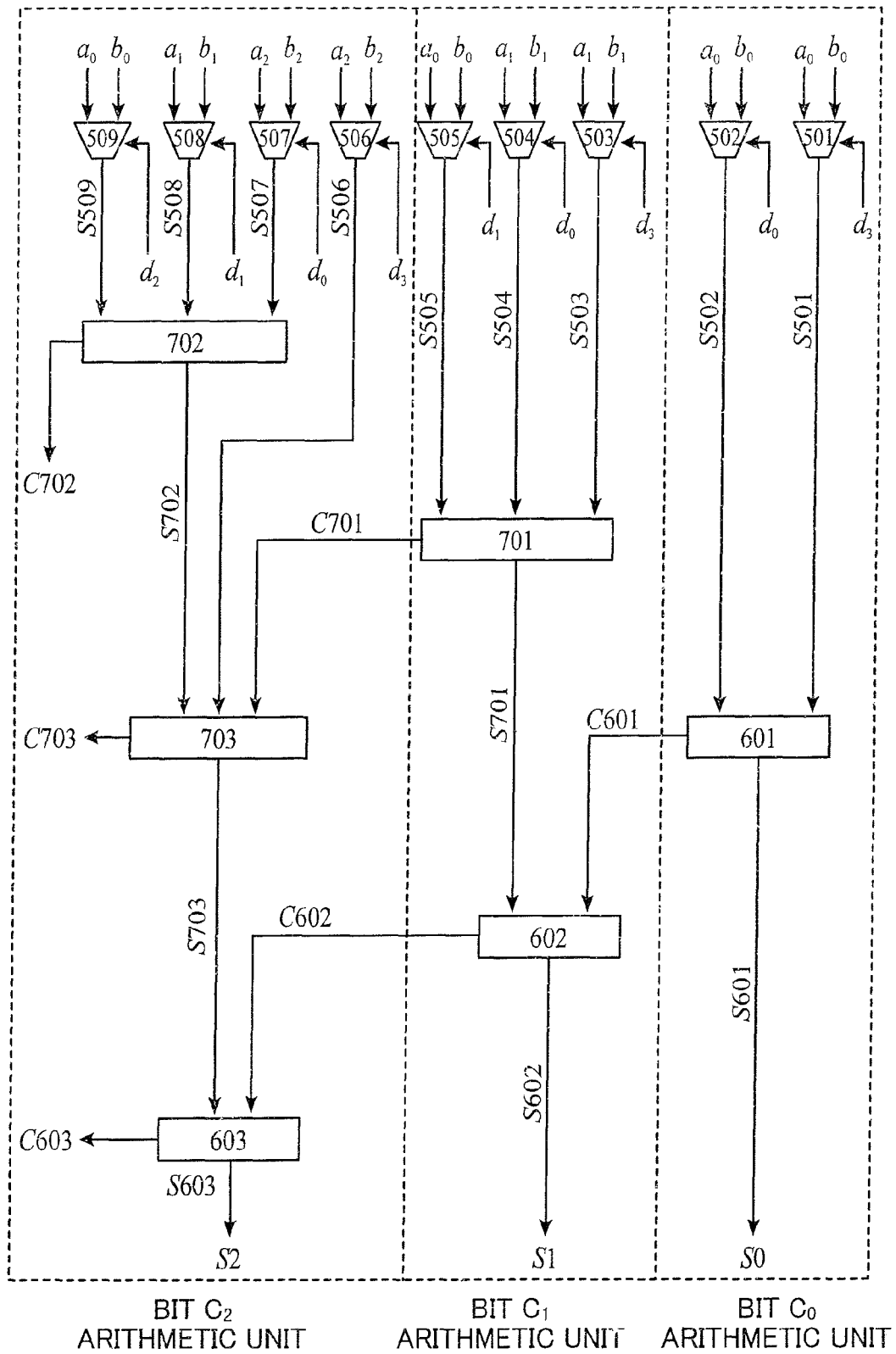
FIG. 40 is a circuit diagram showing a first portion of the linear interpolator according to an embodiment of the second aspect of the invention.
Figure 41:
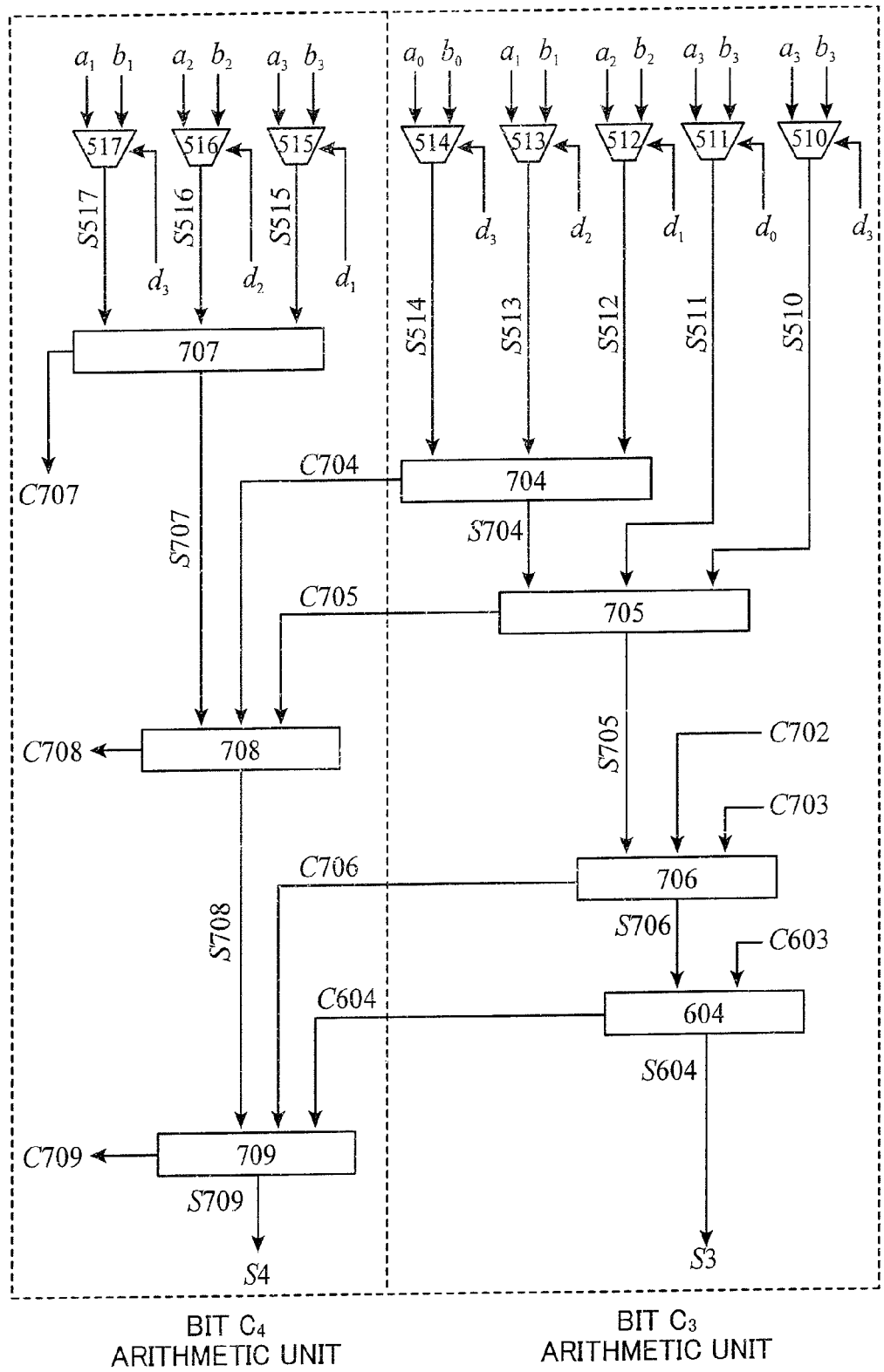
FIG. 41 is a circuit diagram showing a second portion of the linear interpolator according to an embodiment of the second aspect of the invention.
Figure 42:
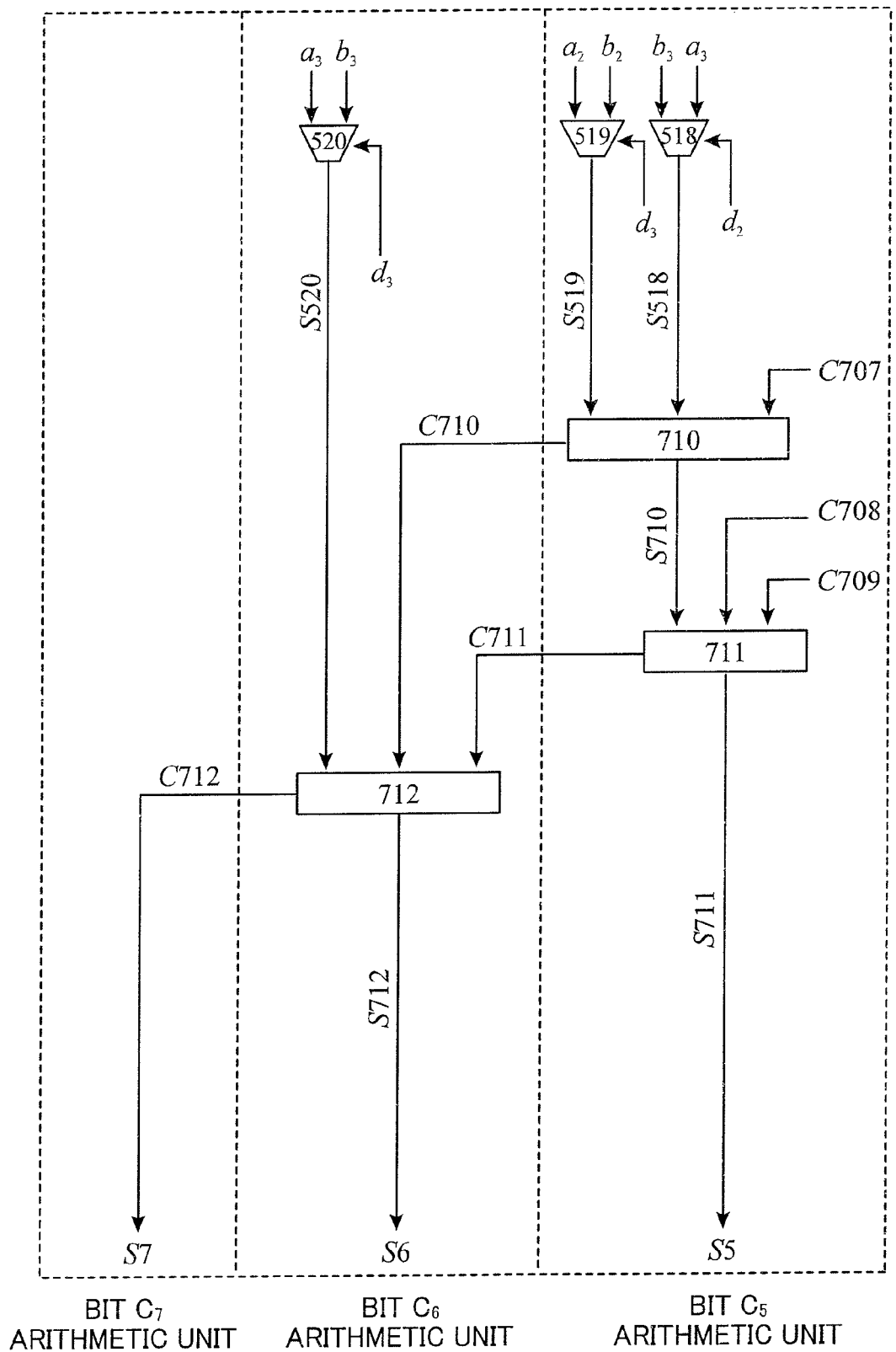
FIG. 42 is a circuit diagram showing a third portion of the linear interpolator according to an embodiment of the second aspect of the invention.

FIG. 40 through FIG. 42 are circuit diagrams showing a linear interpolator constituted by combining the selector 500, the 2-2 counter 600, and the 3-2 counter 700 of FIG. 39. For the sake of convenience of illustration, the interpolator is dividedly shown in three diagrams, however, the whole of the circuits drawn in these three drawings form one linear interpolator. In the diagrams, the components 501 through 520 attached with the reference numerals in the range from 500 to 599 are equivalent to the selector 500 shown in FIG. 39(a), the components 601 through 604 attached with the reference numerals in the range of 600 to 699 are equivalent to the 2-2 counter 600 of FIG. 39(b), and the components 701 through 712 attached with the reference numerals in the range of 700 to 799 are equivalent to the 3-2 counter 700 of FIG. 39(c).

For the sake of convenience of explanation, the selected value to be outputted from each selector is indicated by a reference numeral with S attached to the head, and the sum or carry to be outputted from each counter is indicated by a reference numeral with S or C attached to the head. For example, the reference numeral S501 indicated on the right side of FIG. 40 denotes a selected value to be outputted from the selector 501, the reference numeral S601 is a sum to be outputted from the counter 601, and the reference numeral C601 denotes a carry (to be added to the higher-order digit) to be outputted from the counter 601.

This linear interpolator shown in FIG. 40 through FIG. 42 is for performing arithmetic operations to obtain an interpolated value based on the arithmetic expression (arithmetic expression when n=4) shown in the (Expression 2-15) of FIG. 37, and the constitution thereof corresponds to the table of FIG. 38. Namely, the bit $c_0$ arithmetic unit, the bit $c_1$ arithmetic unit, and the bit $c_2$ arithmetic unit shown in FIG. 40, the bit $c_3$ arithmetic unit and the bit $c_4$ arithmetic unit shown in FIG. 41, and the bit $c_5$ arithmetic unit, the bit $c_6$ arithmetic unit, and the bit $c_7$ arithmetic unit shown in FIG. 42 are components for performing arithmetic operations to obtain the bits $c_0$ to $c_7$ in the table of FIG. 38, respectively. The bit $c_7$ arithmetic unit has only a function to directly output the carry C712 from the bit $c_6$ arithmetic unit.

The values $a_0$, $a_1$, $a_2$, and $a_3$ shown in FIG. 40 through FIG. 42 are bits of the interpolation target value A, the values $b_0$, $b_1$, $b_2$, and $b_3$ are bits of the interpolation target value B, and values $d_0$, $d_1$, $d_2$, and $d_3$ are bits of the interpolation rate determining value D. The outputs values S0 through S7 drawn under the respective bit arithmetic units correspond to the values of the bits $c_0$ through $c_7$ in the table of FIG. 38.

For example, focusing attention on the constitution of the bit $c_0$ arithmetic unit shown in FIG. 40, it is understood that this constitution is for performing arithmetic operations to obtain the bit $c_0$ in the table of FIG. 38. The selector 501 functions to select either one of the two input values $a_0$ and $b_0$ based on the control value $d_3$ and output the selected input value as the selected value S501, and this is processing corresponding to the addition of the coefficients "$a_0e_3$" and "$b_0d_3$" shown on the digit of the bit $c_0$ in the table of FIG. 38. As described above, "$a_0e_3$" and "$b_0d_3$" are in a complementary relationship, and when $d_3=1$, $a_0e_3=0$ and $b_0d_3=b_0$, and when $d_3=0$, $a_0e_3=a_0$ and $b_0d_3=0$, so that resultantly, when $d_3=1$, S501=$b_0$ is outputted as a selected value when $d_3=0$, S501=$a_0$ is outputted as a selected value by the selector 501 instead of the processing corresponding to the addition of the coefficients "$a_0e_3$" and "$b_0d_3$."

Similarly, the selector 502 performs a function to select either one of the two input values $a_0$ and $b_0$ based on the control value $d_0$ and outputs the selected input value as the selected value S502, and this corresponds to the addition of the coefficients "$a_0e_0$" and "$b_0d_0$" shown on the digit of the bit $c_0$ in the table of FIG. 38. When S502=$b_0$ is outputted as a selected value when $d_0=1$ and S502=$a_0$ is outputted as the selected value when $d_0=0$ by the selector 502, this substitutes for the processing corresponding to the addition of the coefficients "$a_0e_0$" and "$b_0d_0$." Last, by summing up the selected value S501 and the selected value S502 by the counter 601, as a result, the operation for calculating the bit $c_0$ in the table of FIG. 38 is performed.

In this case, when there is a carry to the digit of the bit $c_1$, the carry C601=1 is transmitted to the bit $c_1$ arithmetic unit. As a matter of course, when there is no carry, the carry C601=0 is transmitted to the bit $c_1$ arithmetic unit. Arithmetic operations for other digits are the same as this. For the digit of $2^3$, an actual arithmetic operation is not performed, and a carry from the digit of $2^2$ is outputted without change as the value of the digit of $2^3$. Therefore, as shown on the left end of FIG. 42, a substantial circuit is not prepared in the bit $c_7$ arithmetic unit, and arithmetic units having substantial circuits are the seven bit arithmetic units $c_6$ through $c_0$.

Resultantly, to calculate the bit $c_{6-i}$ (i=0, 1, 2, 3, 4, 5, 6) indicating the value of the digit of $2^{(2-i)}$ of the linear interpolated value C, the circuit shown in FIG. 40 through FIG. 42 has seven arithmetic units which sums up the coefficients of the digits and the carries from the lower-order digits, outputs the sum as the value of the bit $c_{6-i}$, and outputs carries to the higher-order digits, and the circuit outputs a carry from the arithmetic unit that performs an operation of the bit $c_6$ as the value of the bit $c_7$.

By expanding this to a general formula using n, to calculate the bit $c_{2n-1-2}$ (i=0, 1, 2, . . . 2(n−1)) indicating the value of the digit of $2^{(n-i-2)}$ of the linear interpolated value C, the linear interpolator according to the second aspect of the invention has (2n−1) arithmetic units which sum up the coefficients of the digits and all carries from the lower-order digits, outputs the sum as the value of this bit $c_{2n-i-2}$, and outputs the carries to the higher-order digits, and functions to output the carry from the arithmetic unit which performs an operation for the bit $c_{2n-2}$ as the value of the bit $c_{2n-1}$.

Figure 43:
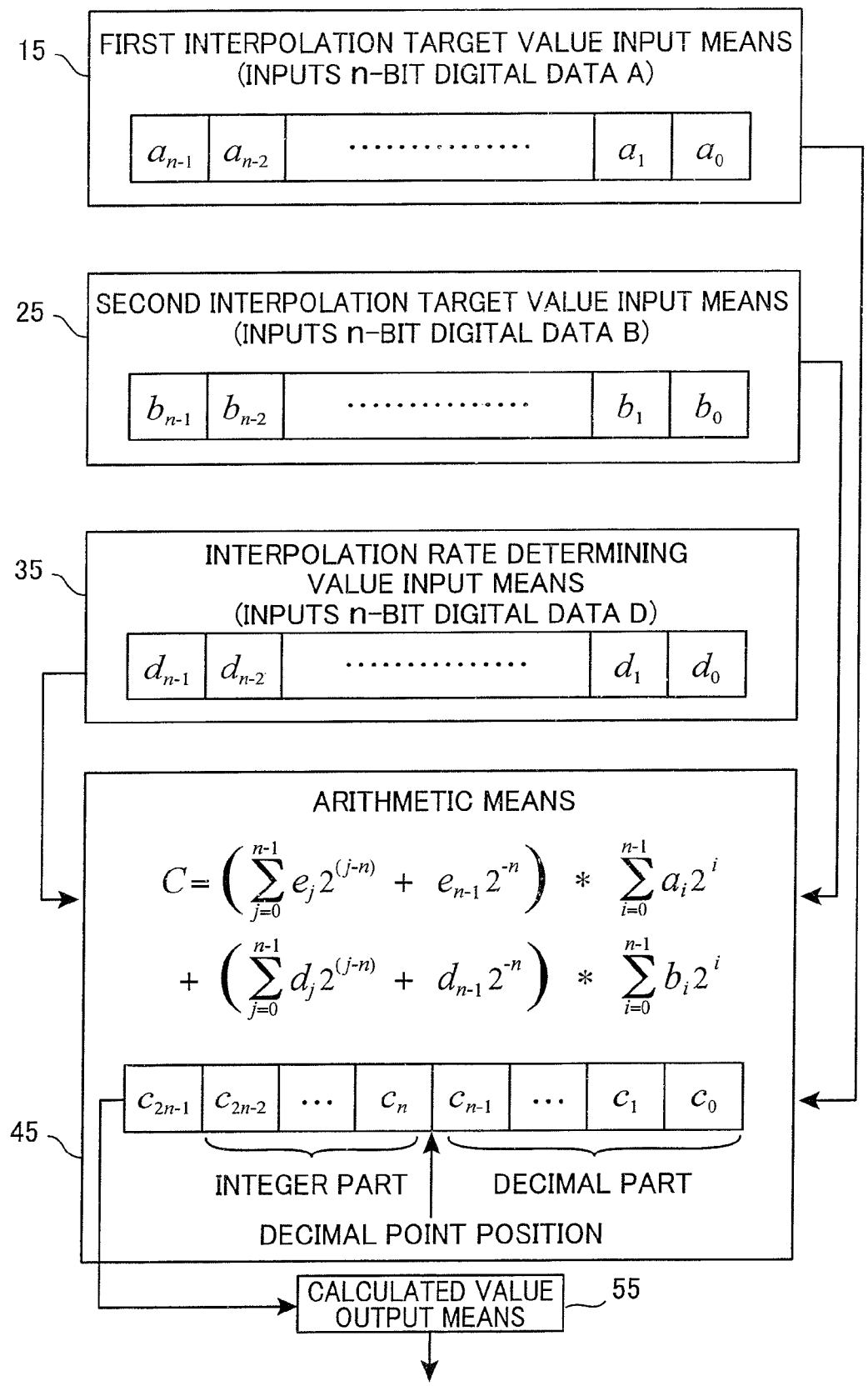
FIG. 43 is a block diagram showing an entire constitution of the linear interpolator according to the second aspect of the invention.

A constitution example of the major portion of the linear interpolator according to the second aspect of the invention is described above with reference to the circuit diagrams of FIG. 40 through FIG. 42, however, in actuality, to this major portion, a component for inputting the digital data A, B, and D and a component for outputting the digital data C from this major portion must be added. FIG. 43 is a block diagram showing an entire constitution of a linear interpolator according to the second aspect of the invention, obtained by adding the components for inputting and outputting.

As illustrated, this linear interpolator comprises first interpolation target value input means 15 for inputting n-bit digital data A, second interpolation target value input means 25 for inputting n-bit digital data B, interpolation rate determining value input means 35 for inputting n-bit digital data D, arithmetic means 45, and calculated value output means 55.

The first interpolation target value input means 15 is means for inputting an interpolation target value A as digital data of n bits in total including bits of $a_{n-1}$, $a_{n-2}$, . . . , $a_1$, $a_0$ in order from the most significant bit side, and the second interpolation target value input means 25 is means for inputting the interpolation target value B as digital data of n bits in total including the bits of $b_{n-1}$, $b_{n-2}$, . . . , $b_1$, $b_0$ in order from the most significant bit side, and the interpolation rate determining value input means 35 is means for inputting the interpolation rate determining value D satisfying the relationship "$\alpha=D/(2^n-1)$" with the interpolation rate $\alpha$, as digital data of n bits in total including the bits of $d_{n-1}$, $d_{n-2}$, . . . , $d_1$, $d_0$ in order from the most significant bit side.

On the other hand, the arithmetic means 45 is means for generating digital data of 2n bits in total composed of, in order from the most significant bit side, n bits in total of $c_{2n-1}$, $c_{2n-2}$, . . . , $c_{n+1}$, $c_n$ of the integer part and n bits in total of $c_{n-1}$, $c_{n-2}$, . . . , $c_1$, $c_0$ of the decimal part by performing arithmetic operations based on/the arithmetic expression of C=$(\Sigma_{j=0 \sim n-1} e_j 2^{-n}) + e_{n-1} 2^{-n}) * \Sigma_{i=0 \sim n-1} a_i 2^i + (\Sigma_{j=0 \sim n-1} d_j 2^{(j-n)}) + d_{n-1} 2^{-n}) * \Sigma_{i=0 \sim n-1} b_i 2^i$ ($e_i$ is a logically inverted bit of $d_i$).

The calculated value output means 55 is means for outputting "digital data of 2n bits in total composed by arranging the bits of $c_{2n-1}$, $c_{2n-2}$, $c_{2n-3}$, . . . , $c_1$, $c_0$ in sequence in order from the most significant bit side" or "digital data corresponding to a necessary number of significant figures of the digital data of 2n bits" as digital data showing the linear interpolated value C.

Thus, according to the second aspect of the invention, simple circuitry for calculating a linear interpolated value C concerning interpolation target values A and B with high accuracy is provided. The summary of the second aspect of the invention is described as follows with reference to FIG. 22. First, the interpolated value C is obtained based on the basic expression of C=$(1-\alpha)*A+\alpha*B$ by using an interpolation rate $\alpha$. Next, by defining $\alpha=D/255$ by using a 8-bit value D (bits $d_7 d_6 \ldots d_1 d_0$), a satisfying "$0 \leq \alpha \leq 1$" is set. The binary expression of 1/255 becomes a repeating decimal of 0.00000001 . . . , so that the binary expression of $\alpha$ becomes $0.d_7 d_6 \ldots d_1 d_0 d_7 d_6 \ldots$ . By defining an approximate value $\alpha'$ obtained by rounding off the digit of $2^{-9}$ of $\alpha$ by cutting the digit when it is 0 or by carrying 1 to the higher-order digit of $2^{-9}$ when said digit is 1 as $\alpha'=\Sigma_{j=0 \sim 7} d_j 2^{(j-8)} + d_7 2^{-8}$, the approximate value $\alpha'$ can be obtained by addition instead of division of $\alpha=D/255$, so that a simple circuit including no division can be realized.

Section 3. Embodiment According to Third Aspect of the Invention

Next, an embodiment illustrating a third aspect of the invention will be described. The third aspect of the invention realizes an interpolator which can efficiently perform cubic spline interpolation.

<<<Section 3-1. Basic Concept of Cubic Spline Interpolation>>>

As described above, the cubic spline interpolation itself is known, however, for the sake of convenience, the concept of this interpolation is briefly described based on the description in the aforementioned document Hsieh S. Hou Harry C. Andrews, "Cubic splines for Image Interpolation and Digital Filtering," IEEE Trans. on ASSP-26, No. 6, December 1978, pp. 508-517. Herein, interpolation for one-dimensional pixel arrays is described, however, by repeatedly performing this one-dimensional interpolation longitudinally and transversely, the same can be applied to two-dimensional pixel array (described in detail in Section 3-5).

Figure 44:
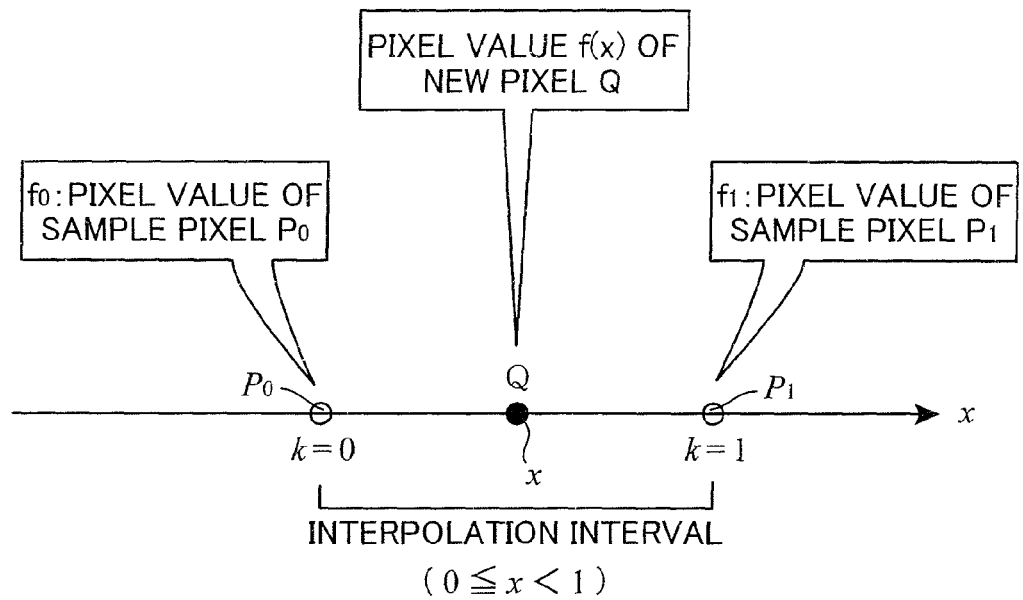
FIG. 44 is a diagram showing a concept of simple linear interpolation based on pixel values of two sample pixels on both ends of an interpolation interval.

First, the concept of the linear interpolation will be described in a point different from that of the Section 1 and Section 2 with reference to FIG. 44. It is assumed that one-dimensional pixel array is defined on the x axis as illustrated. Namely, a plurality of pixels having predetermined pixel values are arranged at the predetermined pitch on the x axis. In the diagram of this application, provided existing pixels are shown by white circles. Herein, when the pixel number k is defined, FIG. 44 shows a state in that the 0-th (k=0) pixel $P_0$ and the first (k=1) pixel $P_1$ are arranged on the x axis. For the sake of convenience, it is assumed that the pixel $P_0$ is arranged at the coordinate position of x=0 and the pixel $P_1$ is arranged at the coordinate position of x=1, and an interval "$0 \leq x < 1$" which ends at these pixels is defined as an interpolation interval. When an interpolation point Q (herein, referred to also as a new pixel Q) is defined at an arbitrary position x in this interpolation interval, calculation of a pixel value f(x) to be given to this new pixel Q is considered. In other words, an interpolated value of an arbitrary interpolation point Q between the adjacent two pixels $P_0$ and $P_1$ is calculated.

The simplest method for performing this interpolation is linear interpolation using pixel values of the two pixels $P_0$ and $P_1$. Herein, the pixels to be used for interpolation are referred to as sample pixels. In the example of FIG. 44, based on pixel values of the two sample pixels $P_0$ and $P_1$, a pixel value f(x) of the new pixel Q defined at an arbitrary position x in the interpolation interval is determined. Namely, when the pixel values of the sample pixels $P_0$ and $P_1$ are defined as $f_0$ and $f_1$, the pixel value of the new pixel Q can be determined by performing a simple arithmetic expression of $f(x)=f_0 \cdot (1-x) + f_1 \cdot x$.

In this linear interpolation, the pixel value of the interpolation point Q can be obtained by a simple product-sum operation using the pixel values of the pair of sample pixels $P_0$ and $P_1$ on both sides of interpolation point Q, so that the burden of operation is very small. The linear interpolation circuits shown in the Section 1 and Section 2 are also circuits for performing interpolation based on this linear interpolation. However, the interpolation accuracy of this linear interpolation is very low, so that smoothly continuous pixel values cannot be obtained.

Figure 45:
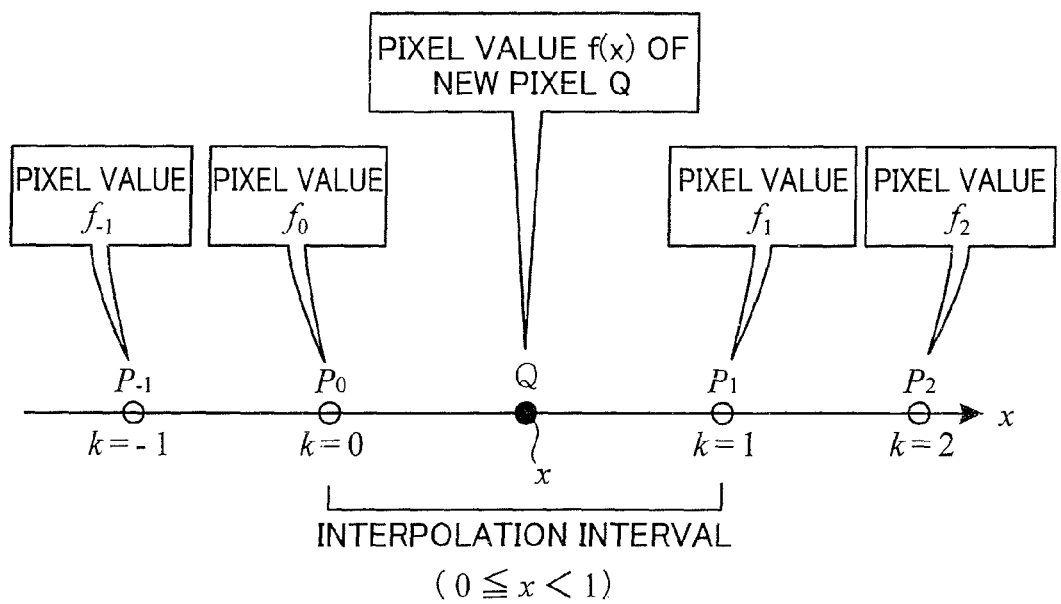
FIG. 45 is a diagram showing a concept of an interpolation method based on pixel values of four in total of sample pixels.

On the other hand, in cubic convolution interpolation and cubic spline interpolation with higher accuracy, interpolation using more sample pixels is performed. For example, the example shown in FIG. 45 shows interpolation based on pixel values of four sample pixels in total, and in currently proposed cubic convolution interpolation and cubic spline interpolation, such interpolation using four sample pixels is performed. Namely, by using pixel values $f_{-1}, f_0, f_1,$ and $f_2$ of four sample pixels of the (-1)st (k=-1) pixel $P_{-1}$, the 0-th (k=0) pixel $P_0$, the first (k=1) pixel $P_1$, and the second (k=2) pixel $P_2$, a pixel value f(x) of a new pixel Q defined at an arbitrary position x in an interpolation interval (interval between the pixel $P_0$ and the pixel $P_1$) is calculated.

In cubic spline interpolation, a cubic polynomial "$f(x)=Ax^3+Bx^2+Cx+D$" concerning the position x is calculated, and an arithmetic operation obtained by substituting the coordinate value x of the new pixel Q with this polynomial is performed to calculate the pixel value f(x). Herein, the polynomial "$f(x)=Ax^3+Bx^2+Cx+D$" can be calculated by:

$$f(x) = \sum_{k=-1}^{2} c_k \beta^3(x-k) \quad \text{(Expression 3-1)}$$

This (Expression 3-1) expresses f(x) as a sum of four functions defined about k=−1, 0, 1, and 2, respectively. Herein, $c_k$ is called interpolation coefficient, $\beta^3(x-k)$ is called cubic B spline function.

This function $\beta^3(x-k)$ is defined as follows. That is, by defining the following functions:

$$(x-k)_+^3 = \begin{cases} (x-k)^3 & x > k \\ 0 & x \leq k \end{cases} \quad \text{(Expression 3-2)}$$

$$\omega_k^3(i) = \prod_{\substack{j=k-2 \\ i \neq j}}^{k+2} (i-j) \quad \text{(Expression 3-3)}$$

the function $\beta^3(x-k)$ is calculated as:

$$\beta^3(x-k) = 4 \cdot \sum_{i=k-2}^{k+2} \frac{(x-i)_+^3}{\omega_k^3(i)} \quad \text{(Expression 3-4)}$$

When i=k−2, k−1, k, k+1, and k+2 are substituted for i of this (Expression 3-4) and transformed to a form of a sum, the following expression:

$$\beta^3(x-k) = \frac{1}{6} \begin{Bmatrix} (x-k+2)_+^3 - 4 \cdot (x-k+1)_+^3 + \\ 6 \cdot (x-k)_+^3 - 4 \cdot (x-k-1)_+^3 + \\ (x-k-2)_+^3 \end{Bmatrix} \quad \text{(Expression 3-5)}$$

is obtained. Herein, when the (Expression 3-5) is substituted for the (Expression 3-1) by considering the definition of the (Expression 3-2) and the condition of $0 \leq x < 1$, the following expression:

$$f(x) = \frac{1}{6} \begin{Bmatrix} c_{-1} \begin{bmatrix} (x+3)^3 - 4 \cdot (x+2)^3 + \\ 6 \cdot (x+1)^3 - 4 \cdot x^3 \end{bmatrix} + \\ c_0 [(x+2)^3 - 4 \cdot (x+1)^3 + 6 \cdot x^3] + \\ c_1 [(x+1)^3 - 4 \cdot x^3] + c_2 x^3 \end{Bmatrix} \quad \text{(Expression 3-6)}$$

-continued $$= \frac{1}{6}\begin{pmatrix} (-c_{-1} + 3c_0 - 3c_1 + c_2)x^3 + \\ (3c_{-1} - 6c_0 + 3c_1)x^2 + \\ (-3c_{-1} + 3c_1)x + (c_{-1} + 4c_0 + c_1) \end{pmatrix}$$

is obtained.

When x=0 is set in this (Expression 3-6), $f(0)=(c_{-1}+4c_0+c_1)$, and when the pixel value of the k-th pixel is defined as $f_k$ and generalized to the following expression:

$$f_k = \frac{1}{6}(c_{k-1} + 4c_k + c_{k+1}) \ (k = 0, 1, 2, 3) \qquad \text{(Expression 3-7)}$$

Herein, the coefficients $c_{-2}$ and $c_3$ out of the four interpolation coefficients $c_{-1}, c_0, c_1$, and $c_2$ are handled as $c_{-2}=c_0$ and $c_3=c_1$, the following relational expression:

$$\begin{bmatrix} f_{-1} \\ f_0 \\ f_1 \\ f_2 \end{bmatrix} = \frac{1}{6}\begin{bmatrix} 4 & 2 & 0 & 0 \\ 1 & 4 & 1 & 0 \\ 0 & 1 & 4 & 1 \\ 0 & 0 & 2 & 4 \end{bmatrix} \cdot \begin{bmatrix} c_{-1} \\ c_0 \\ c_1 \\ c_2 \end{bmatrix} \qquad \text{(Expression 3-8)}$$

is obtained.

This is an expression showing the relationship between the pixel values $f_{-1}, f_0, f_1$, and $f_2$ of the four sample pixels and the four interpolation coefficients $c_{-1}, c_0, c_1$, and $c_2$. Therefore, to calculate the four interpolation coefficients $c_{-1}, c_0, c_1$, and $c_2$ based on the pixel values $f_{-1}, f_0, f_1$, and $f_2$ of the four sample pixels, this (Expression 3-8) is solved about $c_{-1}, c_0, c_1$, and $c_2$. A solution method for this is comparatively complicated, so that intermediate steps are omitted, and only the result of operation becomes the following expression:

$$\begin{bmatrix} c_{-1} \\ c_0 \\ c_1 \\ c_2 \end{bmatrix} = \frac{1}{15}\begin{bmatrix} 26 & -14 & 4 & -1 \\ -7 & 28 & -8 & 2 \\ 2 & -8 & 28 & -7 \\ -1 & 4 & -14 & 26 \end{bmatrix} \cdot \begin{bmatrix} f_{-1} \\ f_0 \\ f_1 \\ f_2 \end{bmatrix} \qquad \text{(Expression 3-9)}$$

When this (Expression 3-9) is substituted for the (Expression 3-6), the following expression:

$$f(x) = \frac{1}{5}((-3f_{-1} + 7f_0 - 7f_1 + 3f_2)x^3 + \qquad \text{(Expression 3-10)}$$
$$(7f_{-1} - 13f_0 + 8f_1 - 2f_2)x^2 +$$
$$(-4f_{-1} + f_0 + 4f_1 - f_2)x) + f_0$$

is obtained.

This (Expression 3-10) is in the form of a cubic polynomial "$f(x)=Ax^3+Bx^2+Cx+D$" concerning the position x, and the coefficients A, B, C, and D are given as the pixel values $f_{-1}, f_0, f_1$, and $f_2$ of the four sample pixels. Therefore, when the pixel values $f_{-1}, f_0, f_1$, and $f_2$ of the four sample pixels $P_{-1}, P_0, P_1$, and $P_2$ shown in FIG. 45 and the position x of the new pixel Q ($0 \leq x < 1$, that is, the new pixel Q is positioned between the sample pixels $P_0$ and $P_1$) are given, the pixel value f(x) of the new pixel Q can be calculated. This is the basic concept of cubic spline interpolation using four sample pixels, and this is a known matter.

<<<Section 3-2. Approach Unique to the Third Aspect of the Invention>>>

The cubic spline interpolation thus using four sample pixels are realized by operations using the (Expression 3-10). However, if the number of sample pixels exceeds 4, the expression corresponding to the (Expression 3-10) becomes very complicated, and in some cases, it becomes very difficult in actuality to solve such an expression.

Figure 46:
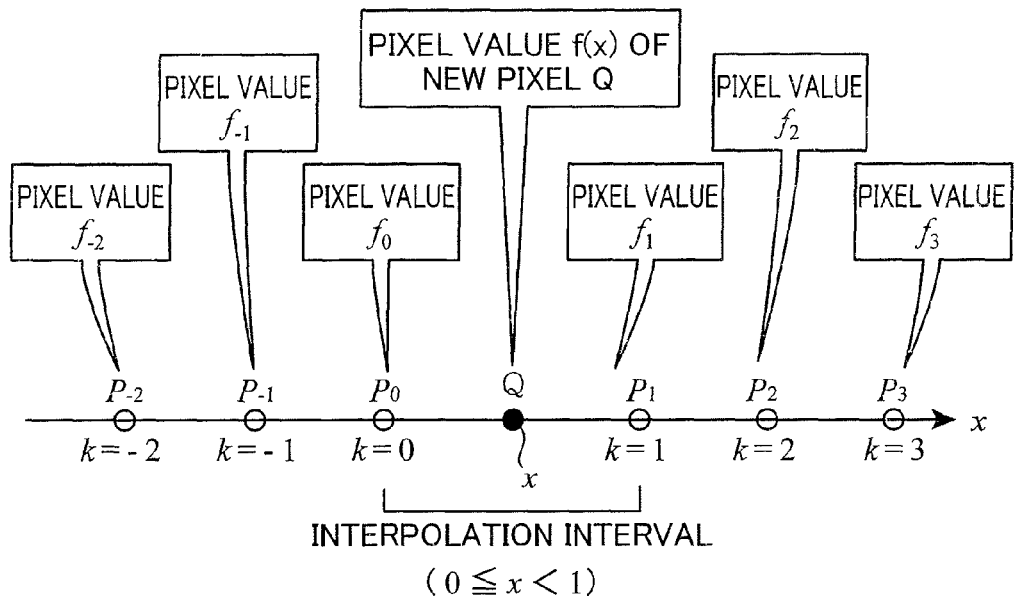
FIG. 46 is a diagram showing a concept of an interpolation method based on pixel values of six in total of sample pixels.

For example, as shown in FIG. 46, cubic spline interpolation using six in total of (−2)nd (k=−2) to third (k=3) sample pixels $P_{-2}, P_{-1}, P_0, P_2$, and $P_3$ is considered. Also in this case, the interpolation interval is $0 \leq x < 1$, and a new pixel Q (position: coordinate value x) whose interpolated value is to be calculated must be defined between the sample pixels $P_0$ and $P_1$. When thus performing interpolation using six in total of sample pixels, an interpolation equation including many pixel values $f_{-2}, f_{-1}, f_0, f_1, f_2$, and $f_3$ of the six sample pixels must be derived instead of (Expression 3-10). The following expression:

$$\begin{bmatrix} f_{-2} \\ f_{-1} \\ f_0 \\ f_1 \\ f_2 \\ f_3 \end{bmatrix} = \frac{1}{6}\begin{bmatrix} 4 & 2 & 0 & 0 & 0 & 0 \\ 1 & 4 & 1 & 0 & 0 & 0 \\ 0 & 1 & 4 & 1 & 0 & 0 \\ 0 & 0 & 1 & 4 & 1 & 0 \\ 0 & 0 & 0 & 1 & 4 & 1 \\ 0 & 0 & 0 & 0 & 2 & 4 \end{bmatrix} \cdot \begin{bmatrix} c_{-2} \\ c_{-1} \\ c_0 \\ c_1 \\ c_2 \\ c_3 \end{bmatrix} \qquad \text{(Expression 3-11)}$$

shows the relationship between the six pixel values $f_{-2}, f_{-1}, f_0, f_1, f_2$, and $f_3$ and the six interpolation coefficients $c_{-2}, c_{-1}, c_0, c_1, c_2$, and $c_3$, and corresponds to the (Expression 3-8) shown in the case of interpolation using four sample pixels. To find the six interpolation coefficients $c_{-2}, c_{-1}, c_0, c_1, c_2$, and $c_3$ based on the pixel values $f_{-2}, f_{-1}, f_0, f_1, f_2$, and $f_3$, this (Expression 3-11) must be solved for $c_{-2}, c_{-1}, c_0, c_1, c_2$, and $c_3$. Calculation of this becomes very complicated.

Thus, the cubic spline interpolation in which the number of sample pixels is set to 6 or more needs a very complicated operation, and conventionally, it is difficult to efficiently perform this operation. To solve this problem, the inventor of the present invention conceived the following unique approach. Hereinafter, the concept of this unique approach will be described with reference to numerical expressions.

The inventor of the present invention focused attention on the point that more than half the values of the determinant including 6 rows and 6 columns of the (Expression 3-11) are "0," and adjusted the six polynomials corresponding to the (Expression 3-11) to delete the interpolation coefficients $c_{-2}$ and $c_3$. Then, the inventor considered that the remaining interpolation coefficients $c_{-1}, c_0, c_1$, and $c_2$ could be determined by solving the (Expression 3-11) into the following form of (Expression 3-11):

$$\begin{bmatrix} g_{-1} \\ f_0 \\ f_1 \\ g_2 \end{bmatrix} = \frac{1}{6}\begin{bmatrix} w & 1 & 0 & 0 \\ 1 & 4 & 1 & 0 \\ 0 & 1 & 4 & 1 \\ 0 & 0 & 1 & w \end{bmatrix} \cdot \begin{bmatrix} c_{-1} \\ c_0 \\ c_1 \\ c_2 \end{bmatrix} \qquad \text{(Expression 3-12)}$$

In this (Expression 3-12), new variables $g_{-1}$, $g_{-2}$, and w are used, and these variables are defined as follows:

$$\begin{cases} g_1 = -\frac{1}{4}f_{-2} + f_{-1} = \frac{1}{6}\left(\frac{14}{4}c_{-1} + c_0\right) \\ g_2 = -\frac{1}{4}f_3 + f_2 = \frac{1}{6}\left(\frac{14}{4}c_2 + c_1\right) \\ w = \frac{7}{2} \end{cases}$$ (Expression 3-13)

As shown in this (Expression 3-13), $g_{-1}$ is a factor to be determined from the pixel values $f_{-2}$ and $f_{-1}$ of the left two pixels $P_{-2}$ and $P_{-1}$ in FIG. 46, and $g_2$ is a factor to be determined from the pixel values $f_2$ and $f_3$ of the two right pixels $P_2$ and $P_3$ in FIG. 46. As shown in the determinant of (Expression 3-12), w can be regarded as a weighting factor for finding $g_{-1}$ and $g_2$.

Herein, by solving the (Expression 3-12) for $c_{-1}$, $c_0$, $c_1$, and $c_2$, the following expression:

$$\begin{bmatrix} c_{-1} \\ c_0 \\ c_1 \\ c_2 \end{bmatrix} = \frac{6}{(5w-1)(3w-1)}$$ (Expression 3-14)

$$\begin{bmatrix} 15w-4 & 1-4w & w & -1 \\ 1-4w & -w(1-4w) & -w^2 & w \\ w & -w^2 & -w(1-4w) & 1-4w \\ -1 & w & 1-4w & 15w-4 \end{bmatrix} \cdot \begin{bmatrix} g_{-1} \\ f_0 \\ f_1 \\ g_2 \end{bmatrix}$$

is derived. The interpolation coefficients are only four $c_{-1}$, $c_0$, $c_1$, and $c_2$, so that by substituting these for the (Expression 3-6), the following expression:

$$f(x) = \frac{1}{(3w-1)}\{-6g_{-1} + (3w+1)(f_0 - f_1) + 6g_2\}x^3 +$$ (Expression 3-15)

$$\frac{3}{(5w-1)(3w-1)}\left\{\begin{array}{c} 6(4w-1)g_{-1} - (9w^2 + 2w - 1)f_0 + \\ 6w^2 f_1 - 6wg_2 \end{array}\right\}x^2 +$$

$$\frac{3}{(5w-1)(3w-1)}\left\{\begin{array}{c} -2(7w-2)g_{-1} - (w^2 - 4w + 1)f_0 + \\ 2w(2w-1)f_1 - 2(2w-1)g_2 \end{array}\right\}x + f_0$$

is obtained. This (Expression 3-15) is in the form of a cubic polynomial "$Ax)=Ax^3+Bx^2+Cx+D$" concerning the position x, and the coefficients A, B, C, and D can be found based on the pixel value $f_{-1}$ and $f_0$, the two factors $g_{-1}$ and $g_2$ and the weighting factor w shown in the (Expression 3-13). As shown in the (Expression 3-13), the factor $g_{-1}$ is found from the two pixel values $f_{-2}$ and $f_{-1}$, and the factor $g_2$ is found from the two pixel values $f_2$ and $f_3$, and resultantly, the coefficients A, B, C, and D in the (Expression 3-15) can be found from the six pixel values $f_{-2}$, $f_{-1}$, $f_0$, $f_1$, $f_2$, and $f_3$ and the weighting factor w. Therefore, by giving the position x ($0 \leq x < 1$) of the new pixel Q, the pixel value f(x) thereof can be calculated.

This approach in the case of using six simple pixels is also applicable to the case where the number of sample pixels is further increased, and it can be expanded to more generalized expressions. Namely, in the description given above, the (Expression 3-8) is shown as the case where the number of sample pixels is set to 4 and the (Expression 3-11) is shown as the case where the number of sample pixels is set to 6, however, as a general formula when the number of sample pixels is set to "2(i+1)" (i is an integer of 1 or more), the following expression:

$$\begin{bmatrix} f_{-i} \\ f_{-i+1} \\ \vdots \\ f_{-1} \\ f_0 \\ f_1 \\ f_2 \\ \vdots \\ f_i \\ f_{i+1} \end{bmatrix} =$$ (Expression 3-16)

$$\frac{1}{6}\begin{bmatrix} 4 & 2 & 0 & 0 & \cdots & 0 & 0 & 0 & 0 & 0 \\ 1 & 4 & 1 & 0 & \cdots & 0 & 0 & 0 & 0 & 0 \\ 0 & \ddots & \ddots & \ddots & \ddots & \vdots & \vdots & \ddots & \vdots \\ \vdots & \cdots & 1 & 4 & 1 & 0 & 0 & 0 & \ddots & \vdots \\ 0 & \cdots & 0 & 1 & 4 & 1 & 0 & 0 & \ddots & 0 \\ 0 & \cdots & 0 & 0 & 1 & 4 & 1 & 0 & \ddots & 0 \\ 0 & \cdots & 0 & 0 & 0 & 1 & 4 & 1 & 0 & 0 \\ \vdots & \vdots & \vdots & \vdots & \vdots & \ddots & \ddots & \ddots & \ddots & \vdots \\ 0 & 0 & 0 & 0 & \cdots & 0 & 0 & 1 & 4 & 1 \\ 0 & 0 & 0 & 0 & \cdots & 0 & 0 & 0 & 2 & 4 \end{bmatrix}\begin{bmatrix} c_{-i} \\ c_{-i+1} \\ \vdots \\ c_{-1} \\ c_0 \\ c_1 \\ c_2 \\ \vdots \\ c_i \\ c_{i+1} \end{bmatrix}$$

is known (for example, the aforementioned document Hsieh S. Hou Harry C. Andrews, "Cubic Splines for Image Interpolation and Digital Filtering," IEEE Trans. on ASSP-26, No. 6, December 1978, pp. 508-517.)

Figure 47:
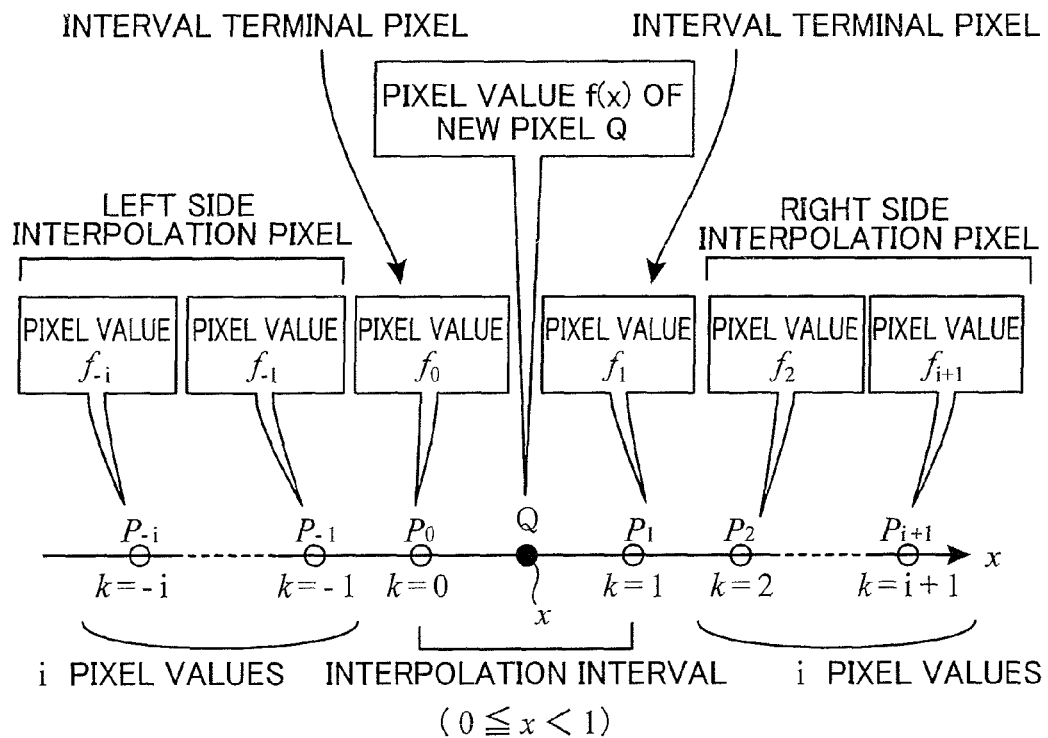
FIG. 47 is a diagram showing a concept of an interpolation method based on pixel values of 2(i+1) in total of sample pixels.

This (Expression 3-16) is an application to the cubic spline interpolation using "2(i+1)" in total of (−i)th (k=−0 to (i+1)th (k=i+1) sample pixels $P_{-i}$, $P_{-i+}$, ..., $P_{-1}$, $P_0$, $P_1$, $P_2$, ..., $P_i$, and $P_{i+1}$ as shown in FIG. 47. Also in this case, the interpolation interval is absolutely $0 \leq x < 1$, and the new pixel Q whose interpolated value is to be found (position is the coordinate value x) must be defined between the sample pixels $P_0$ and $P_1$. Thus, when interpolation using "2(i+1)" in total of sample pixels is performed, as shown in the (Expression 3-16), an expression including "2(i+1)" of pixel values $f_{-i}$, $f_{-i+1}$, ..., $f_{-1}$, $f_0$, $f_1$, $f_2$, ..., $f_i$ and $f_{i+1}$ and "2(i+1)" of interpolation coefficients $c_{-1}$, $c_{-i+1}$, ..., $c_{-1}$, $c_0$, $c_1$, $c_2$, ..., $c_i$, and $c_{i+1}$ is defined.

A result of the solution of a general formula like this (Expression 3-16) for the interpolation coefficients $c_{-i}$, $c_{-i+1}$, ..., $c_{-1}$, $c_0$, $c_1$, $c_2$, ..., $c_i$, and $c_{i+1}$ is not shown in any document as far as the inventor knows. However, the above-described approach according to the idea of the inventor is also applicable to the general formula shown in this (Expression 3-16). Namely, a determinant of this (Expression 3-16) having "2(i+1)" rows and "2(i+1)" columns can be restored to a determinant having "2(i+1)−1" rows and "2(i+1)−1" columns by the same method as that for restoring the (Expression 3-11) to the (Expression 3-12). In this case, for example, the pixel values $f_{-i}$ and $f_{-i+1}$ are substituted by factors having values satisfying the following expression:

$$-\frac{1}{4}f_{-i} + f_{-i+1} = \frac{1}{6}\left(\frac{7}{2}c_{-i+1} + c_{-i+2}\right) \qquad \text{(Expression 3-17)}$$

This (Expression 3-17) corresponds to an expression concerning the factor $g_{-1}$ of (Expression 3-13). Therefore, similarly to the substitution of the factor $g_{-1}$ in the (Expression 3-12) for the pixel values $f_{-2}$ and $f_{-1}$ of the (Expression 3-11), the pixel values $f_{-i}$ and $f_{-i+1}$ of the (Expression 3-16) can be substituted by the factor shown in the (Expression 3-17), and the pixel values $f_i$ and $f_{i+1}$ of the (Expression 3-16) can also be substituted by a similar factor.

By repeating this processing, in the end, the (Expression 3-16) can be restored to the form shown in the (Expression 3-12). In other words, the (Expression 3-12) is not only a restored form of the interpolation equation using 6 sample pixels shown in the (Expression 3-11) but also a restored form of a generalized interpolation equation using "2(i+1)" sample pixels as shown in the (Expression 3-16).

However, in this case, the weighting factor w also needs to be generalized by using i. In detail, an initial value of the weighting factor w when i=0 is defined as $w_0$=2, the weighting factor $w_i$ with respect to a value of arbitrary i is defined by the following recurrence formula:

$$w_i = 4 - \frac{1}{w_{i-1}} \quad \text{(where } w_0 = 2\text{)} \qquad \text{(Expression 3-18)}$$

In detail, $w_0$=2, $w_1$=7/2, $w_2$=26/7 and so on. Then, when the factors $g_{-1}$, $g_2$, and w shown in the (Expression 3-12) are defined as follows:

$$\begin{cases} g_{-1} = \frac{-1}{w_{i-1}}\left(\ldots\left(\frac{-1}{w_2}\left(\frac{-1}{w_1}\left(-\frac{1}{4}f_{-i} + f_{-i+1}\right) + f_{-i+2}\right)\ldots\right) + f_{-i+(i-2)}\right) + f_{-i+(i-1)} \\ \qquad = \frac{1}{6}\left(\left(-\frac{1}{w_{i-2}} + 4\right)c_{-i+(i-1)} + c_{-i+i}\right) \\ g_{-2} = \frac{-1}{w_{i-1}}\left(\ldots\left(\frac{-1}{w_2}\left(\frac{-1}{w_1}\left(-\frac{1}{4}f_{i+1} + f_i\right) + f_{i-1}\right)\ldots\right) + f_{i+(3-i)}\right) + f_{i+(2-i)} \\ \qquad = \frac{1}{6}\left(\left(-\frac{1}{w_{i-2}} + 4\right)c_{-i+(i+2)} + c_{-i+(i+1)}\right) \\ w = w_{i-1} \end{cases} \qquad \text{(Expression 3-19)}$$

the (Expression 3-12) can be handled as a restored form of a generalized interpolation equation using "2(i+1)" sample pixels.

For example, when $g_{-1}$, $g_2$, and w shown in the (Expression 3-13) correspond to the factors and weighting factor in the case of i=2 (that is, in the case where interpolation is performed by using six sample pixels), and are obtained by substituting 2 for i in the (Expression 3-19).

As described above, when the (Expression 3-12) is solved for $c_{-1}$, $c_0$, $c_1$, and $c_2$, the (Expression 3-14) is obtained, and the interpolation coefficients are only four of $c_{-1}$, $c_0$, $c_1$, and $c_2$. Then, by applying these to the (Expression 3-6), the (Expression 3-15) is obtained. Resultantly, the (Expression 3-15) can be applied without change in the case of generalization using "2(i+1)" sample pixels, and in this case, the values of $g_{-1}$, $g_2$, and w are calculated by using the (Expression 3-19).

The (Expression 3-15) is in the form of a cubic polynomial "$f(x)=Ax^3+Bx^2+Cx+D$" concerning the position x, and the coefficients A, B, C, and D are calculated by the two factors $g_{-1}$ and $g_2$ and the weighting factor w shown in the (Expression 3-19).

Herein, as shown on the upper stage of the (Expression 3-19), the factor $g_{-1}$ is a factor to be found based on i in total of pixel values $f_{-i}$, $f_{-i+1}$, $f_{-i+2}$, ..., $f_{-i+(i-2)}$, $f_{-i+(i-1)}$ and the weighting factors $w_1$, $w_2$, ..., $w_{i-1}$, and these i pixel values are pixel values of the (−i)th (k=−0 through (−1)st sample pixels $P_{-1}$, ..., $P_{-1}$, that is, i pixels continuously arranged adjacent to each other on the left side of the interpolation interval. In this application, for the sake of convenience, the "predetermined number of pixels to be used for interpolation" continuously arranged adjacent to each other on the left side of the interpolation interval like the sample pixels $P_{-i}$, ..., $P_{-1}$ are referred to as left side interpolation pixels, and $g_{-i}$ is referred to as a left side influence factor. Even when the (−i−1)th (k=−i−1) pixel is arranged on the further left side of FIG. 47, it is not a sample pixel and does not correspond to the left side interpolation pixel as long as it is not used for interpolation.

On the other hand, as shown on the middle stage of the (Expression 3-19), the factor $g_2$ is found based on i in total of pixel values $f_{i+1}$, $f_i$, $f_{i-1}$, ..., $f_{i+(3-i)}$, $f_{i+(2-i)}$ and the weighting factor $w_1$, $w_2$, ..., $w_{i-1}$. These i pixel values are of the (i+1)th (k=i+1) through second (k=2) sample pixels $P_{i+1}$, ..., $P_2$ as shown in FIG. 47, that is, i pixels continuously arranged adjacent to each other on the right side of the interpolation interval. In the present application, for the sake of convenience, like these sample pixels $P_{i+1}$, ..., $P_2$, the "predetermined number of pixels to be used for interpolation" continuously arranged adjacent to each other on the right side of the interpolation interval are referred to as right side interpolation pixels and $g_2$ is referred to as a right side influence factor. As a matter of course, even when the (i+2)th (k=i+2) pixel is further arranged on the right side of FIG. 47, it is not a sample pixel and does not correspond to the right side interpolation pixel as long as it is not used for interpolation.

As shown in FIG. 47, in the present application, the two pixels $P_0$ and $P_1$ positioned on the left and right ends of the interpolation interval are referred to as interval terminal pixels. Resultantly, in the case of expansion to a general formula using "2(i+1)" sample pixels, the pixel value f(x) of the new pixel Q can be calculated based on the (Expression 3-15) and the (Expression 3-19), if the pixel values $f_0$ and $f_1$ of the interval terminal pixels $P_0$ and $P_1$, the pixel values $f_{-1}$, ..., $f_{-1}$, of i left side interpolation pixels $P_{-1}$, ..., $P_{-1}$, the pixel values $f_{i+1}$, ..., $f_2$ of i right side interpolation pixels $P_{i+1}$, ..., $P_2$, and the position x of the new pixel Q are given. This is the principle of the interpolation device according to the third aspect of the invention.

Figure 48:
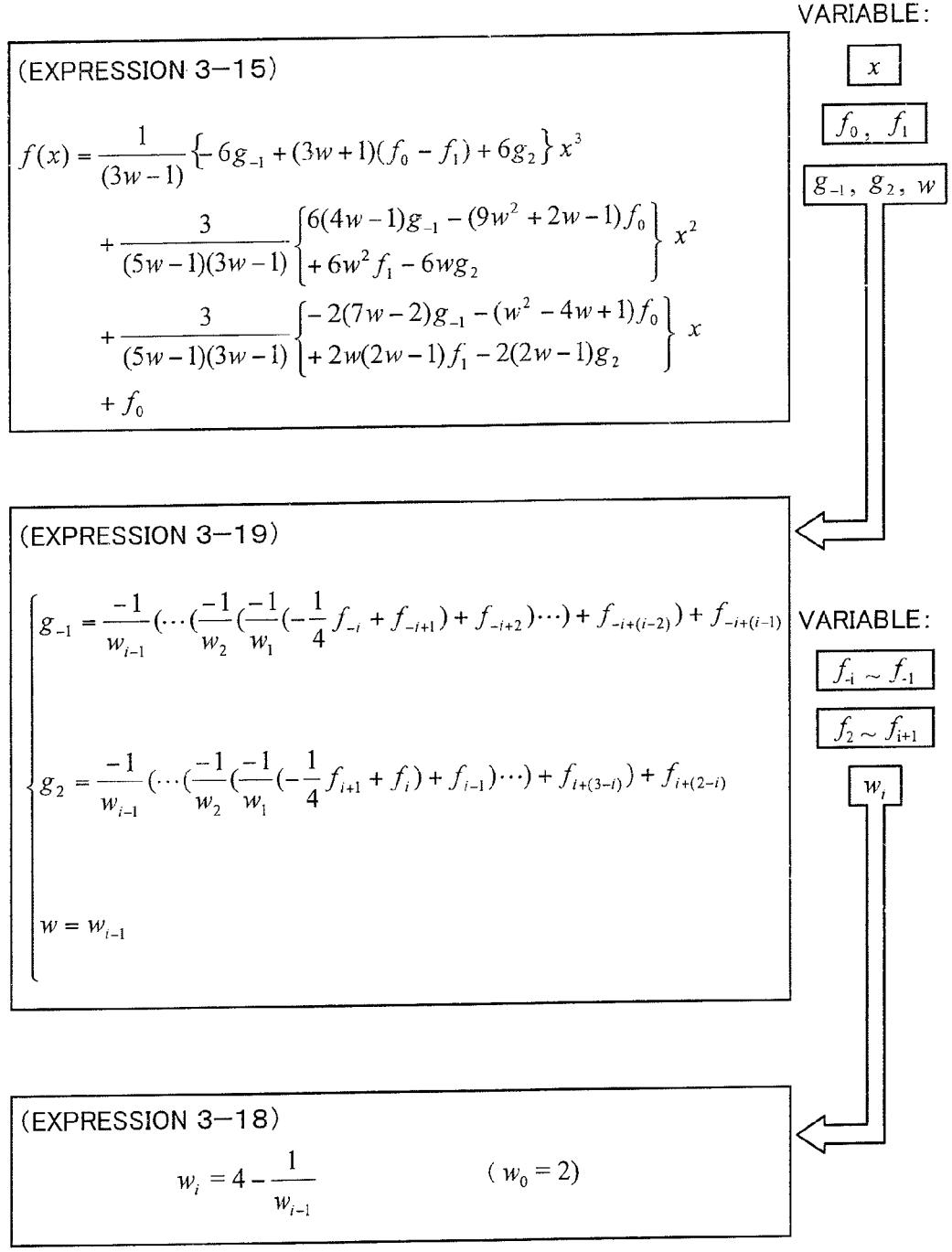
FIG. 48 is a diagram showing a correlation of numerical expressions to be used as a basic principle of an interpolation device according to a third aspect of the invention.

FIG. 48 is a diagram showing correlation of the numerical expressions to be used in this basic principle. The (Expression 3-15) shown on the upper stage of the diagram is a basic expression for calculating a pixel value f(x), and it is in the form of a cubic polynomial "$f(x)=Ax^3+Bx^2+Cx+D$" concerning the position x. The variables in this (Expression 3-15) are the position x of the new pixel Q, the pixel values $f_0$ and $f_1$ of the interval terminal pixels, the left side influence factor $g_{-1}$, the right side influence factor $g_2$, and the weighting factor was shown on the right side of the diagram.

The (Expression 3-19) shown on the middle stage of the diagram is a computation expression for the left side influence factor $g_{-1}$, the right side influence factor $g_2$, and the weighting factor w used as variables in the (Expression 3-15) on the upper stage. The variables in this (Expression 3-19) are the pixel values $f_{-i}$ through $f_{-1}$ of the left side interpolation pixels, pixel values $f_2$ through $f_{i+1}$ of the right side interpolation pixels, and the weighting factor $w_i$ (i=1, 2, 3, ...) as shown on the right side of the diagram.

Herein, the weighting factor $w_i$ is a factor indicating weighting for each sample pixel according to the distance from the interpolation interval. Logically, the weighting is not simple weighting indicating such as "the j-th weighting factor $w_j$ indicates weighting of the j-th sample pixel $P_j$," and one weighting factor influences weighting of many sample pixels.

For example, the first expression of the (Expression 3-19) shown on the middle stage of FIG. 48 is an expression for calculating the left side influence factor $g_{-1}$, and focusing attention on the (−i)th pixel value $f_{-i}$ described as a first member, it is successively multiplied by the reciprocals of the weighting factors $w_1, w_2, \ldots, w_{i-1}$, however, focusing attention on the (−1)st pixel value $f_{-1}$ described as the last member (described as $f_{-i+(i-1)}$ in the diagram for the sake of explanation), it is not multiplied by the weighting factor at all, and focusing attention on the (−2)nd pixel value $f_{-2}$ (described as $f_{-i+(i-2)}$ in the diagram for the sake of explanation) described as a member just before the (−1)st pixel value is multiplied by only the reciprocal of the weighting factor $w_{i-1}$. This means that the farther the pixel value of the pixel is from the interpolation interval, the more times it is multiplied by the reciprocal of the weighting factor, and resultantly, the weighting factor in the third aspect of the invention is a parameter indicating weighting for each sample pixel according to the distance from the interpolation interval.

The (Expression 3-18) shown on the lower stage of FIG. 48 is a computation expression for this weighting factor $w_i$, and is given in the form of a recurrence formula setting $w_0=2$ as an initial value. By using this recurrence formula, the necessary number of weighting factors can be calculated in advance as $w_1=7/2$, $w_2=26/7$ and so on, and the calculated values can be stored in the table. Therefore, in actual interpolation, it is no longer necessary to perform calculation based on this (Expression 3-18), and necessary weighting factors are read from this table.

Resultantly, to calculate the pixel value of the new pixel Q defined at the arbitrary position x in the interpolation interval, first, the parameter i indicating the sum of the sample pixels to be used for interpolation is determined, and as shown in FIG. 47, the pixel values $f_{-i}$ through $f_{-1}$ of i in total of left side interpolation pixels $P_{-i}$ through $P_{-1}$ and pixel values $f_2$ through $f_{i+1}$ of i in total of right side interpolation pixels $P_2$ through $P_{i+1}$ are obtained, necessary weighting factors $w_1$, $w_2, \ldots, w_{i+1}$ are readout from the table, and based on the (Expression 3-19) of FIG. 48, processing for obtaining the left side influence factor $g_{-1}$, the right side influence factor $g_2$, and the weighting factor w is performed. Thereafter, by using the pixel values $f_0$ and $f_1$ of the interval terminal pixels $P_0$ and $P_1$, the position x of the new pixel Q, the factors $g_{-1}$ and $g_2$ that have already been calculated, and the weighting factor w, the pixel value f(x) is calculated based on the (Expression 3-15) of FIG. 48.

Thus, according to the approach unique to the third aspect of the invention, first, as a previous step, as shown in FIG. 47, by using the pixel values $f_{-i}$ through $f_{-1}$ of the left side interpolation pixels $P_{-i}$ through $P_{-1}$, the left side influence factor $g_{-1}$ indicating influences of these pixel values on the respective coefficients of the cubic polynomial "$f(x)=Ax^3+Bx^2+Cx+D$" is calculated, and similarly, by using the pixel values $f_2$ through $f_{i+1}$ of the right side interpolation pixels $P_2$ through $P_{i+1}$, the right side influence factor $g_2$ indicating influences of these pixel values on the coefficients of the cubic polynomial "$f(x)=Ax^3+Bx^2+Cx+D$" is calculated. Then, as a post-step, the pixel value f(x) is calculated by using the result of operation of said previous step and the pixel values $f_0$ and $f_1$ of the interval terminal pixels $P_0$ and $P_1$ and the position x shown in FIG. 47.

The cubic spline interpolation based on this process is also applicable to the case where the number of sample pixels to be used for interpolation is arbitrarily set, and very efficient operation becomes possible. Particularly, the weighting factor to be used for operations of both the previous step and the post-step can be prepared in advance as a constant stored in the form of a table, so that processing required when performing interpolation is only reading out from this table.

<<<Section 3-3. Interpolation Device According to Basic Embodiment>>>

Subsequently, a constitution of an interpolation device 800 according to a basic embodiment of the third aspect of the invention will be described with reference to the block diagram of FIG. 49. As illustrated, this device comprises a data input unit 810, a left side influence factor arithmetic unit 820, a right side influence factor arithmetic unit 830, an interpolated value arithmetic unit 840, and a weighting factor storage unit 850.

This interpolation device 800 has a function to calculate a pixel value f(x) of a new pixel Q defined at an arbitrary position x in the interpolation interval whose end points are at two adjacent pixels $P_0$ and $P_1$ based on a one-dimensional pixel array including a plurality of pixels having predetermined pixel values arranged at predetermined pitches by using a cubic polynomial "$f(x)=Ax^3+Bx^2+Cx+D$" concerning the position x.

Figure 49:
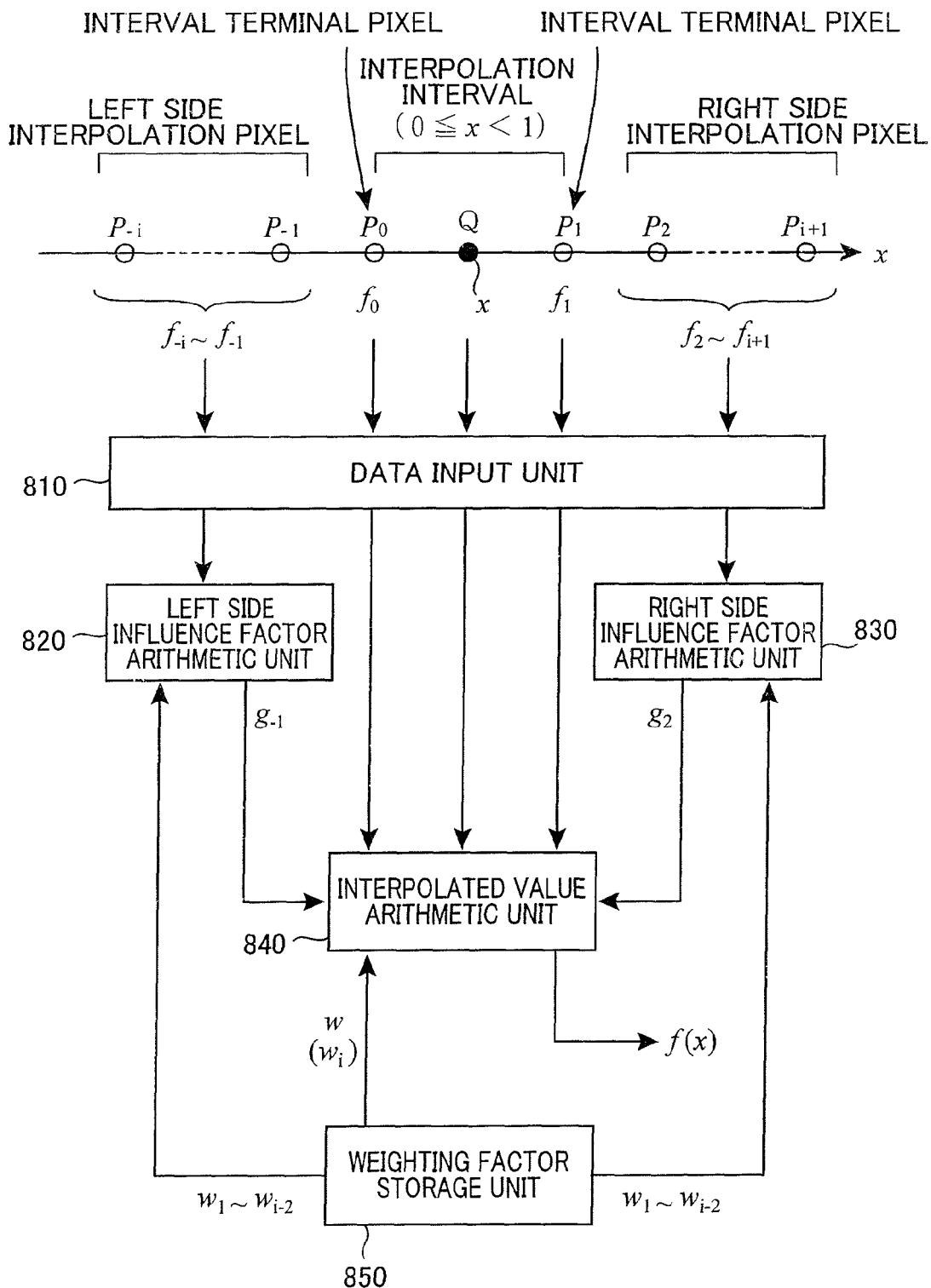
FIG. 49 is a block diagram showing a constitution of the interpolation device according to a basic embodiment of the third aspect of the invention.

On the upper stage of FIG. 49, a conceptional diagram of the one-dimensional pixel array to be subjected to this interpolation is shown.

This one-dimensional pixel array is completely the same as that shown in FIG. 47, and cubic spline interpolation to calculate the pixel value f(x) of the new pixel Q defined at the position x on the interpolation interval satisfying "$0 \leq x<1$" on the x axis based on the pixel values of "2(i+1)" sample pixels is performed.

Namely, the 0-th pixel $P_0$ and the first pixel $P_1$ adjacent to each other in the one-dimensional pixel array are set as interval terminal pixels, and with respect to a predetermined integer i ($i \geq 1$), i in total of pixels from the (−i)th pixel $P_{-i}$ to the (−1)st pixel $P_{-1}$ are defined as the left side interpolation pixels, and i in total of pixels from the second pixel $P_2$ to the (i+1)th pixel $P_{i+1}$ are defined as the left side interpolation pixels. Then, S=2(i+1) sample pixels are defined, and the new pixel Q is defined at the position x in the range of $0 \leq x<1$ provided that the position of the interval terminal pixel $P_0$ is set to 0 and the position of the interval terminal pixel $P_1$ is set to 1.

The data input unit 810 has a function to input the pixel values $f_0$ and $f_1$ of the interval terminal pixels $P_0$ and $P_1$ at both ends of the interpolation interval, the pixel values $f_{-i}$ through $f_{-1}$ of the left side interpolation pixels $P_{-i}$ through $P_{-1}$ as "predetermined number: of pixels to be used for interpolation" (i pixels in the illustrated example) continuously arranged adjacent to each other on the left side of the interpolation interval, the pixel values $f_2$ through $f_{i+1}$ of the right side interpolation pixels $P_2$ through $P_{i+1}$ as "predetermined number of pixels to be used for interpolation" (i pixels in the illustrated example) continuously arranged adjacent to each other on the right side of the interpolation interval, and the position x of the new pixel Q. In actuality, the data input unit 810 can be constituted by a buffer circuit which retrieves and temporarily stores these data.

On the other hand, the weighting factor storage unit 850 is a component having a function to store the weighting factor indicating weighting according to the distance from the interpolation interval for each sample pixel. Namely, it stores values of the weighting factors $w_1, w_2, w_3, \ldots, w_i$ expressed by the recurrence formula of $w_i=-4-(1/w_{i-1})$, (where $w_0=2$) shown in the (Expression 3-18). In detail, as described above, the weighting factor storage unit 850 can be constituted by a register circuit which stores values of the weighting factors $w_1=\frac{7}{2}, w_2=\frac{26}{7}$ and so on calculated in advance by this recurrence formula in the form of a table.

The left side influence factor arithmetic unit 820 is a component having a function to calculate the left side influence factor $g_{-1}$ based on the pixel values $f_{-i}$ through $f_{-1}$ of the left side interpolation pixels inputted by the data input unit 810 and the weighting factors $w_1$ through $w_{i-1}$ readout from the table in the weighting factor storage unit 850. This left side influence factor $g_{-1}$ is a factor indicating influences of the respective pixel values $f_{-i}$ through $f_{-1}$ of the left side interpolation pixels on the coefficients of the cubic polynomial "$f(x)=Ax^3+Bx^2+Cx+D$," and can be calculated, as described above, based on the first expression of the (Expression 3-19) of FIG. 48, that is, the following arithmetic expression:

$$g_{-1}=-1/w_{i-1}(\quad \ldots \quad (-1/w_2(-1/w_1(-\frac{1}{4}\cdot f_{-1}+f_{-i+1})+f_{-i+2})\ldots)+f_{-i+(i-2)})+f_{-i+(i-1)}$$

The right side influence factor arithmetic unit 830 is a component having a function to calculate the right side influence factor $g_2$ based on the pixel values $f_2$ through $f_{i+1}$ of the right side interpolation pixels inputted by the data input unit 810 and the weighting factors $w_1$ through $w_{i-1}$ readout from the table in the weighting factor storage unit 850. This right side influence factor $g_2$ indicates influences of the respective pixel values $f_2$ through $f_{i+1}$ of the right side interpolation pixels on the coefficients of the cubic polynomial "$f(x)=Ax^3+Bx^2+Cx+D$," and can be calculated, as described above, based on the second expression of the (Expression 3-19) of FIG. 48, that is, the following arithmetic expression:

$$g_2=-1/w_{i-1}(\quad \ldots \quad (-1/w_2(-1/w_1(-\frac{1}{4}\cdot f_{i+1}+f_i)+f_{i-1})\ldots)+f_{i+(3-i)})+f_{i+(2-i)}$$

Herein, the operations to be performed in the left side influence factor arithmetic unit 820 and the right side influence factor arithmetic unit 830 are repetition of product-sum operations as shown in the (Expression 3-19) of FIG. 48, so that these arithmetic units 820 and 830 can be realized by a combination of general multiplier and adder.

On the other hand, the interpolated value arithmetic unit 840 is a component having a function to calculate the pixel value f(x) by determining the coefficients A, B, C, and D of the cubic polynomial "$f(x)=Ax^3+Bx^2+Cx+D$" based on the pixel values $f_0$ and $f_1$ of the interval terminal pixels inputted by the data input unit 810, the left side influence factor $g_{-1}$ calculated by the left side influence factor arithmetic unit 820, the right side influence factor $g_2$ calculated by the right side influence factor arithmetic unit 830, and the weighting factor $w_i$ readout from the table stored in the weighting factor storage unit 850, and performing an operation by substituting the position x inputted by the data input unit 810 for this cubic polynomial. As described above, this operation is performed based on the (Expression 3-15) of FIG. 48. As shown in this (Expression 3-15), the coefficient D becomes equal to the pixel value $f_0$ of one interval terminal pixel, so that it can be determined without any operation.

Figure 50:
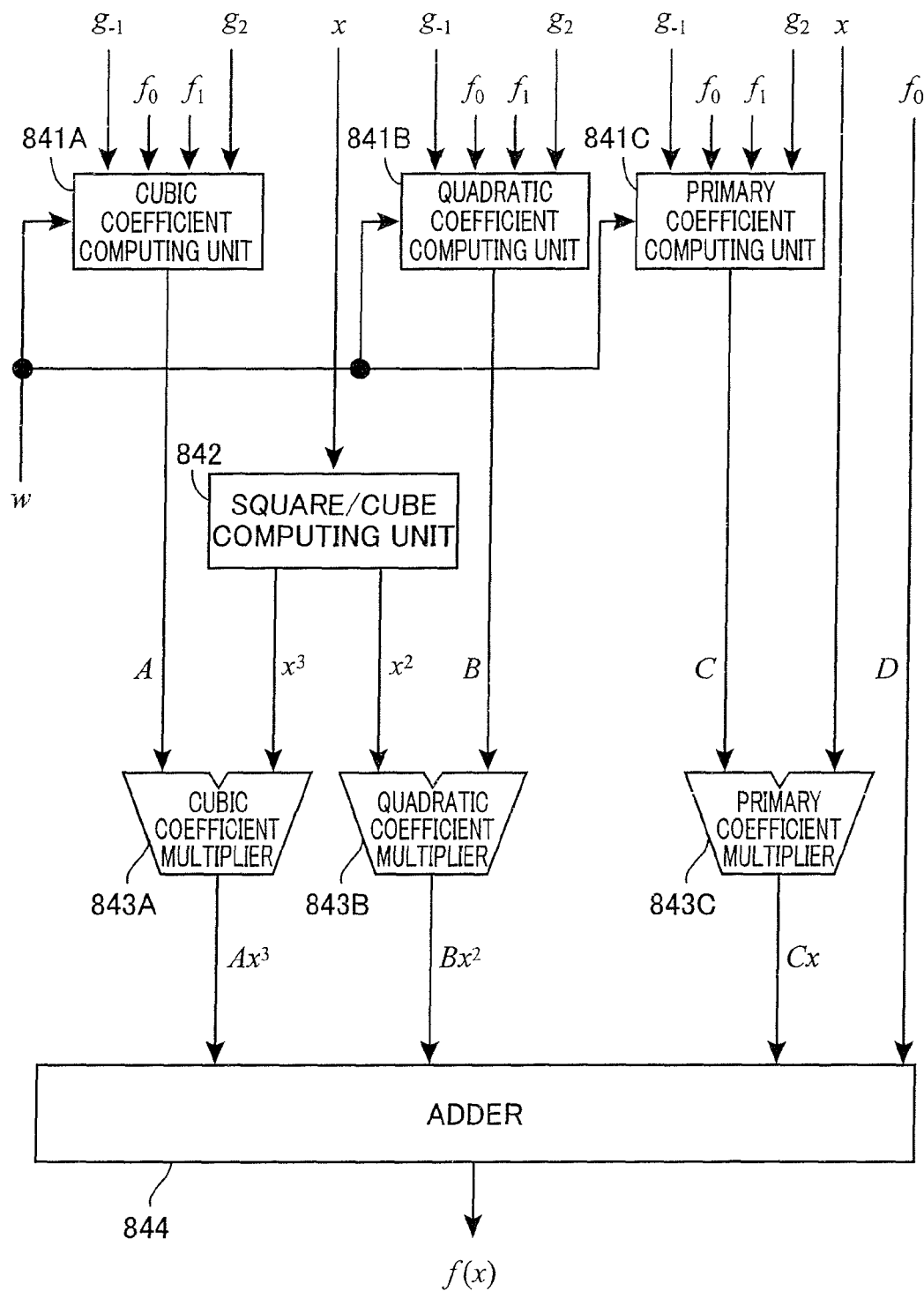
FIG. 50 is a block diagram showing a constitution example of an interpolated value arithmetic unit 840 in the interpolation device shown in FIG. 49.

FIG. 50 is a block diagram showing a constitution example of the interpolated value arithmetic unit 840 in the interpolation device 800 shown in FIG. 49. Herein, the cubic coefficient computing unit 841A performs an arithmetic operation to calculate a cubic coefficient A, and the quadratic coefficient computing unit 841B performs an arithmetic operation to calculate a quadratic coefficient B, and the primary coefficient computing unit 841C performs an arithmetic operation to calculate a primary coefficient C. All of these perform the arithmetic operations to calculate the respective coefficients based on the pixel values $f_0$ and $f_1$ of the interval terminal pixels, the left side influence factor $g_{-1}$, the right side influence factor $g_2$, and the weighting factor w.

In detail, as shown in the (Expression 3-15) of FIG. 48, the cubic coefficient computing unit 841A performs an arithmetic operation of $A=1/(3w-1)\{-6g_{-1}+(3w+1)(f_0-f_1)+6g_2\}$, the quadratic coefficient computing unit 841B performs an arithmetic operation of $B=3/((5w-1)(3w-1)) \{6(4w-1)g_{-1}-(9w^2+2w-1)f_0+6w^2 f_1-6wg_2\}$, and the primary coefficient computing unit 841C performs an arithmetic operation of $3/((5w-1)(3w-1)) \{-2(7w-2)g_{-1}-(w^2-4w+1)f_0+2w(2w-1)f_1-2(2w-1)g_2\}$. As described above, the coefficient D becomes $D=f_0$, so that it does not need any operation.

On the other hand, the square/cube computing unit 842 is a component for calculating a square value $x^2$ and a cube value $x^3$ of a given position x. The cubic coefficient multiplier 843A calculates $Ax^3$ by multiplying the cubic coefficient A calculated by the cubic coefficient computing unit 841 and the cube value $x^3$ calculated by the square/cube computing unit 842. Then, the quadratic coefficient multiplier 843B calculates $Bx^2$ by multiplying the quadratic coefficient B calculated by the quadratic coefficient computing unit 841B and the square value $x^2$ calculated by the square/cube computing unit 842. Furthermore, the primary coefficient multiplier 843C calculates Cx by multiplying the primary coefficient C calculated by the primary coefficient computing unit 841C and the given position x.

Last, addition of $Ax^3+Bx^2+Cx+D$ is performed by the adder 844 to find the pixel value f(x).

<<<Section 3-4. More Efficient Embodiment>>>

Resultantly, the interpolated value arithmetic unit 840 shown in FIG. 50 performs processing for calculating the pixel value f(x) by calculating the cubic polynomial "$f(x)=Ax^3+Bx^2+Cx+D$" without change. Therefore, the coefficients of the third power, the second power, and the first power of x require multiplication, respectively, and the number of computing units inevitably increases. Therefore, herein, an embodiment of the interpolated value arithmetic unit 840 with which more efficient arithmetic operation can be performed will be described.

As described above, the interpolated value arithmetic unit 840 is a component for calculating the cubic polynomial in the form of "$f(x)=Ax^3+Bx^2+Cx+D$" based on the (Expression 3-15) of FIG. 48, however, calculation of values directly indicating the four coefficients A, B, C, and D is not always necessary to calculate f(x).

Now, the following expression:

$$\begin{aligned}f(x) &= [\{ax+b(1-x)\}x+c(1-x)]x+d(1-x) \quad \text{(Expression 3-20)}\\ &= [\{(a-b)x+(b-c)\}x+(c-d)]x+d \\ &= (a-b)x^3+(b-c)x^2+(c-d)x+d\end{aligned}$$

is considered. The first, second, and third expressions of this (Expression 3-20) are all equivalent expressions. Herein, focusing attention on the third expression, it is understood that this expression expresses the cubic polynomial in the form of "f(x)=Ax³+Bx²+Cx+D" by using coefficients shown as the lower case letters a, b, c, and d defined so as to satisfy A=(a−b), B=(b−c), C=(c−d), and D=d instead of the coefficients shown as the upper case letters A, B, C, and D. The coefficients shown as the lower case letters a, b, c, and d are referred to as auxiliary coefficients.

By defining the relationship of A=(a−b), B=(b−c), C=(c−d), and D=d, resultantly, the (Expression 3-20) is completely equivalent to the cubic polynomial "f(x)=Ax³+Bx²+Cx+D," so that in the interpolated value arithmetic unit 840 shown in FIG. 49, it is allowed that the pixel value f(x) is calculated by using this (Expression 3-20). As a matter of course, the values of the auxiliary coefficients a, b, c, and d are different from the values of the coefficients A, B, C, and D, so that an arithmetic expression for calculating the auxiliary coefficients a, b, c, and d becomes necessary. Considering the relationship of A=(a−b), B=(b−c), C=(c−d), and D=d, the values of the auxiliary coefficients a, b, c, and d can be calculated by the following expression:

$$\begin{cases} a = f_1, \\ b = \dfrac{(6g_{-1} - (3w+1)f_0 + 6wf_1 - 6g_2)}{(3w-1)}, \\ c = \dfrac{1}{(3w-1)(5w-1)} \\ \quad (-6(7w-2)g_{-1} + 2(6w^2 + 2w - 1)f_0 + \\ \quad 6w(2w-1)f_1 - 6(2w-1)g_2), \\ d = f_0 \end{cases} \quad \text{(Expression 3-21)}$$

by using the pixel values $f_0$ and $f_1$ of the interval terminal pixels, the left side influence factor $g_{-1}$, the right side influence factor $g_2$, and the weighting factor w.

Thereby, in the interpolated value arithmetic unit 840, instead of the coefficients A, B, C, and D, the auxiliary coefficients a, b, c, and d defined so as to satisfy A=(a−b), B=(b−c), C=(c−d), and D=d are determined based on the (Expression 3-21), and by performing the operation of the cubic polynomial "f(x)=[{ax+b(1−x)}x+c(1−x)]x+d(1−x)" in which the position x is substituted, shown as the first expression of the (Expression 3-20) instead of the cubic polynomial "f(x)=Ax³+Bx²+Cx+D," the pixel value f(x) is calculated. Thus, employment of the arithmetic operation using the auxiliary coefficients a, b, c, and d instead of the coefficients A, B, C, and D has the following two advantages.

The first advantage is that the operation of the coefficients can be improved in efficiency. Carefully checking the (Expression 3-21), it is understood that the auxiliary coefficient $a=f_1$ and the auxiliary coefficient $d=f_0$. Namely, the auxiliary coefficients a and d are completely the same as the pixel values $f_1$ and $f_0$ of the interval terminal pixels, and no operation is necessary. Resultantly, in the arithmetic operation process for the auxiliary coefficients, performing of the operations to calculate the auxiliary coefficients b and c and the operations to calculate the factors $g_{-1}$ and $g_2$ and the weighting factor w necessary for said operation are only required. For example, when the parameter i=−4 is set, interpolation using 10 in total of sample pixels (pixel values $f_{-4}$ through $f_5$) is performed, however, the actual operation is performed as follows:

$$\begin{cases} b = \dfrac{1}{265}\begin{Bmatrix} 3(-f_{-4} + 4f_{-3} - 14f_{-2} + 52f_{-1}) - \\ 317f_0 + 582f_1 + \\ 3(f_5 - 4f_4 + 14f_3 - 52f_2) \end{Bmatrix}, \\ c = \dfrac{1}{13515}\begin{Bmatrix} 209(f_{-4} - 4f_{-3} + 14f_{-2} - 52f_{-1}) + \\ 13516f_0 + 10864f_1 + \\ 56(f_5 - 4f_4 + 14f_3 - 52f_2) \end{Bmatrix}, \\ g_{-1} = \dfrac{1}{2 \cdot 26}(-f_{-4} + 4f_{-3} - 14f_{-2} + 52f_{-1}), \\ g_2 = -\dfrac{1}{2 \cdot 26}(f_5 - 4f_4 + 14f_3 - 52f_2), \\ w = \dfrac{97}{26} \end{cases} \quad \text{(Expression 3-22)}$$

In this (Expression 3-22), when setting $h_{-1}=-f_{-4}+4f_{-3}-14f_{-2}+52f_{-1}$ and $h_2=f_5-4f_4+14f_3-52f_2$, by performing an operation in the following form:

$$\begin{cases} h_{-1} = -f_{-4} + 4f_{-3} - 14f_{-2} + 52f_{-1} \\ \quad = -f_{-4} + 4f_{-3} + (2-16)f_{-2} + \\ \quad (32+16+4)f_{-1}, \\ h_2 = f_5 - 4f_4 + 14f_3 - 52f_2 \\ \quad = f_5 - 4f_4 + (16-2)f_3 - (32+16+4)f_2, \\ b = \dfrac{3}{265}h_{-1} - \dfrac{317}{265}f_0 + \dfrac{582}{265}f_1 + \dfrac{3}{265}h_2, \\ c = -\dfrac{209}{13515}h_{-1} + \dfrac{13516}{13515}f_0 + \dfrac{10864}{13515}f_1 + \dfrac{56}{13515}h_2 \end{cases} \quad \text{(Expression 3-23)}$$

$h_{-1}$ and $h_2$ are calculated, and furthermore, the auxiliary coefficients b and c can be calculated. This means that the auxiliary coefficients b and c can be calculated only by performing shift operation and product-sum operation.

The second advantage is the point that the operation to calculate f(x) by using the auxiliary coefficients a, b, c, and d can also be improved in efficiency. This is because the cubic polynomial concerning f(x) is in the form "f(x)=[{ax+b(1−x)}x+c(1−x)]x+d(1−x)" as shown as the first expression of the (Expression 3-20). This polynomial is equivalent to the "f(x)=Ax³+Bx²+Cx+D" as described above, however, it looks very complicated. However, the expression in this form has a unique advantage in that the value of f(x) can be calculated by connecting three existing linear interpolators in series. The reason for this is as follows.

Now, the case where two pixels Pa and Pb are present on the x axis and a new pixel P is defined between these pixels is considered. Herein, it is assumed that the pixel Pa is arranged at the position of the coordinate value x=0, the pixel Pb is arranged at the position of the coordinate value x=1, and the new pixel P is arranged at a coordinate value $\alpha$ ($0 \leq \alpha \leq 1$). The pixel values of the pixels Pa, Pb, and P are indicated by the same reference symbols Pa, Pb, and P.

In this case, when the pixel value P of the new pixel P is calculated by simple linear interpolation, it can be calculated by the following expression:

$$P = (1-\alpha)P_a + \alpha P_b \quad \text{(Expression 3-24)}$$
$$= \overline{\alpha}P_a + P_a 2^{-m} + \alpha P_b$$

Herein, (1−α) and α are weighting factors for the pixel values Pa and Pb, and the second expression of this (Expression 3-24) indicates an expression as a binary operation. Namely, when m denotes the lowest-order decimal position, and $\alpha$ is a bit sequence expressed as:

$$\alpha = [0.a_1 a_2 \ldots a_m]_2 \quad \text{(Expression 3-25)}$$

the bar of $\alpha$ indicates a value obtained by inverting each bit as:

$$\overline{\alpha} = [0.\overline{a}_1 \overline{a}_2 \ldots \overline{a}_m]^2 \quad \text{(Expression 3-26)}$$

The pixel values Pa, Pb, and P are also expressed as the following bit sequences:

$$P_a = [x_1 x_2 \ldots x_m]_2, P_b = [y_1 y_2 \ldots y_m]_2, P = [p_1 p_2 \ldots p_m p_{m+1} p_{m+2} \ldots p_{2m}]_2 \quad \text{(Expression 3-27)}$$

of binary numbers. An interpolator which performs interpolation based on this expression can be realized by a comparatively simple constitution. The pixel values Pa and Pb are expressed exclusively by $\alpha$, so that the selector logic can be applied, and an advantage in that carrying can be reduced is obtained.

Considering that the arithmetic operation of "P=(1−$\alpha$)Pa+$\alpha$Pb" can be performed by a linear interpolator having a comparatively simple constitution, it is understood that the aforementioned expression "f(x)=[{$\alpha$x+b(1−x)}x+c(1−x)]x+d(1−x)" can be calculated by connecting three linear interpolators. Namely, focusing attention on the part of "ax+b(1−x)," when $\alpha$=Pb, b=Pa, and $\alpha$=x are applied, this operation becomes the same as the operation of "P=(1−$\alpha$)Pa+$\alpha$Pb" of the linear interpolator. Therefore, the part "ax+b(1−x)" can be calculated by the first linear interpolator. Next, focusing attention on the part "{ax+b(1−x)}x+c(1−x)," when {ax+b(1−x)}=Pb, c=Pa, and $\alpha$=x are applied, this operation becomes the same as the operation "P=(1−$\alpha$)Pa+$\alpha$Pb" of the linear interpolator. Therefore, this part can be calculated by the second linear interpolator. Last, focusing on the entire expression of [{ax+b(1−x)}x+c(1−x)]x+d(1−x), when [{ax+b(1−x)}x+c(1−x)]=Pb, d=Pa, and $\alpha$=x are applied, this operation also becomes the same as the operation "P=(1−$\alpha$)Pa+$\alpha$Pb" of the linear interpolator. Therefore, this part can be calculated by the third linear interpolator.

Figure 51:
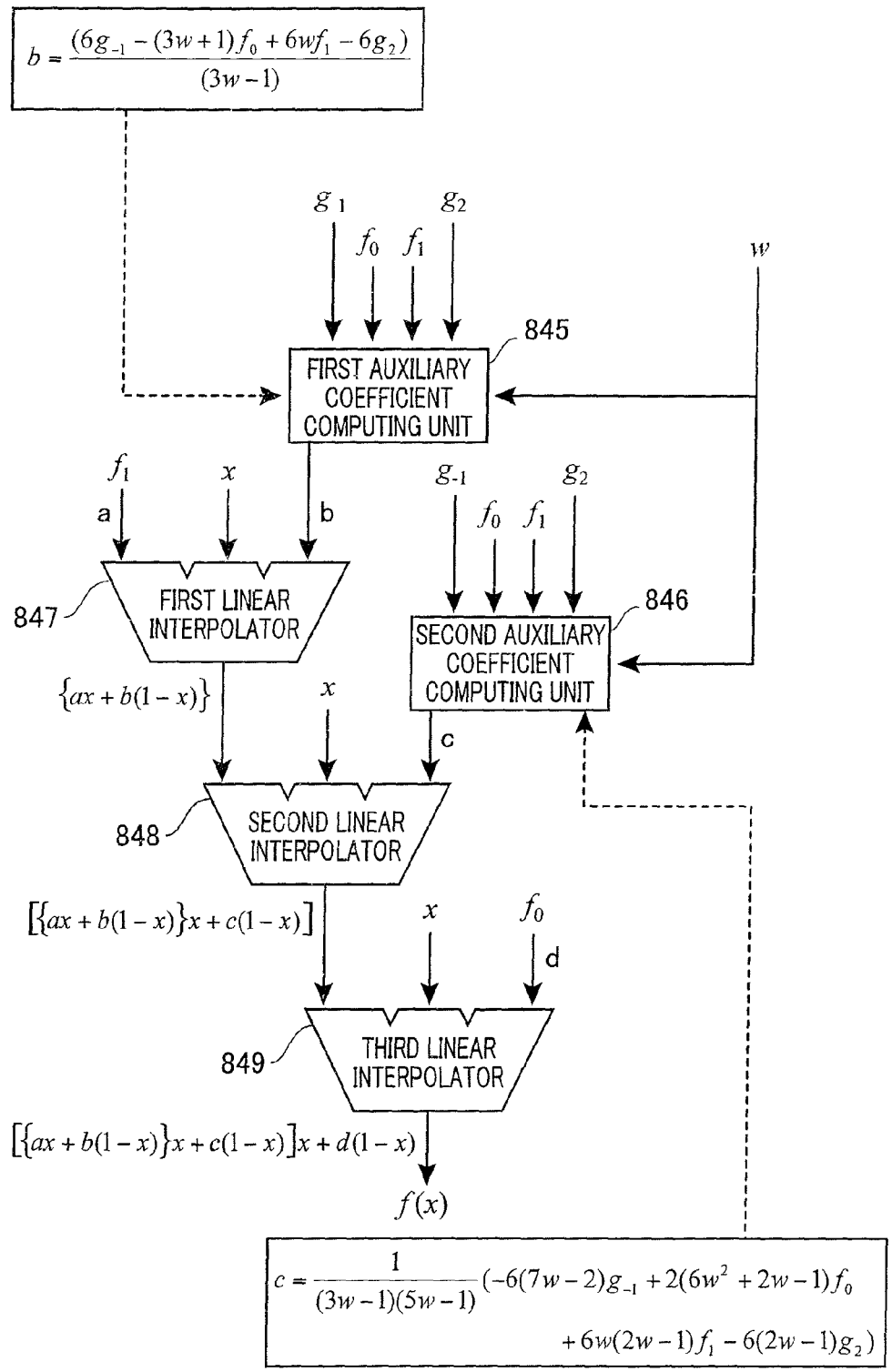
FIG. 51 is a block diagram showing another constitution example of the interpolated value arithmetic unit 840 in the interpolation device shown in FIG. 49.

Thus, when the auxiliary coefficients a, b, c, and d are determined instead of the coefficients A, B, C, and D, and an arithmetic operation using the cubic polynomial "f(x)=[{ax+b(1−x)}x+c(1−x)]x+d(1−x)" instead of the cubic polynomial "f(x)=Ax$^3$+Bx$^2$+Cx+D" is performed as the operation in the interpolated value arithmetic operation 840, arithmetic processing very efficient in practical use becomes possible. FIG. 51 is a block diagram showing a constitution example of the interpolated value arithmetic unit 840 for performing this arithmetic processing.

As illustrated, the interpolated value arithmetic unit 840 shown in FIG. 51 comprises a first auxiliary coefficient computing unit 845, a second auxiliary coefficient computing unit 846, a first linear interpolator 847, a second linear interpolator 848, and a third linear interpolator 849.

The first auxiliary coefficient computing unit 845 has a function to calculate the auxiliary coefficient b by the expression of b=(6g$_{-1}$−(3w+1)f$_0$+6wf$_1$−6g$_2$)/(3w−1) as illustrated (expression shown in the aforementioned expression 3-21) by using the pixel values f$_0$ and f$_1$ of the interval terminal pixels, the left side influence factor g$_{-1}$, the right side influence factor g$_2$, and the weighting coefficient w. The second auxiliary coefficient computing unit 846 has a function to calculate the auxiliary coefficient c by the expression of c=1/((3w−1)(5w−1)) (−6(7w−2)g$_{-1}$+2(6w$^2$+2w−1)f$_0$+6w(2w+1)f$_1$−6(2w−1)g$_2$) as illustrated (expression shown in the aforementioned expression 3-21) by using the pixel values f$_0$ and f$_1$ of the interval terminal pixels, the left side influence factor g$_{-1}$, the right side influence factor g$_2$, and the weighting factor w.

On the other hand, the linear interpolators 847, 848, and 849 are linear interpolators all having a function to calculate "P=(1−$\alpha$)Pa+$\alpha$Pb." Herein, to the first linear interpolator 847, the auxiliary coefficient b that is the result of the arithmetic operation of the first auxiliary coefficient computing unit 845 is given, and to the second linear interpolator 848, the auxiliary coefficient c that is the result of the arithmetic operation of the second auxiliary coefficient computing unit 846 is given. The first linear interpolator 847 inputs the pixel value f$_1$ of one interval terminal pixel P$_1$ as the auxiliary coefficient a, and calculates the value of {ax+b(1−x)} by performing linear interpolation based on the auxiliary coefficients a and b and the position x. The second linear interpolator 848 calculates the value of [{ax+b(1−x)}x+c(1−x)] by performing linear interpolation based on the value of {ax+b(1−x)}, the auxiliary coefficient c, and the position x. Then, the last third linear interpolator inputs the pixel value f$_0$ of the other interval terminal pixel P$_0$ as the auxiliary coefficient d, and calculates the value of f(x)=[{ax+b(1−x)}x+c(1−x)]x+d(1−x) by performing linear interpolation based on the value of [{ax+b(1−x)}x+c(1−x)], the auxiliary coefficient d, and the position x.

Thus, the interpolated value arithmetic unit shown in FIG. 51 can perform a function equivalent to that of the interpolated value arithmetic unit shown in FIG. 50, and its circuitry becomes very simple, so that more efficient operation becomes possible.

<<<Section 3-5. Interpolation of Two-Dimensional Image>>>

An embodiment of the third aspect of the invention in which interpolation is performed with respect to a one-dimensional pixel array is described above, however, for scaling display by enlarging or reducing an image, interpolation must be performed for a two-dimensional image, that is, a two-dimensional pixel array. Therefore, herein, a constitution example of an interpolation device having a function to perform interpolation for a two-dimensional pixel array is described with reference to the block diagram of FIG. 52.

Figure 52:
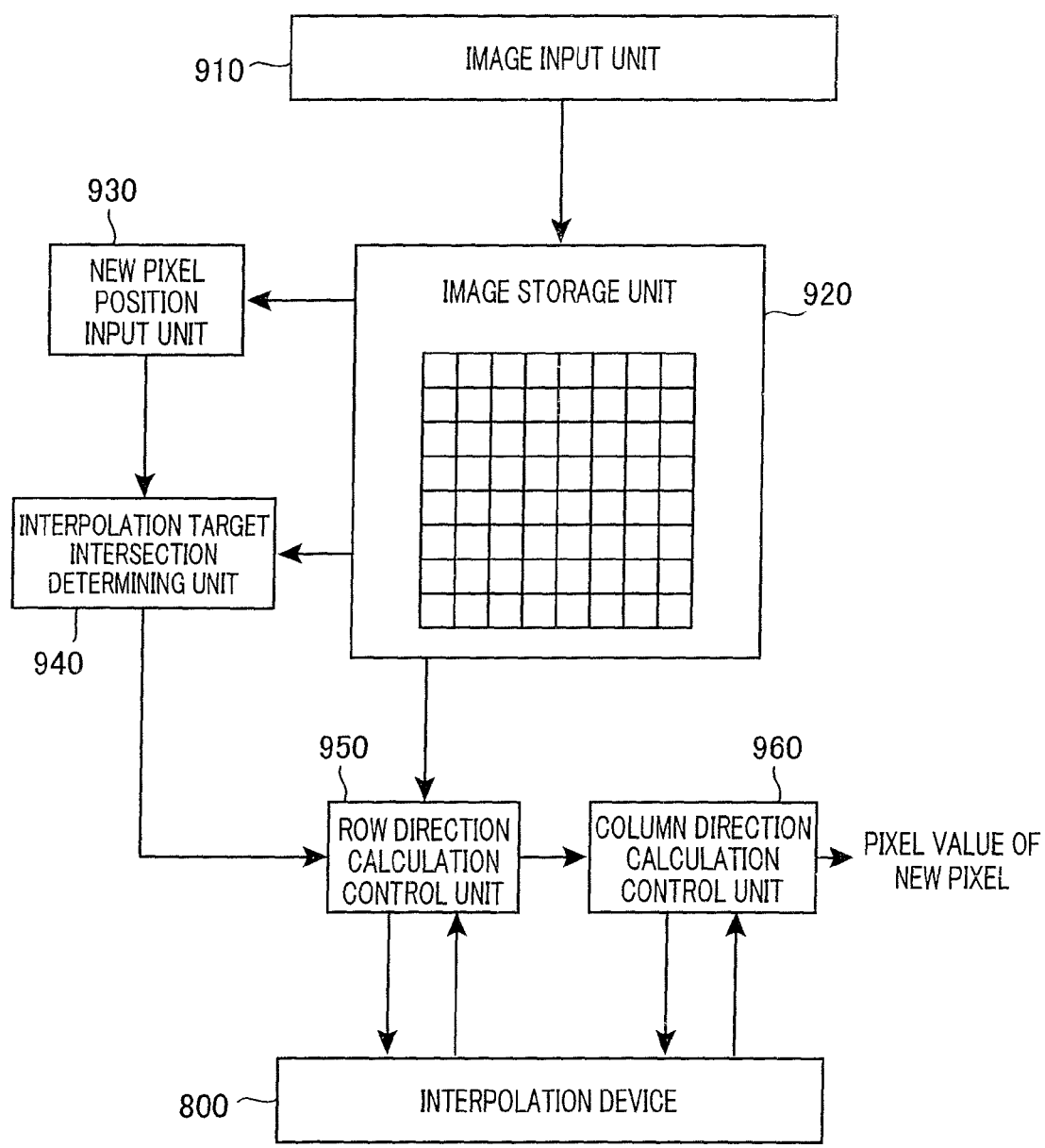
FIG. 52 is a block diagram showing a constitution of an interpolation device having a function to perform interpolation about a two-dimensional image.

The interpolation device shown in FIG. 52 is an interpolation device for two-dimensional pixel arrays, however, it includes the whole of the interpolation device for one-dimensional pixel arrays of the embodiments described above. Namely, the interpolation device 800 shown in FIG. 52 is the interpolation device for one-dimensional pixel arrays described above (for example, a device having the constitution shown in FIG. 49). The interpolation device for two-dimensional pixel arrays shown in FIG. 52 is constituted by further adding an image input unit 910, an image storage unit 920, a new pixel position input unit 930, an interpolation target intersection determining unit 940, a row direction calculation control unit 950, and a column direction calculation control unit 960 to the interpolation device 800.

First, the image input unit 910 is a component having a function to input a general two-dimensional image, and the image storage unit 920 is a component having a function to store the inputted two-dimensional image. In actuality, the image storage unit 920 is constituted by an image buffer memory, etc., and the image input unit 910 is constituted by a device for writing data on this buffer memory. Herein, the following description is given upon regarding the two-dimensional image to be stored in the image storage unit 920 as a two-dimensional pixel array including a plurality of pixels having predetermined pixel values arranged at intersections between row lines arranged parallel at predetermined pitches and column lines orthogonal to the row lines.

Figure 53:
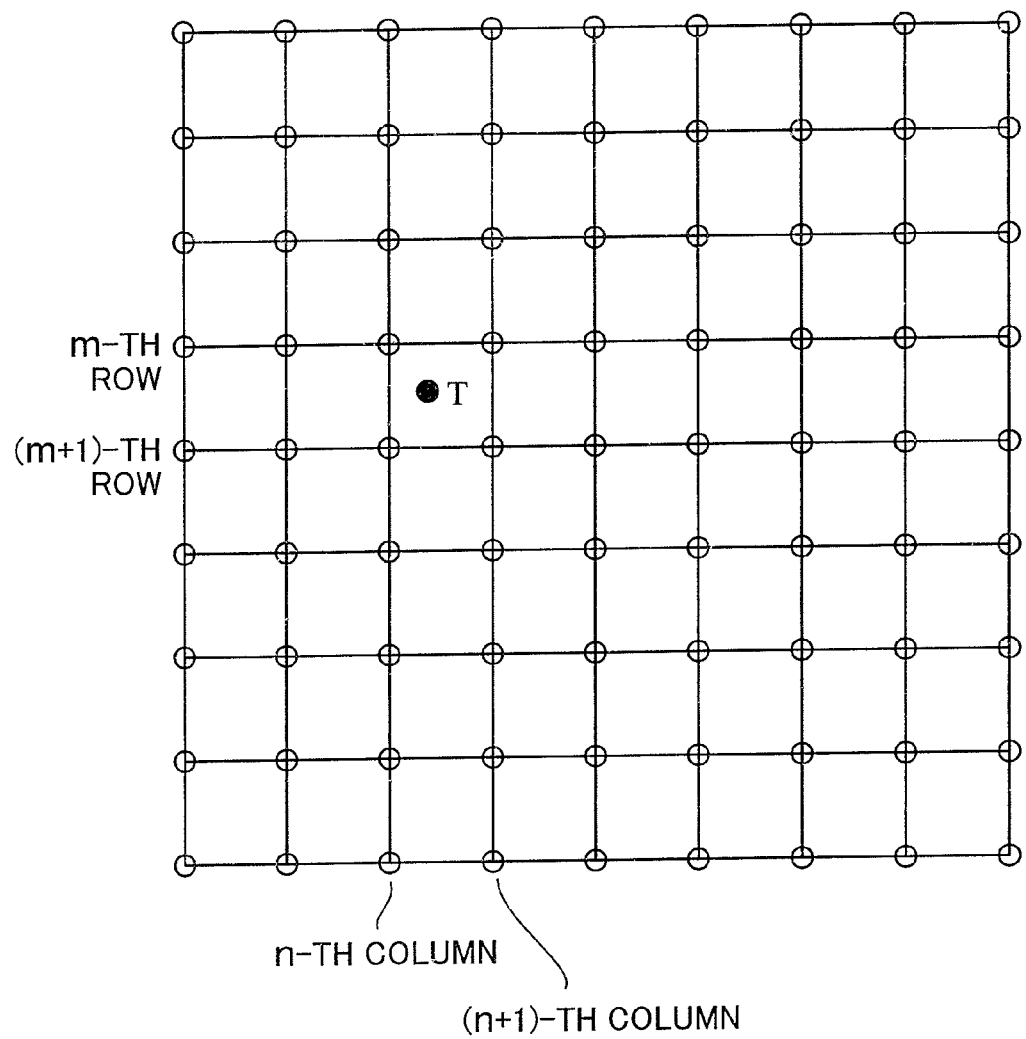
FIG. 53 is a plan view showing a two-dimensional pixel array for describing operations of the interpolation device of FIG. 52.

FIG. 53 is a plan view of an example of such a two-dimensional pixel array. The nine horizontal lines shown in the figure are the row lines and the nine vertical lines are column lines, and white circles drawn at the intersections are pixels having predetermined pixel values, respectively. Herein, for the sake of convenience of explanation, a pixel array of nine rows and nine columns is shown, however, as a matter of course, in actuality, a larger pixel array is taken as a two-dimensional image.

The new pixel position input unit 930 has a function to input the positions of new pixels T (interpolation points) that should be defined on the two-dimensional image stored in the image storage unit 920. As a matter of course, the new pixels T are defined at positions different from the positions of the pixels on the two-dimensional pixel array stored in the image storage unit 920. Herein, for the sake of convenience of explanation, it is assumed that the new pixel T is defined at the position as shown in FIG. 53. The positions of the new pixels T are designated from another device which displays the image by enlarging or reducing it. Normally, a number of points are designated as the positions of new pixels T, however, herein, as shown in FIG. 53, it is assumed that one new pixel T is designated between the m-th row and the (m+1)th row between the n-th column and the (n+1)th column, and processing for determining the pixel value of this new pixel T by means of interpolation will be described.

Figure 54:
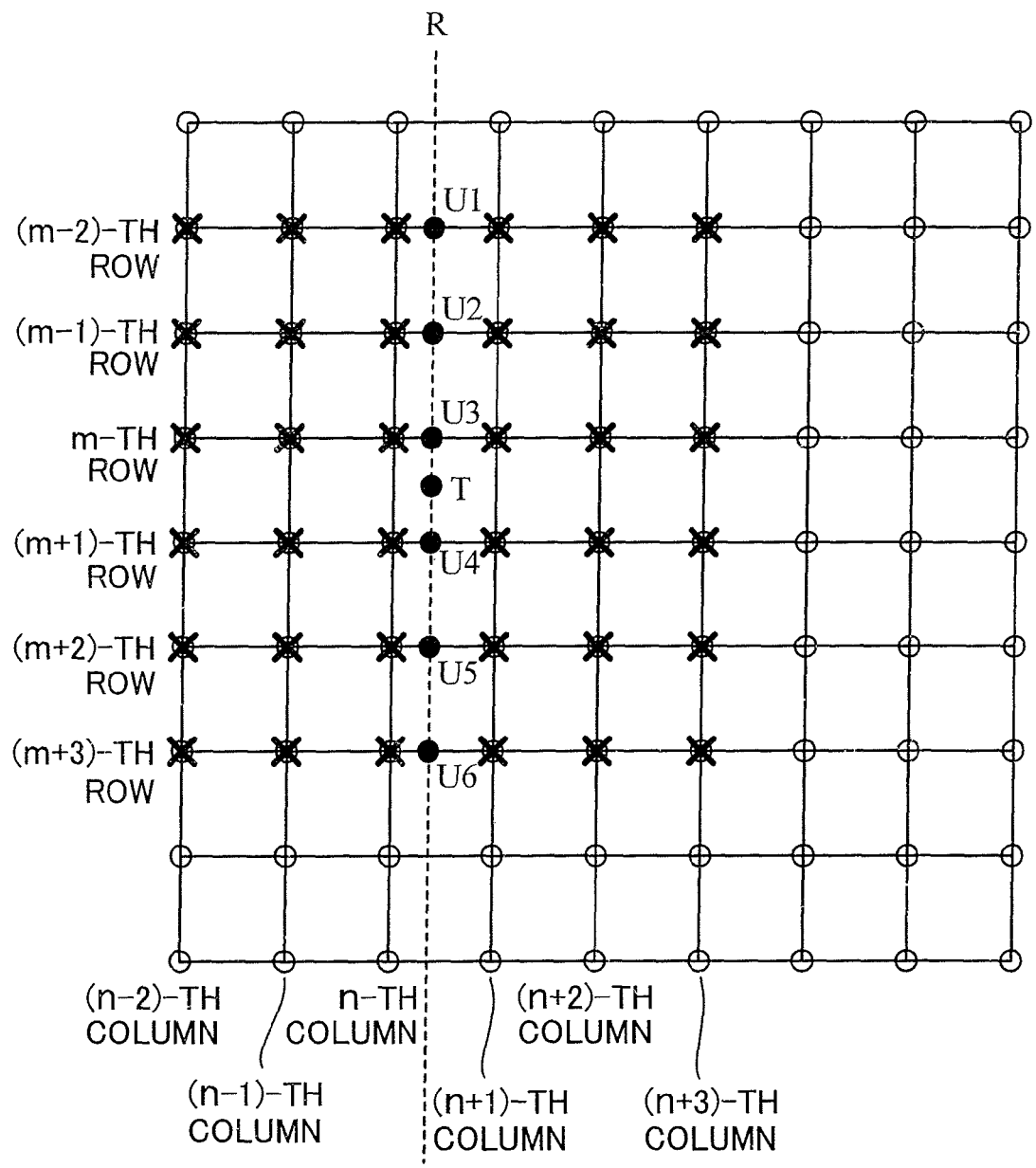
FIG. 54 is another plan view showing a two-dimensional pixel array for describing operations of the interpolation device of FIG. 52.

When the position of the new pixel T is inputted, first, the interpolation target intersection determining unit 940 performs processing for defining a reference line R that passes through the position of the new pixel T and is parallel to the column lines on the two-dimensional image stored in the image storage unit 920. In FIG. 54, this reference line R is shown by a dashed line. Then, among intersections of the reference line R and the row lines, a predetermined number of intersections near the new pixel T are determined as interpolation target intersections. Herein, the number of intersections to be determined as the interpolation target intersections corresponds to the number of pixels to be used for interpolation, so that the number is determined in advance. In FIG. 54, an example in which six intersections U1 through U6 indicated by black circles are determined as the interpolation target intersections is shown.

As a matter of course, the six interpolation target intersections U1 through U6 are only intersections, and no pixel values are defined at this time. Therefore, to provide these interpolation target intersections U1 through U6 with a function as pixels, processing for giving pixel values to the respective intersections is performed. The row direction calculation control unit 950 is a component for performing this processing. Namely, concerning the interpolation target intersections U1 through U6, this row direction calculation control unit 950 makes the interpolation device 800 to calculate the pixel values of the interpolation target intersections by giving one-dimensional pixel arrays on the row lines, to which the intersections belong, to the interpolation device 800.

For example, in the case of the example shown in FIG. 54, first, concerning the interpolation target intersection U1 belonging to the (m−2)th row, a one-dimensional pixel array on this row line is given to the interpolation device 800 so that the interpolation device interpolates a pixel value of the interpolation target intersection U1. As described above, the interpolation device 800 is for one-dimensional pixel arrays, and can calculate the pixel value of the interpolation target intersection U1 by the method described above. Herein, for the sake of convenience, it is assumed that the interpolation for a one-dimensional pixel array is performed by using the six pixels indicated by cross marks on the (m−2)th row as sample pixels.

The row direction calculation control unit 950 successively calculates the pixel values of the interpolation target intersections U1 through U6 by using the interpolation device 800. As a result, to the interpolation target intersections U1 through U6, predetermined pixel values are given as interpolated values, and a function as a pixel is given.

The column direction calculation control unit 960 performs processing to make the interpolation device 800 to calculate the pixel values of the new pixels T by giving one-dimensional pixel arrays composed of the respective interpolation target intersections arranged on the reference line R to the interpolation device 800. In the case of the illustrated example, the interpolation target intersections U1 through U6 are respectively given as sample pixels to the interpolation device 800, and as a result, the pixel value of the new pixel T is determined.

Resultantly, in the case of the example shown in FIG. 54, the pixel value of the new pixel T is determined by performing an operation while considering the pixel values of 36 in total of sample pixels belonging to the (n−2)th column through the (n+3)th column and the (m−2)th row through the (m+3)th row, and as a result, interpolation for the two-dimensional image is executed.

<<<Section 3-6. Embodiment Involving Carry Save>>>

The interpolation device according to the third aspect of the invention comprises the left side influence factor arithmetic unit 820, the right side influence factor arithmetic unit 830, and the interpolated value arithmetic unit 840 as shown in FIG. 49, and each of these arithmetic units is constituted by a plurality of computing units. In this case, by constituting the computing unit on the middle stage so as to perform an operation without carry propagation, the operation can be made more efficient.

Generally, processing for propagating carries of the respective digits in an operation of binary data, the operation becomes complicated and efficiency lowers. Therefore, in the respective computing units, operations are performed without carry propagation, and the results are outputted as the results of operations to the subsequent computing units. At this time, the carry information of the respective bits are also outputted to the subsequent computing units. This processing is performed in the computing unit on each stage, and in the computing unit on the last stage, by performing carry propagation while considering the carry information, more efficient operation becomes possible.

According to the third aspect of the invention, an interpolation device consisting of compact hardware which can efficiently perform complicated operations of bicubic spline interpolation using S*S sample pixels can be realized. In addition, the number S (S≧4) of sample pixels to be used can be selected, and interpolation is directly performed at a high speed with high accuracy, so that an excellent display can be selected and displayed in real time in enlargement and reduction scaling of moving images. Therefore, this can be industrially used for scaling display of digital televisions, digital zooming display of digital cameras, fine zooming display of medical images, and zooming detection of a target in monitor cameras.

Thus, according to the third aspect of the invention, cubic spline interpolation can be efficiently performed. The summary of the third aspect of the invention can be described as follows with reference to FIG. 49.

According to this invention, based on a one-dimensional pixel array composed of sample pixels $P_{-i}$ through $P_{i+1}$, a pixel value f(x) of a point Q on an arbitrary position x ($0 \leq x < 1$) in an interpolation interval is calculated by interpolation using a cubic polynomial "$f(x)=Ax^3+Bx^2+Cx+D$." First, for the sample pixels, weighting factors indicating weighting according to the distances from the point Q are prepared in the storage unit 850. Next, the pixel values $f_{-i}$ through $f_{i+1}$ of the sample pixels are inputted by the data input unit 810. A left side influence factor $g_{-1}$ indicating influences of the pixel values $f_{-i}$ through $f_{-1}$ of left side interpolation pixels on the coefficients of the polynomial is calculated by the arithmetic unit 820, and a right side influence factor $g_2$ indicating influences of the pixel values $f_2$ through $f_{i+1}$ of right side interpolation pixels on the coefficients of the polynomial is calculated by the arithmetic unit 830. Last, in the arithmetic unit 840, the pixel value f(x) is calculated by determining the coefficients A, B, C, and D by using $g_{-1}$, $f_0$, $f_1$, $g_2$, and the weighting factor.

What is claimed is:

1. An interpolation device which calculates a pixel value f(x) of a new pixel Q defined at an arbitrary position in an interpolation interval both ends of which are at two adjacent pixels by performing interpolation using a cubic polynomial "$f(x)=Ax^3+Bx^2+Cx+D$" concerning a position x based on a one-dimensional pixel array obtained by arranging a plurality of pixels having predetermined pixel values at predetermined pitches, comprising:
   a data input unit which inputs pixel values of sample pixels and the position x of the new pixel Q when the two adjacent pixels are defined as interval terminal pixels, "a predetermined number of pixels to be used for interpolation" continuously arranged adjacent to each other on the left of the interpolation interval are defined as left side interpolation pixels, "a predetermined number of pixels to be used for interpolation" continuously arranged adjacent to each other on the right of the interpolation interval are defined as right side interpolation pixels, and S ($S \geq 4$) in total of pixels consisting of the interval terminal pixels, the left side interpolation pixels, and the right side interpolation pixels are defined as sample pixels;
   a weighting coefficient storage unit which stores weighting factors for the sample pixels, indicating weighting according to the distances from the interpolation interval;
   a left side influence factor arithmetic unit which calculates left side influence factors indicating influences of pixel values of the left side interpolation pixels on coefficients of the cubic polynomial based on the pixel values of the left side interpolation pixels and the weighting factors;
   a right side influence factor arithmetic unit which calculates right side influence factors indicating influences of pixel values of the right side interpolation pixels on coefficients of the cubic polynomial based on the pixel values of the right side interpolation pixels and the weighting factors; and
   an interpolated value arithmetic unit which calculates a pixel value f(x) by performing an arithmetic operation by determining the coefficients A, B, C, and D of the cubic polynomial by using the left side influence factors, the right side influence factors, and the weighting factors and substituting the position x for the cubic polynomial.

2. The interpolation device according to claim 1, wherein the interpolated value arithmetic unit comprising:
   a square/cube computing unit which calculates a square $x^2$ and a cube $x^3$ of the position x;
   a cubic coefficient computing unit which calculates a cubic coefficient A of the cubic polynomial based on the pixel values of the interval terminal pixels, the left side influence factors, the right side influence factors, and the weighting factors;
   a quadratic coefficient computing unit which calculates a quadratic coefficient B of the cubic polynomial based on the pixel values of the interval terminal pixels, the left side influence factors, the right side influence factors, and the weighting factors;
   a primary coefficient computing unit which calculates a primary coefficient C of the cubic polynomial based on the pixel values of the interval terminal pixels, the left side influence factors, the right side influence factors, and the weighting factors;
   a cubic coefficient multiplier which calculates $Ax^3$ by multiplying the cubic coefficient A and the cube $x^3$;
   a quadratic coefficient multiplier which calculates $Bx^2$ by multiplying the quadratic coefficient B and the square $x^2$;
   a primary coefficient multiplier which calculates Cx by multiplying the primary coefficient C and the position x; and
   an adder which performs addition of $Ax^3+Bx^2+Cx+D$ by defining a pixel value of one interval terminal pixel as the coefficient D.

3. The interpolation device according to claim 1, wherein when the 0-th pixel $P_0$ and the first pixel $P_1$ adjacent to each other in a one-dimensional pixel array are defined as interval terminal pixels, and concerning a predetermined integer i ($i \geq 1$), in total of pixels from the (−i)th pixel $P_{-i}$ to the (−1)st pixel $P_{-1}$ are defined as a left side interpolation pixel or pixels, i in total of pixels from the second pixel $P_2$ to the (i+1)th pixel $P_{i+1}$ are defined as a right side interpolation pixels, $S=2(i+1)$ sample pixels are defined, the position of the interval terminal pixel $P_0$ is set to 0 and the position of the interval terminal pixel $P_1$ is set to 1, and a position x of a new pixel Q is defined in a range of $0 \leq x < 1$,
   the data input unit inputs pixel values $f_0$ and $f_1$ of the interval terminal pixels $P_0$ and $P_1$, pixel values $f_{-i}$, through $f_{-1}$ of the left side interpolation pixels $P_{-i}$, through $P_{-1}$, pixel values $f_2$ through $f_{i+1}$ of the right side interpolation pixels $P_2$ through $P_{i+1}$, and the position x of the new pixel Q,
   the weighting factor storage unit stores values of weighting factors $w_1, w_2, w_3, \ldots, w_i$ expressed by a recurrence formula of $w_i=4-(1/w_{i-1})$ (wherein $w_0=2$),
   the left side influence factor arithmetic unit calculates a left side influence factor $g_{-1}$ based on an arithmetic expression of:

$$g_{-1} = -1/w_{i-1}(\ldots(-1/w_2(-1/w_1(-1/4 \cdot f_{-1}+f_{-i+1})+f_{-i+2})\ldots)+f_{-i+(i-2)})+f_{-i+(i-1)}$$

the right side influence factor arithmetic unit calculates a right side influence factor $g_2$ based on an arithmetic expression of:

$$g_2 = -1/w_{i-1}(\ldots(-1/w_2(-1/w_1(-1/4 \cdot f_{i+1}+f_i)+f_{i-1})\ldots)+f_{i+(3-i)})+f_{i+(2-i)}$$

and the interpolated value arithmetic unit calculates the pixel value f(x) based on an arithmetic expression ($w=w_{i-1}$):

$$f(x)=1/(3w-1)\{-6g_{-1}+(3w+1)(f_0-f_1)+6g_2\}x^3+3/((5w-1)(3w-1))\{6(4w-1)g_{-1}-(9w^2+2w-1)f_0+6w^2f_1-6wg_2\}x^2+3/(5w-1)(3w-1))\{-2(7w-2)g_{-1}-(w^2-4w+1)f_0+2w(2w-1)f_1-2(2w-1)g_2\}x+f_0.$$

4. The interpolation device according to claim 1, further comprising:
an image input unit which inputs a two-dimensional pixel array obtained by arranging a plurality of pixels having predetermined pixel values, respectively, at intersections between row lines arranged parallel to each other at predetermined pitches and column lines orthogonal to the row lines;
an image storage unit which stores the two-dimensional pixel array;
a new pixel position input unit which inputs a position of a new pixel T defined at a position different from the positions of the pixels on the two-dimensional pixel array;
an interpolation target intersection determining unit which defines a reference line R that passes through the position of the new pixel T and is parallel to the column lines, and determines a predetermined number of intersections near the new pixel T among intersections between the reference line R and the row lines as interpolation target intersections;
a row direction calculation control unit which makes the interpolation device calculate pixel values of the interpolation target intersections by giving one-dimensional pixel arrays on row lines, to which the interpolation target intersections belong, to the interpolation device; and
a column direction calculation control unit which makes the interpolation device calculate the pixel value of the new pixel T by giving a one-dimensional pixel array consisting of the interpolation target intersections arranged on the reference line R to the interpolation device,
to perform interpolation for a two-dimensional image.

5. The interpolation device according to claim 1, wherein
one or a plurality of the left side influence factor arithmetic unit, the right side influence factor arithmetic unit, and the interpolated value arithmetic unit are constituted by a plurality of computing units, and computing units on a middle stage calculate results of operations of bits obtained without carry propagation and carry information of the bits and gives these to a later computing unit, and in a last computing unit, carry propagation is performed by considering the carry information.

6. An interpolation device which calculates a pixel value f(x) of a new pixel Q defined at an arbitrary position in an interpolation interval both ends of which are at two adjacent pixels by performing interpolation using a cubic polynomial "$f(x)=Ax^3+Bx^2+Cx+D$" concerning a position x based on a one-dimensional pixel array obtained by arranging a plurality of pixels having predetermined pixel values at predetermined pitches, comprising:
a data input unit which inputs pixel values of sample pixels and the position x of the new pixel Q when the two adjacent pixels are defined as interval terminal pixels, "a predetermined number of pixels to be used for interpolation" continuously arranged adjacent to each other on the left of the interpolation interval are defined as left side interpolation pixels, "a predetermined number of pixels to be used for interpolation" continuously arranged adjacent to each other on the right of the interpolation interval are defined as right side interpolation pixels, and S (S>4) in total of pixels consisting of the interval terminal pixels, the left side interpolation pixels, and the right side interpolation pixels are defined as sample pixels;

a weighting coefficient storage unit which stores weighting factors for the sample pixels, indicating weighting according to the distances from the interpolation interval;
a left side influence factor arithmetic unit which calculates left side influence factors indicating influences of pixel values of the left side interpolation pixels on coefficients of the cubic polynomial based on the pixel values of the left side interpolation pixels and the weighting factors;
a right side influence factor arithmetic unit which calculates right side influence factors indicating influences of pixel values of the right side interpolation pixels on coefficients of the cubic polynomial based on the pixel values of the right side interpolation pixels and the weighting factors; and
an interpolated value arithmetic unit which determines auxiliary coefficients a, b, c, and d defined so as to satisfy A=(a−b), B=(b−c), C=(c−d), and D=d instead of the coefficients A, B, C, and D by using the pixel values of the interval terminal pixels, the left side influence factors, the right side influence factors, and the weighting factors, and calculates the pixel value f(x) by an arithmetic operation by a cubic polynomial of "$f(x)=[\{ax+b(1-x)\}x+c(1-x)]x+d(1-x)$" for which the position x is substituted instead of the cubic polynomial "$f(x)=Ax^3+Bx^2+Cx+D$."

7. The interpolation device according to claim 6, wherein
the interpolated value arithmetic unit comprising:
a first auxiliary coefficient computing unit which calculates an auxiliary coefficient b based on the pixel values of the interval terminal pixels, the left side influence factors, the right side influence factors, and the weighting factors;
a second auxiliary coefficient computing unit which calculates an auxiliary coefficient c based on the pixel values of the interval terminal pixels, the left side influence factors, the right side influence factors, and the weighting factors;
a first linear interpolator which calculates a value of {ax+b(1−x)} by inputting a pixel value of one interval terminal pixel as an auxiliary coefficient a and performing linear interpolation based on the auxiliary coefficient a, the auxiliary coefficient b, and the position x;
a second linear interpolator which calculates a value of [{ax+b(1−x)}x+c(1−x)] by performing linear interpolation based on the value of {ax+b(1−x)}, the auxiliary coefficient c, and the position x; and
a third linear interpolator which calculates a value of f(x)=[{ax+b(1−x)}x+c(1−x)]x+d(1−x) by inputting a pixel value of the other interval terminal pixel as the auxiliary coefficient d and performing linear interpolation based on the value of [{ax+b(1−x)}x+c(1−x)], the auxiliary coefficient d, and the position x.

8. The interpolation device according to claim 6, wherein
when the 0-th pixel $P_0$ and the first pixel $P_1$ adjacent to each other in a one-dimensional pixel array are defined as interval terminal pixels, and concerning a predetermined integer i (i≧1), i in total of pixels from the (−i)th pixel $P_{-i}$ to the (−1)st pixel $P_{-1}$ are defined as a left side interpolation pixels, i in total of pixels from the second pixel $P_2$ to the (i+1)th pixel $P_{i+1}$ are defined as a right side interpolation pixel or pixels, S=2(i+1) sample pixels are defined, the position of the interval terminal pixel $P_0$ is set to 0 and the position of the interval terminal pixel $P_1$ is set to 1, and the position x of a new pixel Q is defined in a range of $0 \leq x < 1$, the data input unit inputs pixel values $f_0$ and $f_1$ of the interval terminal pixels $P_0$ and $P_1$, pixel values $f_{-i}$ through $f_{-1}$ of the left side interpolation pixels $P_{-i}$ through $P_{-1}$, pixel values $f_2$ through $f_{i+1}$ of the right side interpolation pixels $P_2$ through $P_{i+1}$, and the position x of the new pixel Q, the weighting factor storage unit stores values of weighting factors $w_1, w_2, w_3, \ldots, w_i$ expressed by a recurrence formula of $w_i = 4 - (1/w_{i-1})$ (where $w_0 = 2$), the left side influence factor arithmetic unit calculates a left side influence factor $g_{-1}$ based on an arithmetic expression of:

$$g_{-1} = -1/w_{i-1}(\ldots(-1/w_2(-1/w_1(-1/4 \cdot f_{-1}+f_{-i+1})+f_{-i+2})\ldots)+f_{-i+(i-2)})+f_{-i+(i-1)}$$

the right side influence factor arithmetic unit calculates a right side influence factor $g_2$ based on an arithmetic expression of:

$$g_2 = -1/w_{i-1}(\ldots(-1/w_2(-1/w_1(-1/4 \cdot f_{i+1}+f_i)+f_{i-1})\ldots)+f_{i+(3-i)})+f_{i+(2-i)}$$

and the interpolated value arithmetic unit determines auxiliary coefficients a, b, c, and d by an arithmetic expression ($w=w_{i-1}$):

$a = f_1$, $b = (6g_{-1} - (3w+1)f_0 + 6wf_1 - 6g_2)/(3w-1)$, $c = 1/((3w-1)(5w-1))(-6(7w-2)g_{-1} + 2(6w^2 + 2w - 1)f_0 + 6w(2w-1)f_1 - 6(2w-1)g_2)$, $d = f_0$.

* * * * *